United States Patent [19]
Magar et al.

[11] Patent Number: 5,303,172
[45] Date of Patent: Apr. 12, 1994

[54] PIPELINED COMBINATION AND VECTOR SIGNAL PROCESSOR

[75] Inventors: Surender S. Magar; Michael E. Fleming; Shannon N. Shen; Kevin M. Kishavy; Christopher D. Furman; Kenneth N. Murphy, all of Colorado Springs, Colo.

[73] Assignee: Array Microsystems, Colorado Springs, Colo.

[21] Appl. No.: 155,671

[22] Filed: Feb. 16, 1988

[51] Int. Cl.⁵ .......................................... G06F 15/332
[52] U.S. Cl. ...................................................... 364/726
[58] Field of Search ...................... 364/726, 736, 754

[56] References Cited

U.S. PATENT DOCUMENTS

| | | | |
|---|---|---|---|
| 3,777,131 | 12/1973 | Llewellyn | 364/726 |
| 3,800,130 | 3/1974 | Martinson et al. | 364/726 |
| 4,164,021 | 8/1979 | Nishitani et al. | 364/726 |
| 4,241,411 | 12/1980 | Krasner et al. | 364/726 |
| 4,393,468 | 7/1983 | New | 364/736 |
| 4,563,750 | 1/1986 | Clarke | 364/726 |
| 4,689,762 | 8/1987 | Thibodeau, Jr. | 364/726 |
| 4,742,534 | 5/1988 | Verbeek et al. | 375/89 |
| 4,825,399 | 4/1989 | Nagai | 364/726 |

FOREIGN PATENT DOCUMENTS 2484672 6/1980 France .................................. 15/332

OTHER PUBLICATIONS

David Quong and Robert Perlman, *Electronic Design*, vol. 32, Jul. 1984, No. 14, "One–Chip Sequencer Shapes up Addressing for Large FFTs", pp. 159-164, 166, 168.
Allen M. Peterson and S. Shankar Narayan, *Wescon Conference Record*, vol. 25 (1981) Sep., "Fast Fourier Transform (FFT) and Prime Factor Transform (PFT) Implementations for Signal Processing and Digital Filtering", pp. 1-8.
Zoran Data Sheet for ZR34161 Vector Signal Processor, Jul. 30, 1986, pp. 7-18.
Supplemental Data Sheet for Zoran Data Sheet for 2R 34161 Vector Signal Procesor, pp. 20-26.

*Primary Examiner*—David H. Malzahn
*Attorney, Agent, or Firm*—Townsend and Townsend Khourie and Crew

[57] ABSTRACT

A digital array signal processor and an associated method are described for implementing the fast Fourier transform radix-4 butterfly algorithm. The digital array signal processor is an integrated circuit with a four stage pipeline and can perform a radix-4 butterfly operation on four complex operands every 80 nanoseconds. Using the decimation-in-frequency implementation of the radix-4 butterfly algorithm, the digital array signal processor includes a first stage for distribution of complex input operand values, a second stage for performing addition and subtraction operations, a third stage for performing multiplication operations and a fourth stage for distribution of the output operand values. The digital array signal processor can be reconfigured to perform a radix-2 butterfly operation on two sets of two complex numbers during the 80 nanosecond machine cycle as well as frequently used arithmetic and logic operations. The digital signal array processor can be configured to perform a series of operations on an array of operands or can be one of a series of processors, each processor performing a separate operation on an operand array. According to a second implementation, the digital array signal processor can perform the radix-4 butterfly algorithm using the decimation-in-time algorithm.

30 Claims, 77 Drawing Sheets

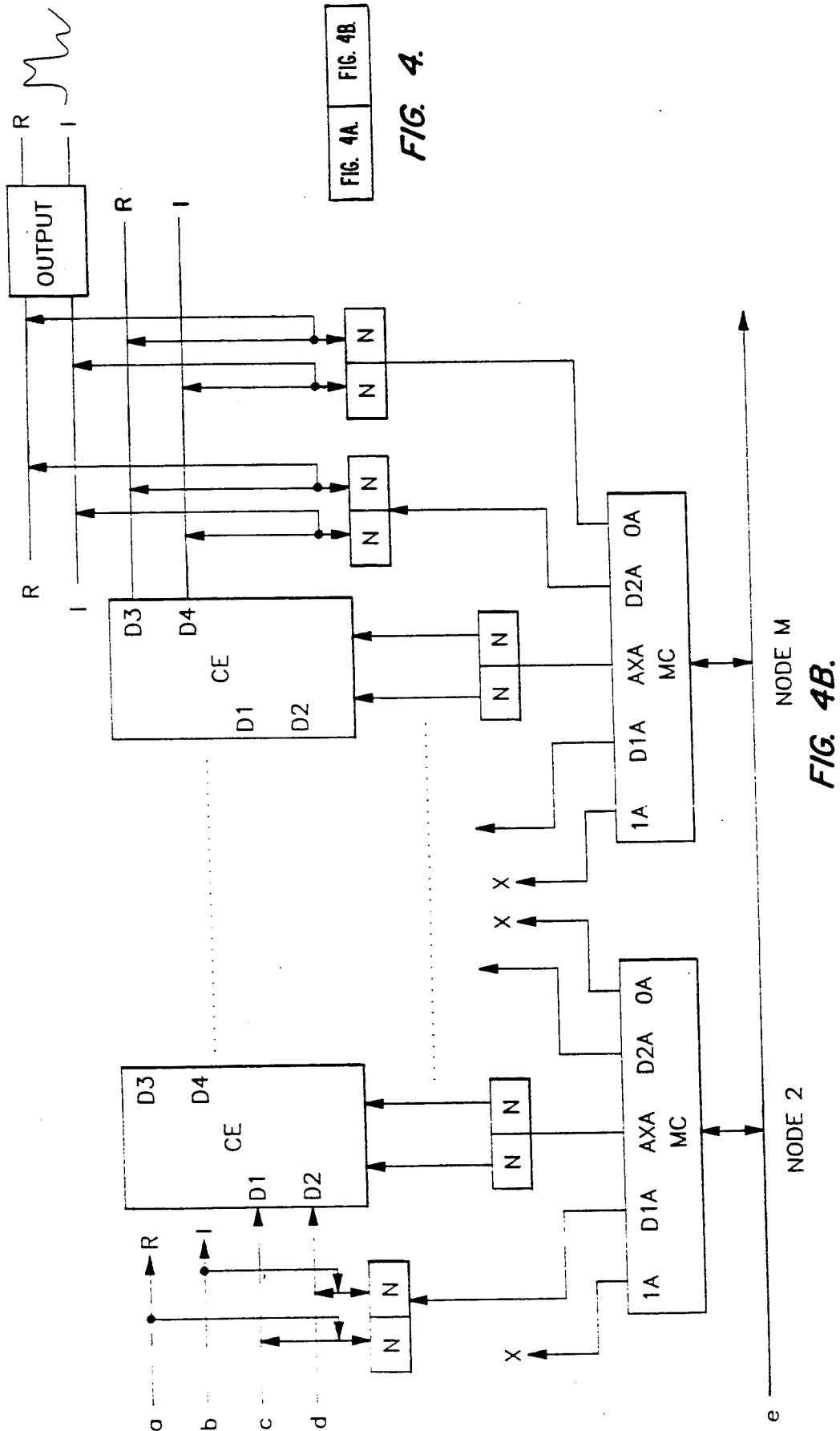

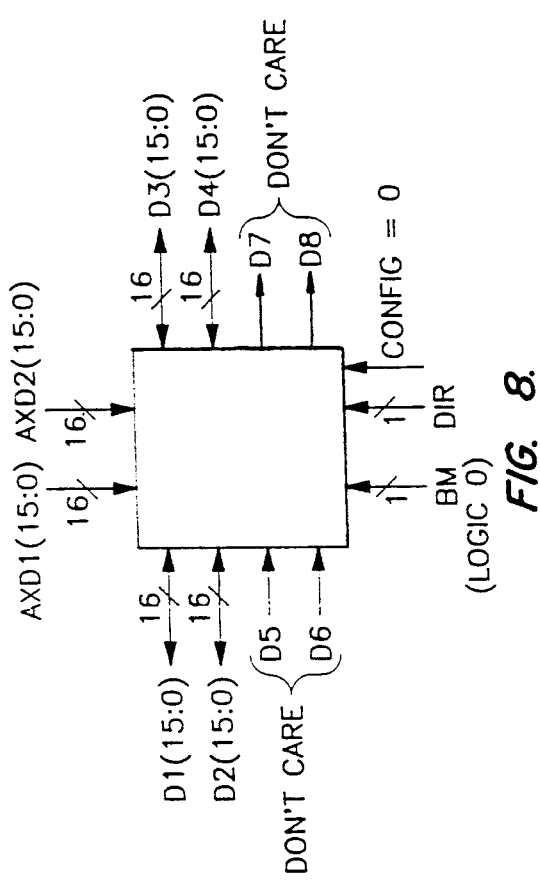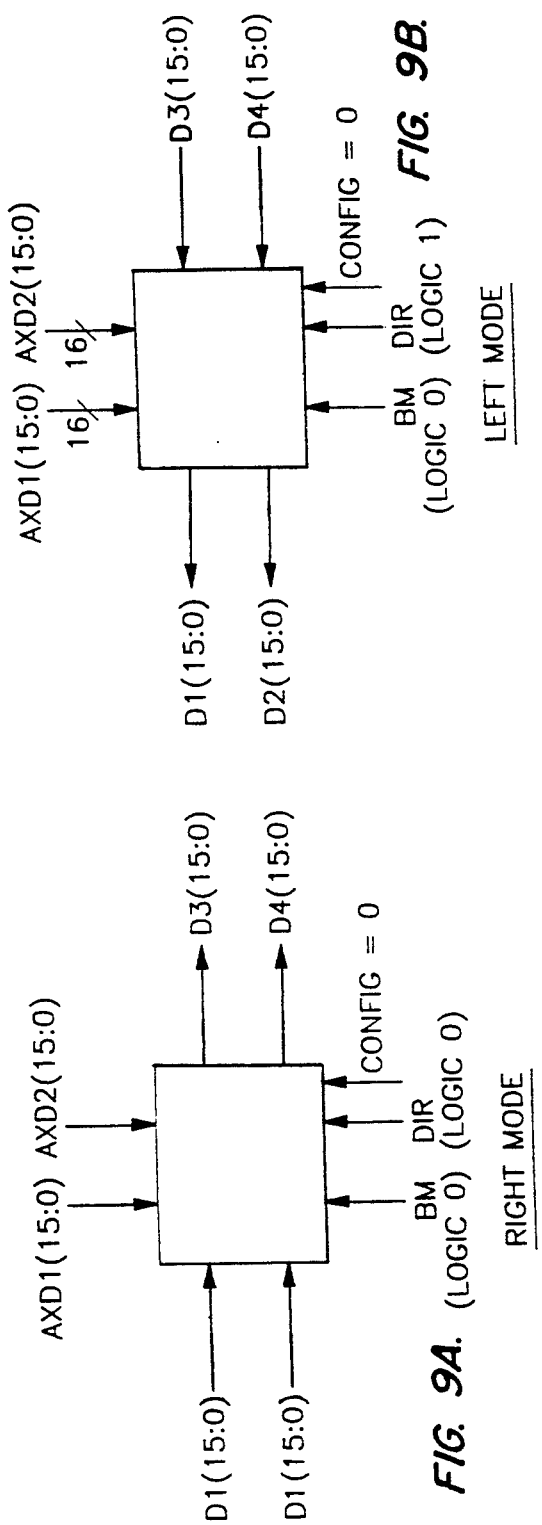

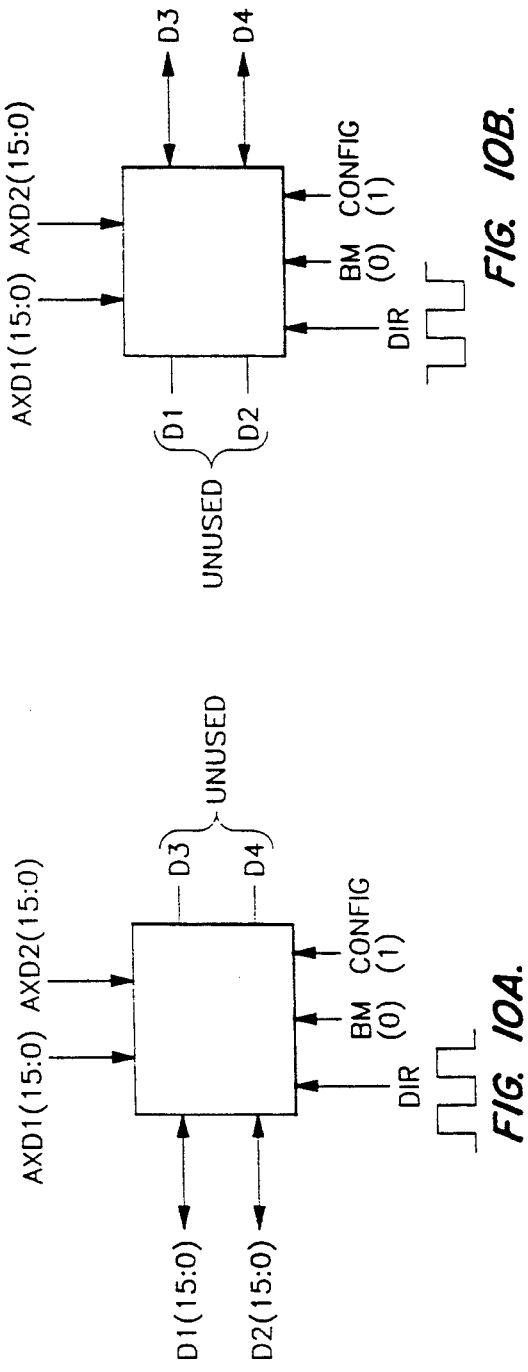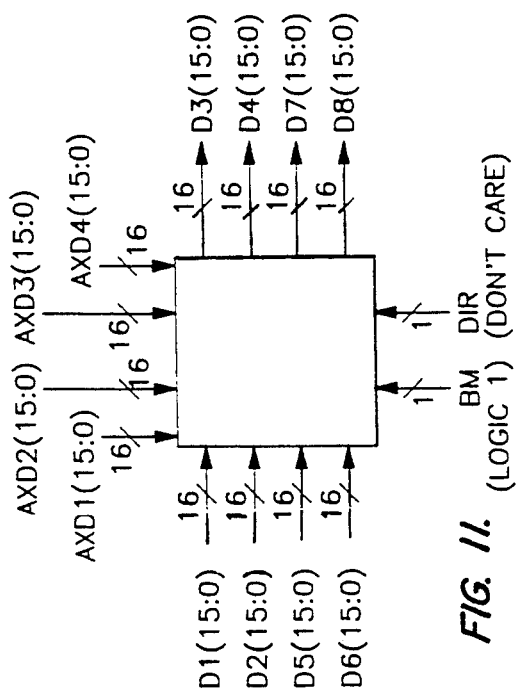

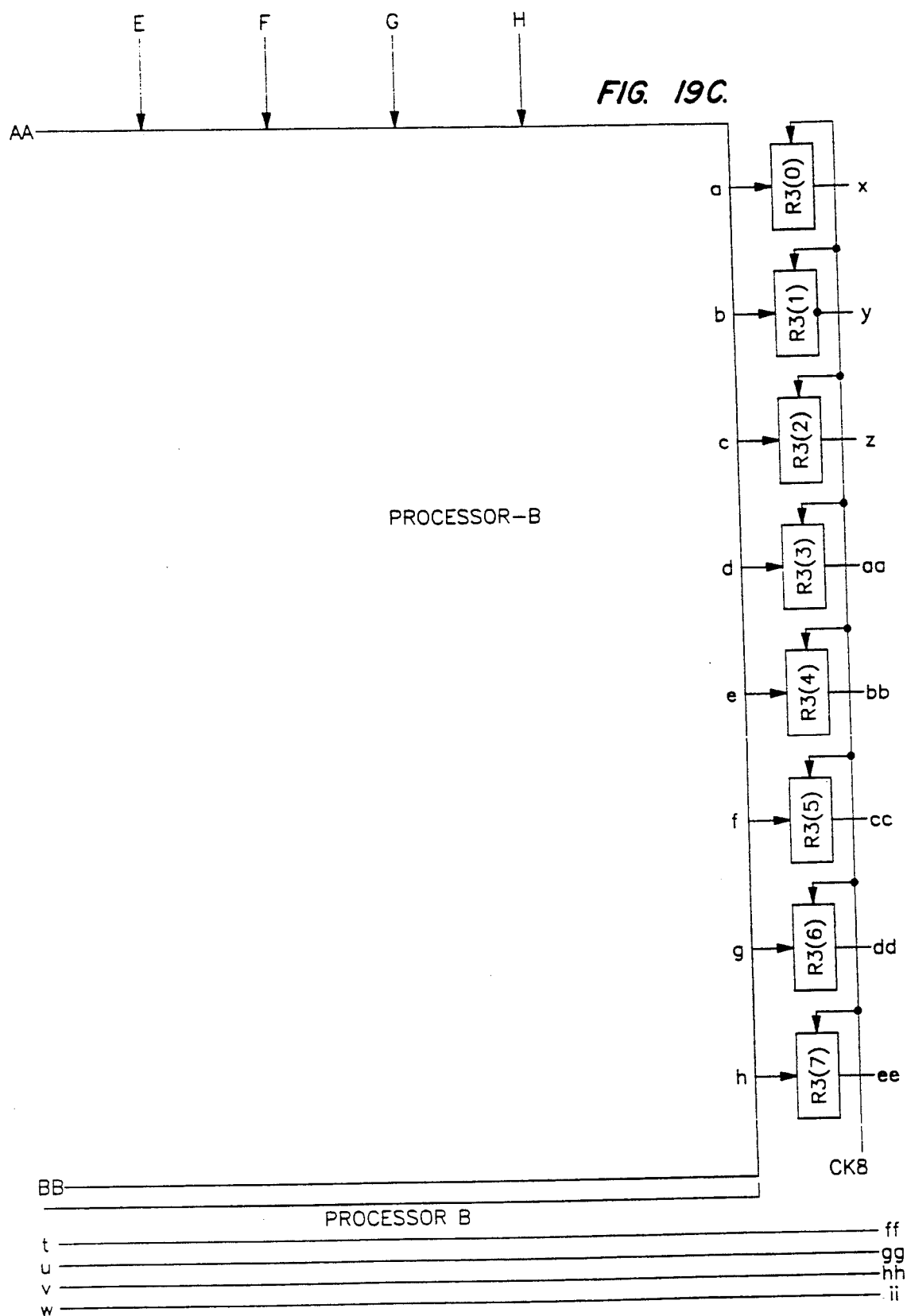

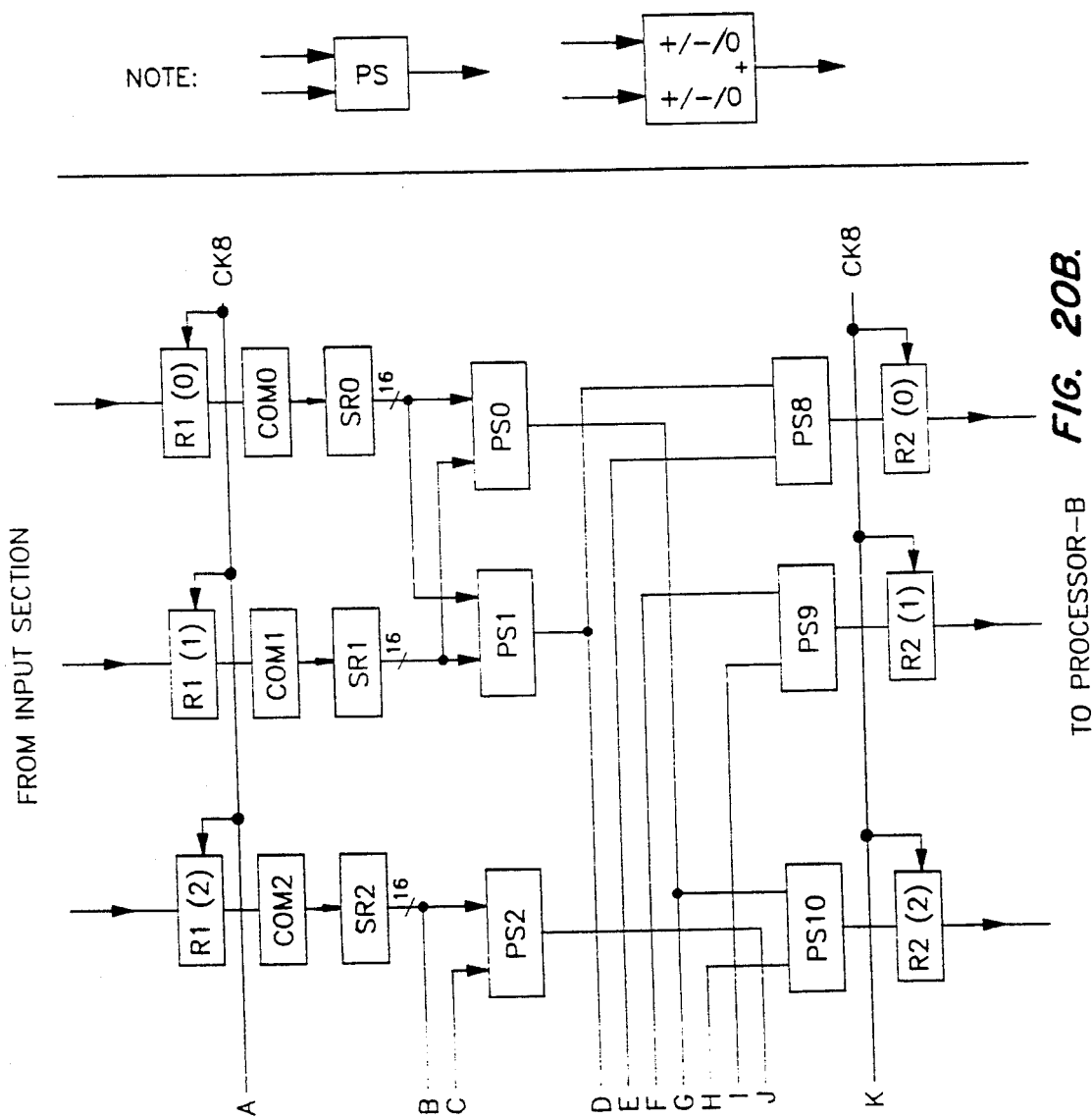

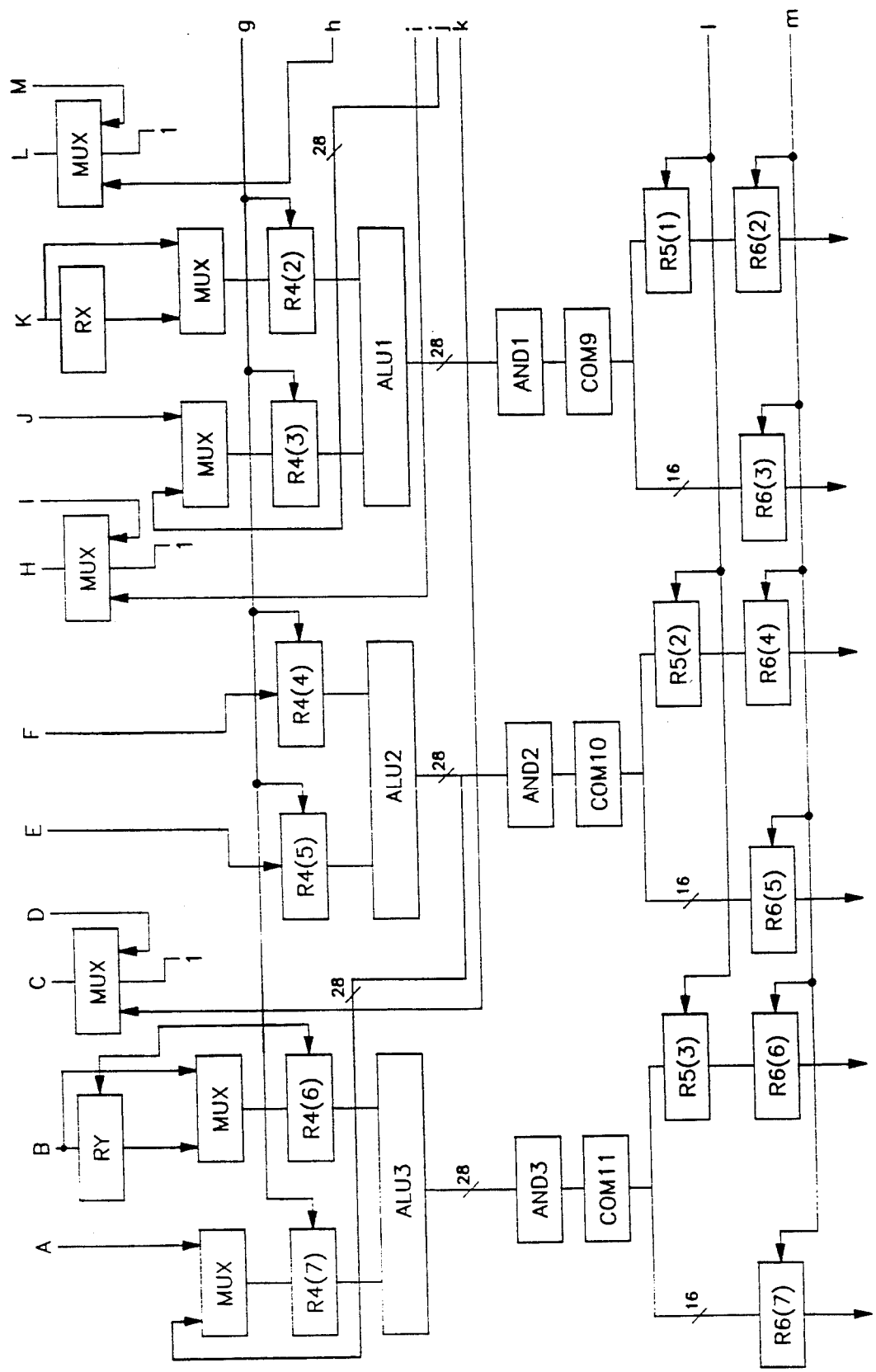
FIG. 21B. TO OUTPUT SECTION

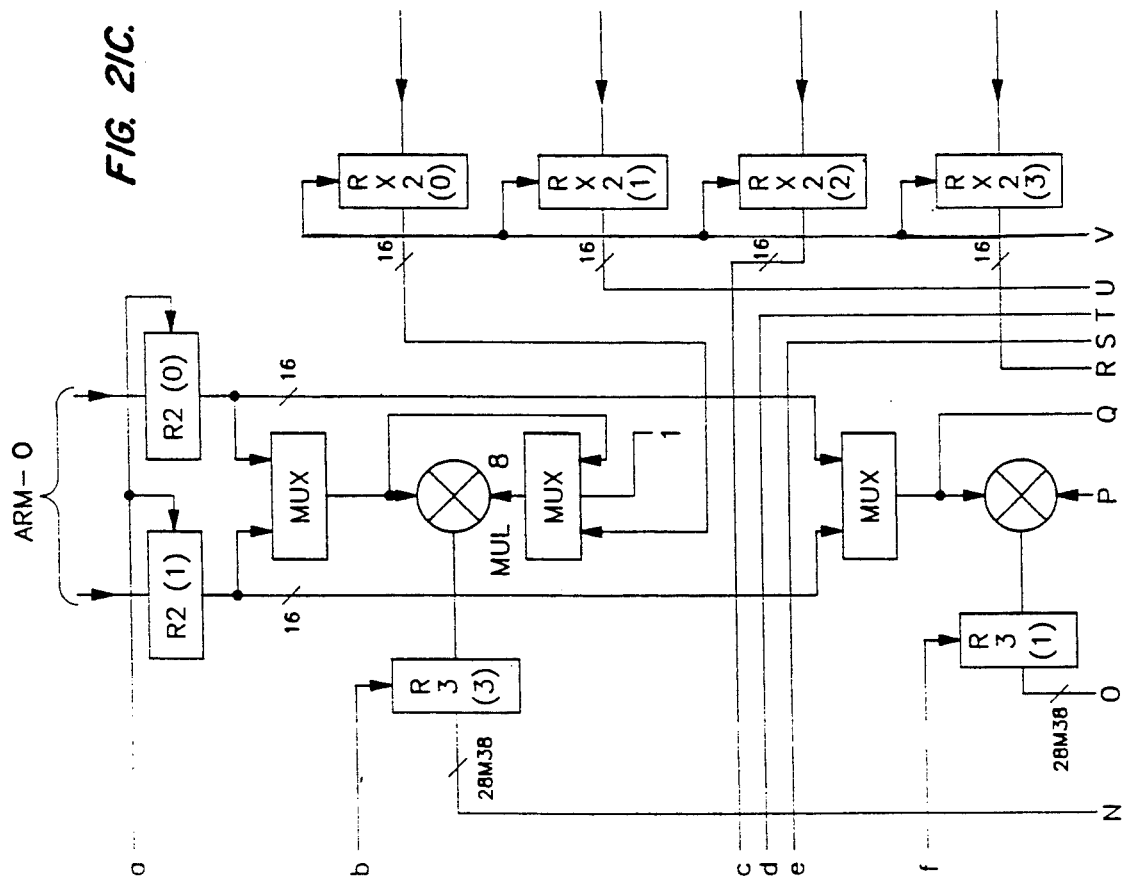

PIPELINED COMBINATION AND VECTOR SIGNAL PROCESSOR

BACKGROUND OF THE INVENTION

1. Field of the Invention

The present invention relates to an apparatus and method for performing digital signal processing, and in particular, for performing the fast Fourier transform (FFT).

2. Description of the Related Art

The fast Fourier transform is a common digital processing technique for use in performing, for example, spectral analysis and filtering of digital data. Several applications, such as radar, sonar, communications surveillance, and image processing, require high speed digital signal processing in order to achieve the real-time performance required by these applications. Presently, however, the known hardware for performing a FFT on the data produced in these applications is physically quite large and very expensive. As a consequence, presently known hardware for performing FFT processing has proven to be impractical in many of these applications. Moreover, due to the relatively large size of the hardware, typically covering several printed circuit boards and possibly including several racks of equipment, propagation delays associated with transferring information between the various elements comprising the FFT processing hardware and the like have steadily eroded the ability of the hardware to accommodate the eve increasing data rates employed in the aforementioned types of applications. Consequently, there is a need for a device for accomplishing FFT processing that addresses the drawbacks associated with the size of presently known FFT processing hardware. Additionally, there is a need for a device for accomplishing FFT processing that is less expensive than presently known FFT devices.

In many digital signal processing applications, the digital data must be subjected either before or after the FFT to a related FFT operation, such as windowing, in order to achieve the desired result. Presently known FFT processing hardware does not incorporate the ability to perform these related FFT functions. Consequently, to implement related FFT functions, additional hardware must be interfaced with the FFT processing hardware. Due to the size of presently known FFT processing hardware and the time constraints that the size of the FFT processing hardware imposes, the need to incorporate additional hardware to realize related FFT functions further reduces the speed at which such systems can operate as well as adds to the complexity of the system. Consequently, such systems are unsuitable for many of the aforementioned high-speed real-time applications. Based on the foregoing, there is also a need for a device that integrates the ability to accomplish an FFT with related FFT functions that are typically employed in digital signal processing.

In digital signal processing applications, such as graphics, it is typically necessary to subject the digital data to a vector add/subtract and bit-wise logical operation, for example. Presently known digital signal processing hardware implements these types of operations or functions discretely. This lack of integrated functionality requires that several separate pieces of hardware be incorporated into the digital signal processing system to realize the required functionality for many applications. As with the related FFT functions, this typically renders the resulting system unsuitable for many high-speed applications as well as increases the complexity of such systems.

In many applications, the digital data on which an FFT is to be performed lacks any imaginary component, i.e., the digital data includes only a real component. In these instances, a FFT can be more efficiently or quickly performed on the digital data using the FFT2N algorithm, which recombines a FFT of N complex-points into a FFT of 2N real points, to realize an increase in throughput. The FFTNN algorithm, which recombines an FFT of N complex-points into two separate N real-point FFTs, provides similar benefits in the appropriate situation. Many applications for FFT processing are quickly approaching the point where the increase in throughput realized by implementing the FFT2N and/or FFTNN method will be needed to realize real-time constraints and/or provide additional time for further processing of the digital data.

Most, if not all, of the known processors for implementing the FFT achieve a defined arithmetic precision using a fixed point integer/fixed scaling method. The use of a fixed point integer/fixed scaling method, however, limits the dynamic range and numerical accuracy of the information produced by the processor. Consequently, there is a need for a processor for performing FFT functions where the numerical accuracy and dynamic range of the information produced by the processor is increased relative to known FFT processors.

Presently known digital signal processors employ one unidirectional bus to transfer data from an input memory to the processor and another unidirectional bus is used to transfer data from the processor to an output memory or employ a single bidirectional bus to alternatingly read and write to a single input/output memory. Many applications require recursive processing of data where the data output by the processor during one iteration of the recursive processing becomes the input data for a subsequent iteration. In FFT processors that employ separate unidirectional buses, recursive processing typically requires hardware for moving data from the output memory to the input memory for each iteration. The need for this additional hardware typically results in a reduction in throughput as well as increasing the complexity and cost of the processing hardware necessary to implement recursive processing. FFT processors that employ a single bidirectional bus are inherently performance limited by their inability to simultaneously perform input data transfers and output data transfers. Consequently, there is also a need for a digital signal processor that increases the throughput or speed at which recursive processing can be accomplished.

Most, if not all, digital signal processors support only one mechanism to transfer data into and out of the digital signal processor. To increase performance in such a situation, the speeds of all data transfer buses and input/output memories must be increased proportionately, with performance normally being limited by available memory speeds. In many situations, however, employing high speed input/output memories leads to an unacceptable increase in the cost of a digital signal processing system. Consequently, there is also a need for a digital signal processor that supports multiple mechanisms to transfer data into and out of the digital signal processor and, in so doing, allows a digital signal processing system to be constructed that accommodates available memory speeds and/or cost constraints.

BRIEF SUMMARY OF THE INVENTION

The present invention provides an apparatus and method for use in performing digital signal processing and, in particular, for performing the fast Fourier Transform.

The invention includes a single integrated chip that incorporates most, if not all, of the components necessary to perform a FFT on a signal array. By integrating several of the components necessary to perform a FFT onto a single chip, the speed at which a FFT can be performed is increased due to the reduction in propagation delay and the like. Moreover, a single integrated chip significantly reduces the complexity and expense associated with assembling a digital signal processing system.

In a preferred embodiment of the invention, the single integrated chip incorporates an architecture that allows a radix-4 FFT to be realized. The radix-4 FFT requires fewer "butterfly" operations than the radix-2 FFT. Consequently, the radix-4 FFT can, at least conceptually, perform a FFT on a signal array of a given size faster than a radix-2 FFT. However, the radix-4 FFT requires a large number of multiplication and addition operations that in known FFT processors have been implemented using several discrete devices. This discrete implementation results in propagation delays and the like that have limited the speed advantage of known radix-4 FFT systems relative to systems that implement the radix-2 FFT. The present invention, however, implements an architecture that allows most, if not all, of the hardware necessary to accomplish a radix-4 FFT to be integrated onto a single chip and thereby realize at least some of the aforementioned speed advantage.

Yet another embodiment of the invention integrates the ability to accomplish at least one related FFT function, such as windowing, with the FFT processing hardware onto the aforementioned single chip. By integrating the related FFT function and the FFT function onto the same chip, the time necessary to accomplish both the related FFT function and the FFT function is reduced relative to known digital signal processing systems that utilize both functions. Additionally, the present invention reduces the cost and complexity associated with digital signal processing systems that require both the ability to perform a FFT and a related FFT function.

A further embodiment of the invention integrates the ability to accomplish non-FFT related functions, such as vector add/substract and bit-wise logical functions, onto the same chip as the FFT processing hardware. Integration of the ability to accomplish a non-FFT function and the FFT function decreases the time necessary to perform the non-FFT function and the FFT function in digital signal processing systems that require both functions as well as decreases the cost and complexity of such systems.

A further embodiment of the invention includes an architecture where at least one of the FFT2N and the FFTNN functions is realized. The implementation of the FFT2N and/or FFTNN allows an FFT of digital data that includes only real components to be accomplished more efficiently or expeditiously than if one of these functions were not employed.

A further embodiment of the invention includes an automatic block floating point scaling feature that substantially increases the dynamic range and numerical accuracy of the invention with respect to known FFT processors.

Yet another embodiment of the invention includes at least two bidirectional buses that can be used, for example, in recursive processing of digital data. In operation, one bidirectional bus transfers digital data from one memory to the processor and another bidirectional bus transfers digital data from the processor to another memory. At a later time, the direction in which the bidirectional buses transfer data can be reversed, i.e., the bidirectional bus that was previously transferring digital data to the processor now receives digital data from the processor and the bidirectional bus that was previously receiving digital data from the processor now provides digital data to the processor. By employing two bidirectional buses, the speed with which recursive processing and the like can be accomplished relative to known digital processing systems can be increased. Moreover, the present invention reduces the complexity and cost associated with implementing a recursive digital signal processing system or other digital signal processing system where the flexibility afforded by bidirectional buses is desirable.

Yet a further embodiment of the invention includes at least two mechanisms for transferring data into and out of the processor. In the preferred embodiment of the invention, the first mechanism supports the transfer of four complex data values, i.e. four data values that include a real component and an imaginary component, to or from the processor using four data buses, where each bus is capable of transferring half the number of bits of a complex data value. The first mechanism is typically referred to as the "Quad I/O mode". The second mechanism supports the transfer of four complex data values to or from the processor using two data buses, where each data bus is capable of transferring half the number of bits of a complex data value. The second mechanism is generally referred to as the "Dual I/O Mode". For the two mechanisms to have comparable performance, the speeds of the buses and memories used in the "Quad I/O Mode" need be only half that of the buses and memories used in the "Dual I/O Mode". As a consequence, less expensive memories can be used in the "Quad I/O Mode". However, the overall complexity of the memory system used to support the "Quad I/O mode" is typically greater than that of the memory system used to support the "Dual I/O Mode". Therefore, by supporting at least two mechanisms for transferring data to and from the processor, the present invention allows a digital signal processing system to be constructed where the user can trade off memory system complexity against memory speed and the cost associated with increasing memory speed.

BRIEF DESCRIPTION OF THE DRAWINGS

FIGS. 4 and 4A-B are a block diagram of a Cascaded-Memory FFT System;

FIG. 8 illustrates the Quad—I/O CE in the Dual I/O Mode;

FIGS. 9A-B illustrate the CE in the left and right direction modes;

FIGS. 10A-10B illustrate the CE configured for a single memory system;

FIG. 11 the Quad—I/O CE in the Quad I/O Mode;

FIGS. 19 and 19A-G are a block diagram of the I/O architecture of the CE;

FIGS. 20 and 20A-B are a block diagram of Processor A;

FIGS. 21 and 21A-D are a block diagram of Processor B;

DETAILED DESCRIPTION OF THE PREFERRED EMBODIMENT

Notes

Figure 1:
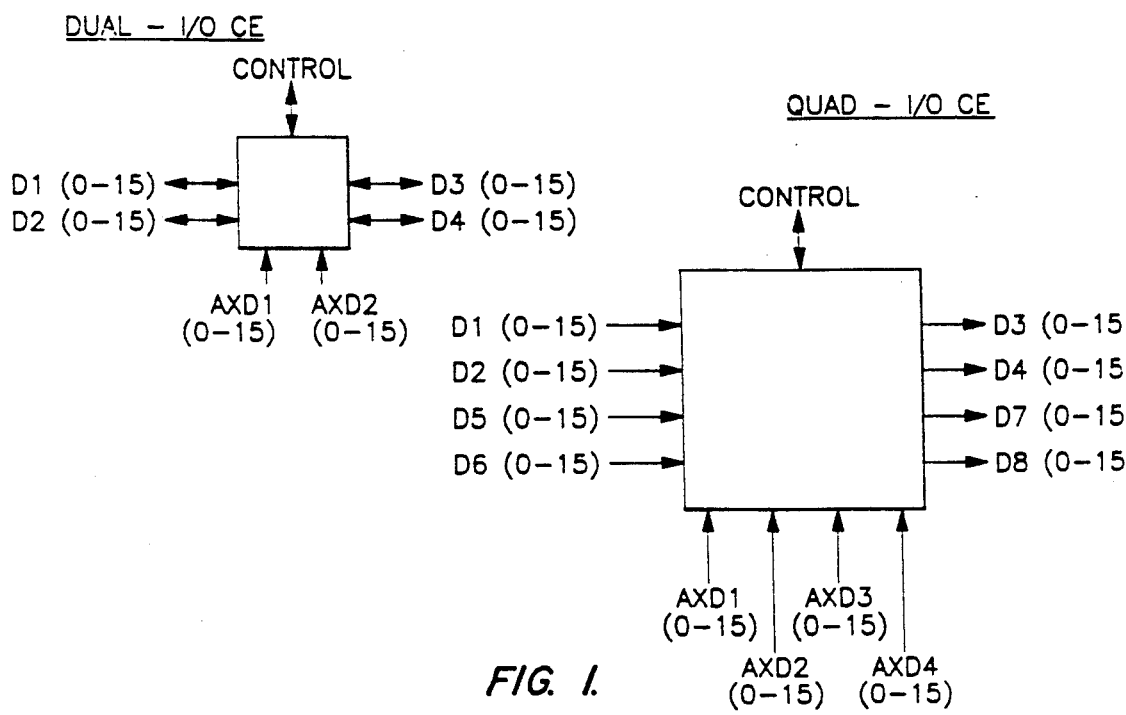
FIG. 1 are block diagrams of the Dual—I/O Computational Element (CE) and the Quad—I/O CE.

1. The High Performance Vector Array processor (VASP) is also referred to as the CE (Computational Element) through out these specifications.

2. In bit allocations, the bit 0 always refers to the least significant bit.

Contents 1.0 INTRODUCTION
  1.1 INTRODUCTION—CE
    1.1.1 CE—Input/Output
    1.1.2 CE—Other Architectural Aspects
  1.2 MC—INTRODUCTION
    1.2.1 MC—Architecture
  1.3 FFT SYSTEM CONFIGURATIONS
    1.3.1 Mid-Performance System
    1.3.2 High-End System
    1.3.3 Low-End System
    1.3.4 Low-End Non-Real-Time System
    1.3.5 FFT System Performance
  1.4 QUAD MODE MC
2.0 CE—ARCHITECTURE
  2.1 OPERAND FORMATS
  2.2 BASIC ARCHITECTURE
  2.3 INPUTS/OUTPUTS—BM PIN
    2.3.1 Dual I/O Mode—DIR Pin and CONFIG Pin
    2.3.2 Quad I/O Mode
  2.4 THE CLOCK SIGNALS
  2.5 DEFINITION OF I/O OPERANDS
    2.5.1 Input/Output—Timing
  2.6 INPUT/OUTPUT—ARCHITECTURE
    2.6.1 Data Input Section
    2.6.2 Auxiliary Data Input Section
    2.6.3 Data Output Section
  2.7 INSTRUCTION-SET: OPCODES AND SUMMARY
  2.8 PROCESSOR A—ARCHITECTURE
    2.8.1 Input Complementers
    2.8.2 Shift And Round
    2.8.3 Sum Stages
    2.8.4 Definition of Intermediate Operands
  2.9 PROCESSOR B—ARCHITECTURE
    2.9.1 Processor B: Normal Mode
    2.9.2 Processor B: Paired Mode
    2.9.3 Processor B: Round And Complement
  2.10 SCALE FACTOR GENERATOR
    2.10.1 The Magnitude Detector
    2.10.2 Scale Factor Accumulator
  2.11 OVERFLOW SIGNAL—OVF
  2.12 VARIOUS SIGNALS AND PIPELINING
    2.12.1 General Pipelined Signals
    2.12.2 Reset Signal
    2.12.3 BM And CONFIG signals
    2.12.4 DIR Signal
    2.12.5 COMP(7:0) Signals
    2.12.6 Pipelining Timing Diagrams (CONFIG=0)
    2.12.7 Pipelining Timing Diagrams (CONFIG=1)
    2.12.8 Processor-Pipelining Timing
  2.13 NON-FUNCTIONAL TESTING
  2.14 COMPLETE BLOCK DIAGRAM
3.0 INSTRUCTION-SET
  3.1 INSTRUCTION BFLY4
  3.2 INSTRUCTION BFLY2
  3.3 INSTRUCTION FFT2N 3.4 INSTRUCTION FFTNN
3.5 INSTRUCTION AFLOW
3.6 INSTRUCTION BMUL
3.7 INSTRUCTION BSQSM
3.8 INSTRUCTION BADD
3.9 INSTRUCTION BSUB
3.10 INSTRUCTION BCONJ
3.11 INSTRUCTION BCONS
3.12 INSTRUCTION BCMUL
3.13 INSTRUCTION LFLOW
3.14 INSTRUCTION BAND
3.15 INSTRUCTION BOR
3.16 INSTRUCTION BXOR
3.17 DATA FLOW DIAGRAMS
APPENDIX A: DATA FLOW DIAGRAMS
APPENDIX B: LOGIC AND TRANSISTOR DESIGNS FOR MULTIPLIER AND ALU

1.0 INTRODUCTION

The Discrete Fourier Transform (DFT) is commonly used in a variety of Digital Signal Processing (DSP) Systems. The Fast Fourier Transform (FFT) algorithm is frequently used for computing the DFT due to its computational efficiency. The Signal Processing Technologies (SPT) group of Honeywell proposes the design of two VLSI devices targeted for applications in high performance FFT and other DSP systems. Both devices will utilize 1.2 u CMOS dual-level-metal process which has been developed along with the VHSIC process at Honeywell. The process has been in production for several years.

One of the devices, named Computational Element (CE), provides a high speed computing engine for DSP systems. The other device, termed Micro Controller (MC), integrates various address generators and controlling functions, which are commonly used in the FFT systems. Extremely fast and self contained systems could be designed by combining CE and MC devices with off-the-shelf memory devices. The system performance can be traded against choosing the number of CEs, MCs and memory devices in a given system. For example, the chip-set can implement FFT systems ranging from 4 complex-points to 64K complex-points. A 1024 complex-point FFT, for example, can be performed in 20 micro Seconds (uS) using a trivial amount of hardware.

This document is dedicated to the description of specifications of the CE device. However, a brief introduction of both the CE and MC, and their applications to the FFT systems, as an example, will be presented briefly in this chapter. The detailed specifications of the MC device can be found in a separate document.

1.1 CE—INTRODUCTION

The CE is a highly integrated, application specific, semi-programmable, computational device containing several multipliers, adders and registers. The device can perform a variety of FFT-specific and general purpose DSP operations, including logical operations at extremely high speed. For example a radix-4 butterfly or, a block of four complex-multiplies, can be performed in 80 nS (a Machine Cycle) in a pipelined mode. The machine cycle of the device, which is specified to be 80 nS, is termed Tm. Basically, the device accepts two sets of four complex-data values and produces one set of four complex-data values every machine cycle, in a pipelined mode. Its block floating point 16 bit parallel architecture is optimized to implement the following FFT specific functions on a single chip.

a. Full radix-4 butterfly: A single column of the radix-4, N complex-point FFT takes N/4 * Tm nS.
b. Two full radix-2 butterflies: As radix-4, a single column of radix-2, N complex-point FFT takes N/4 * Tm nS.
c. Block Multiply on four pairs of complex-data values: It is useful for windowing, complex modulation/demodulation, etc. It takes a total of N/4 * Tm nS to window or multiply N complex-data values. The windowing operations are typically performed prior to FFT.
d. Square-Sum four complex-data values: As before, it takes a total of N/4 * Tm nS to square-sum N complex data values. Such operations are normally required after the FFT for magnitude-square computation.
e. Trigonometrical recombination to implement two N real-point FFTs on a N complex-point FFT machine: Once again, it takes N/4 * Tm nS to produce two N real-point FFTs from a N complex-point FFT.
f. Trigonometrical recombination to implement a 2N real-point FFT from a N complex-point FFT: In this case, the CE operates on two complex data values and produces one complex data value. Therefore, it takes a total of N * Tm nS to produce a 2N real-point FFT from a N complex-point FFT.
g. The CE has several other provisions to help FFT system implementations, such as commands to conjugate input/output to implement inverse FFTs.

In addition, the CE has a variety of general purpose functions available such as Block-Add, Block-Subtract, Block-AND, Block-EXOR. These functions operate on blocks of four complex values every machine-cycle.

1.1.1 CE—Input/Output

As stated in the previous section, four complex data values flow through the CE every machine cycle. All the data input and output operations on the CE are performed over multiple 16—bit parallel buses. There are two different bond-out versions of the CE to support two types of external bus/memory system architectures as shown in FIG. 1. The dual I/O CE is configured around four data buses called D1, D2, D3 and D4. It also has two auxiliary data input buses AXD1 and AXD2 for feeding twiddle factors, etc. At any time, the pair D1 and D2 could be receiving the data while the pair D3 and D4 could be outputting data. The role of this pair of buses could be reversed at any machine cycle via an instruction. The dual I/O CE accepts a complex value every Tm/4 nS, over each pair of its input buses. Therefore, a set of four complex values are inputted every Tm nS over input bus pairs. Similarly, the device outputs a complex value on its pair of output buses every Tm/4 nS, producing a set of four complex values every Tm nS. At maximum clock rate (Tm=80 nS), each bus operates at 50 MHz (20 ns per 16 bit transfer). A system operating at such rate will require memories with access time around 10 ns which is prohibitive at present. Practically, a system can be designed with buses operating at 33.3 MHz (30 ns per transfer, Tm=120 nS) using state-of-the-art memories. A 50 MHz system will become possible in the next couple of years.

The quad I/O version of the CE will be available in a larger package. The quad I/O CE, which is shown in FIG. 1, contains four data input buses (D1, D2, D5, D6)

and four data output buses (D3, D4, D7, D8). The twiddle factors, etc. are fed over four auxiliary buses AXD1, AXD2, AXD3, and AXD4. In this case, each bus is operated at a rate of 25 MHz since the number of buses have been doubled. In the first half of the machine cycle, four real inputs are fed to the device. The corresponding four imaginary inputs are fed in the latter half of the machine cycle. The outputs are produced in the same sequence on the output buses. The role of the input and output buses can not be reversed in the quad I/O mode.

The dual I/O version of the CE could be used to design very flexible FFT and other DSP systems by using off-the-shelf single-port memories. This is possible because the dual I/O CE transfers one complex value at a time, the real and imaginary part of which are stored at the same address. In addition, its lower pin count (144 pin package) makes it very attractive for system design. Initially, the device will be packaged in a PGA package and a surface mount version will be made available at a later stage. On the other hand, the quad I/O version of the CE is attractive due to somewhat relaxed memory access time. However, it leads to a larger package (244 pins) which makes it prohibitive in a surface mount package for some time. Also, a four port memory system may be required when standard FFT algorithms are used because it deals with parts of four complex numbers at a time.

1.1.2 CE—Other Architectural Aspects

Apart from different I/O versions, both versions of the CE have identical internal data paths. A series of magnitude-detectors are provided at the output data stages of the CE which continuously monitor the upper 6 bits of the output data array for FFT operations. A scaling factor is produced after processing a column of N complex-point data array. The scaling factor is used to scale the data array on the input stage of the next pass by the input scalers (shift and round mechanism), included on the chip. It protects the CE adders from overflowing during the computation by providing conditional scaling. An accumulated scale factor is available at the beginning of each Pass, which should be effectively treated as an exponent for the normalization of the processed array of data. The scheme is referred to as Block Floating Point in the literature.

1.2 MC—INTRODUCTION

The FFT Micro Controller (MC) is a device which provides all the addressing sequences required to address the memory devices associated with a FFT system. It is intended to be a companion device for the DUAL I/O version of the CE device for FFT applications only. It generates the necessary addressing sequences and control signals for the DUAL I/O CE and associated memories minimizing external glue logic. Typical FFT systems can be built by using the CE, the MC and off-the-shelf memories. The MC is designed to generate the following addressing sequences supporting FFT systems up to 64K complex-points.

a. Data and twiddle factor addresses for radix-4, in-place Decimation-in-Frequency (DIF) FFT algorithm.
b. Data memory and twiddle-factor addresses for radix-2, in-place DIF FFT algorithm.
c. Sequential addresses which are useful for windowing and square-summing, etc.
d. Addresses required for sequencing data for trigonometrical recombination associated with formation of 2N real-point FFT from a N complex-point FFT.
e. Addresses required for sequencing data for trigonometrical recombination associated with formation of two separate N real-point FFTs from a N complex-point FFT.
f. Sequential addresses to address input-data collection memory and output data memory. The output address may be digit-reversed if desired.

1.2.1 MC—Architecture

Figure 2:
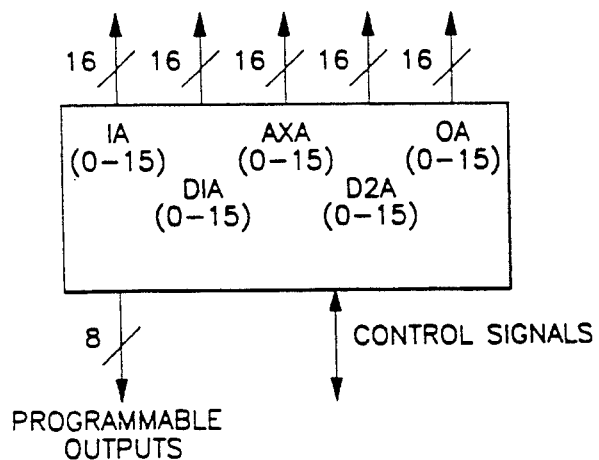
FIG. 2 is a block diagram of the Micro-Controller (MC)

A block diagram of the MC is shown in FIG. 2 illustrating various buses and control signals. The device produces five 16 bit address outputs, labeled as IA(15:0), D1A(15:0), AXA(15:0), D2A(15:0) and OA(15:0). Each bus produces addresses at a rate of 50 MHz, matching the speed of dual I/O CE device. The IA bus produces sequential addresses needed to collect the input data while previous data is being transformed. The D1A and D2A buses produce read-data and write-data addresses corresponding to the FFT algorithm. Since, an in-place DIF FFT algorithm is employed by the MC, the read-address and the write-address patterns are the same but separated by a latency-factor associated with the CE and the rest of the system. The twiddle factor memory (Auxiliary data memory) address sequence is produced on the AXA bus. A sequential or digit-reversed address can be produced on the OA bus to read the output data memory, containing previously transformed data. In addition, the device produces various signals to control external bus-drivers, memory and the CE.

The device also has a host interface to communicate to a host microprocessor or a control memory. The host processor could use the IA bus as an address bus to address internal registers during initialization. The corresponding data is transferred over DIA bus in this case. If a processor is not employed in the system, the MC is capable of down loading itself from an external memory for stand-alone applications. Following are some of the registers of the MC which are down loaded initially:

a. FFT size register;
b. Latency factor register—determines the latency (due to the CE and external intermediate latches) between Read and Write addresses; and
c. Instruction Register File, etc.

The instruction register file contains a set of instructions to implement the desired FFT system configuration. A normal FFT system is composed of multiple "PASSES" of the N complex-point numbers through the CE; the PASSES being Windowing, FFT nodes, Square-Sum, etc. One instruction per pass is executed by the MC to appropriately manage the external memories and the CE. Each instruction contains information such as the following:

a. a code to route the outputs of internal address generators to appropriate external MC address pins; and
b. a code which is directly outputted on MC pins to control the CE, external memories, switches, etc.

The MC is packaged in a 132 pin package, dissipating less than 500 mW. Initially, the device will be available in a PGA package. A surface mount version will be made available at a later stage.

1.3 FFT SYSTEM CONFIGURATIONS

The MC and the CE can be used in a variety of system configurations providing various trade-offs between performance, hardware and cost. Following are some of the system configurations which could be produced by using the CE and the MC. The CE can be used in a variety of non-FFT systems by using the system architectures discussed here.

1.3.1 Mid-Performance System

Figure 3:
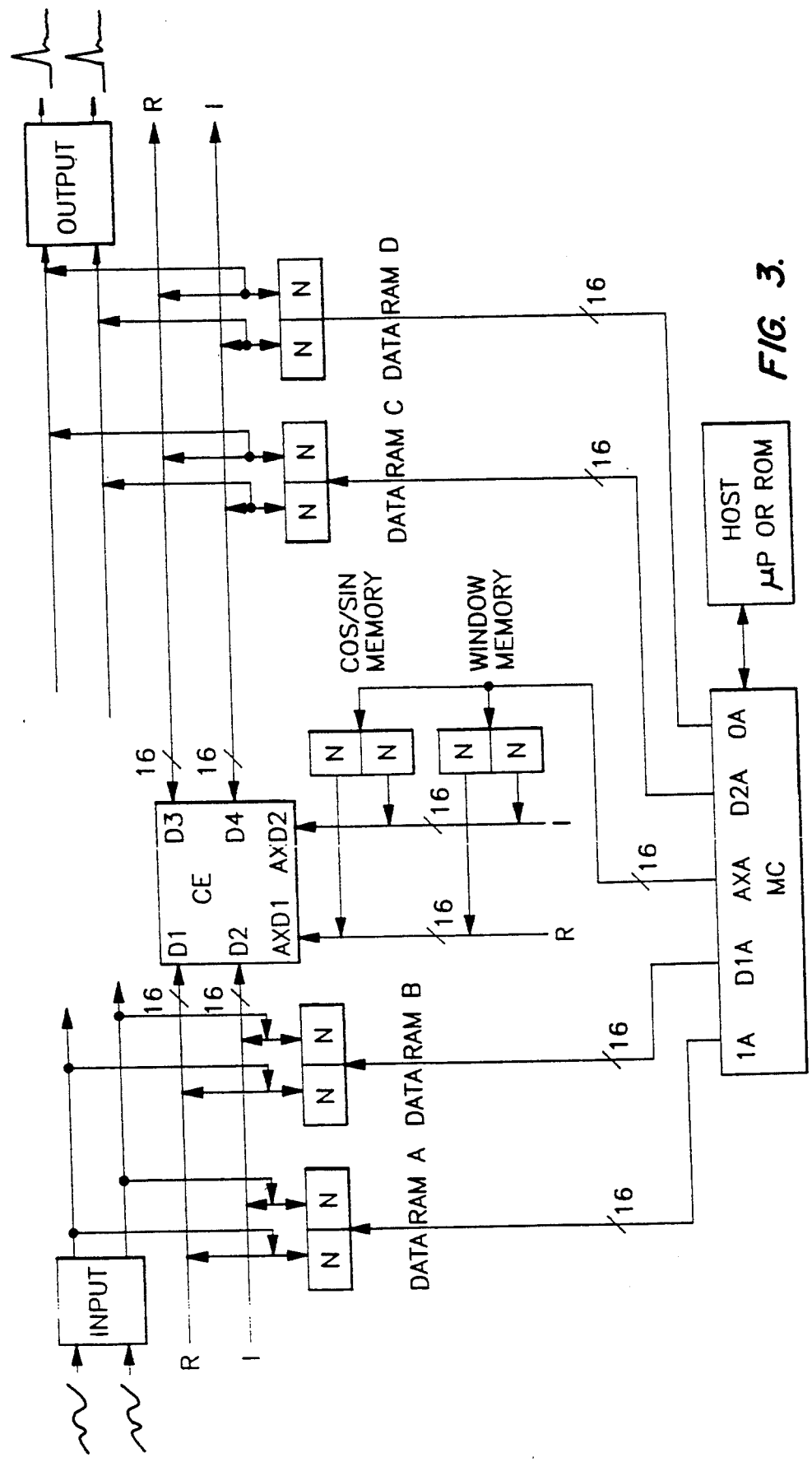
FIG. 3 is a block diagram of a Dual-Memory (ping-pong) FFT System.

A N complex-point FFT system is shown in FIG. 3 which is based upon a dual ping-pong memory architecture. Independent input and output buffer memories have been included for real time operation. At a given instance, while new data is being collected in memory A, previously transformed data is being read from output memory D. The IA and OA buses of MC supply the input and output memory addresses respectively. Meanwhile, current data is being transformed by the CE, supported by dual memories B and C. The data flows in a ping-pong fashion between memories B and C for multiple Passes. Each Pass of the N complex-point data can perform full windowing, or one column of the FFT, or square-summing, etc. At each pass address buses of the MC can be programmed to switch in a ping-pong fashion. In addition, the CE is also capable of interchanging its input/output data ports. Therefore, minimum external bus multiplexers are required. After a complete transform, the external data buses are switched around to interchange the role of the memories. It takes log4(N) passes through the CE to perform a N complex-point FFT using a radix-4 algorithm. Additional passes are needed for windowing and square/-summing if so desired. Note that each pass takes N memory cycles (N/4 machine cycles). A memory cycle is defined to be a read or a write operation.

1.3.2 High-End System

Figure 4A:
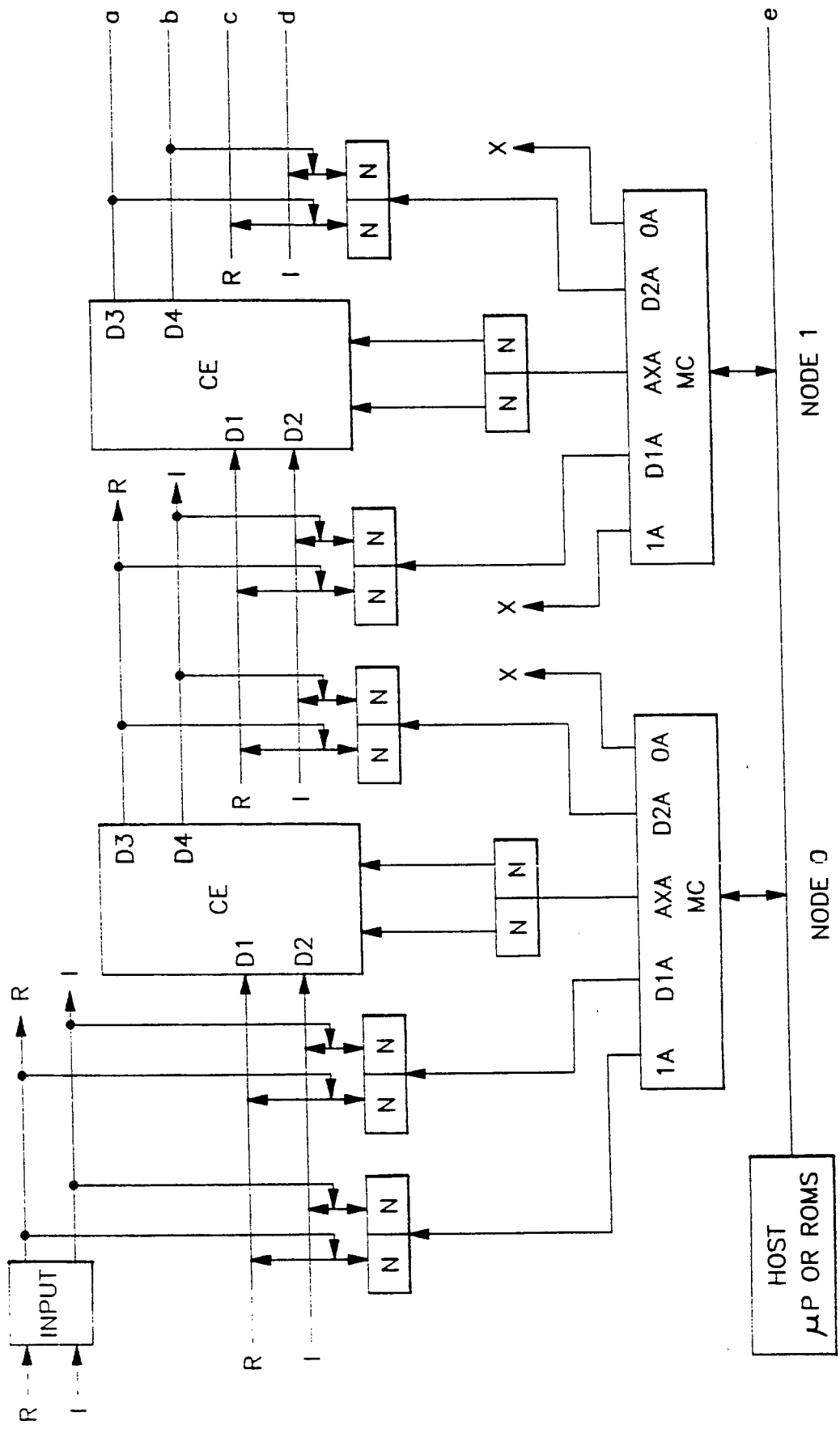

By employing one CE, one MC and two buffer memories for every node, a cascaded FFT system could be produced as shown in FIG. 4. The figure shows a N complex-point FFT system, illustrating M nodes. The first node is an input node performing windowing operation. The last node is an output node dedicated to square-summing. Intermediate nodes are dedicated to the FFT algorithm, each node corresponding to a column of FFT. Each FFT system node is double buffered with N complex-point data memories so that data flows through the CE as described in the previous section but in one direction. After completing each pass, the paired buffer memories are interchanged, maintaining a data flow from left to right continuously. Each MC can be programmed to internally switch the addresses on the buses D1A and D2A, etc. to match the interchanging of the memories at the end of each pass. The performance of such a FFT system corresponds to the time taken for one N complex-point pass (N memory cycles).

1.3.3 Low-End System

Figure 5:
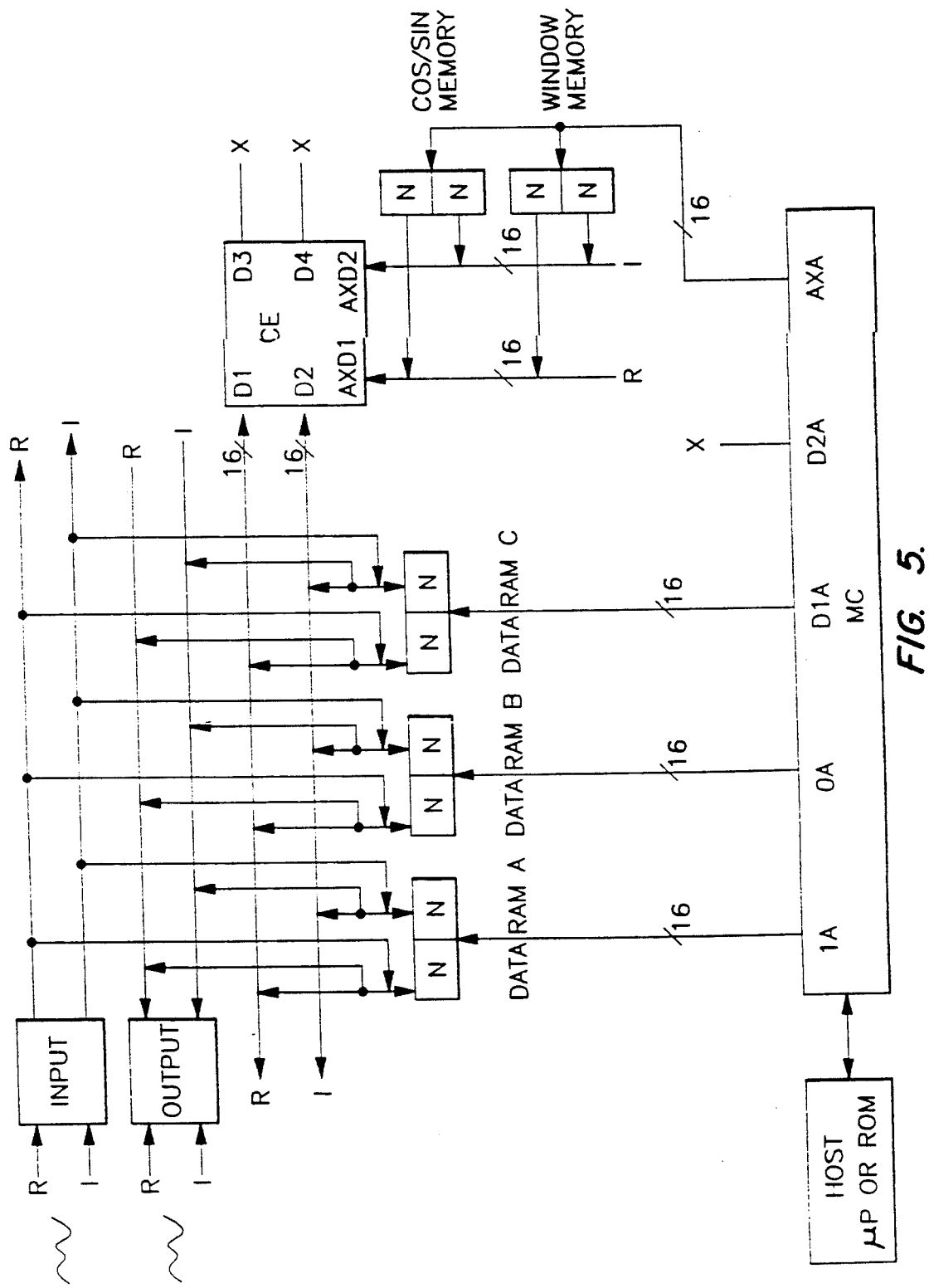
FIG. 5 is a block diagram of a One-Memory FFT System.

Since the MC employs an in-place FFT algorithm, FFT systems could be produced by using one memory system. A block diagram of such a system is shown in FIG. 5. Two additional memory systems have been included for the data-input and data-output maintaining a real-time operation. At any time, only one memory is connected to the CE. Both the read and the write operations have to be performed to that memory for every complex-point of data (two memory cycles). The MC automatically manages address buses for alternate read and write operations. It takes approximately 2N memory cycles for every pass of N complex-point data. Therefore, a total of 2N of log4(N) memory cycles will be required for a N complex-point FFT.

1.3.4 Low-End Non-Real Time System

Figure 6:
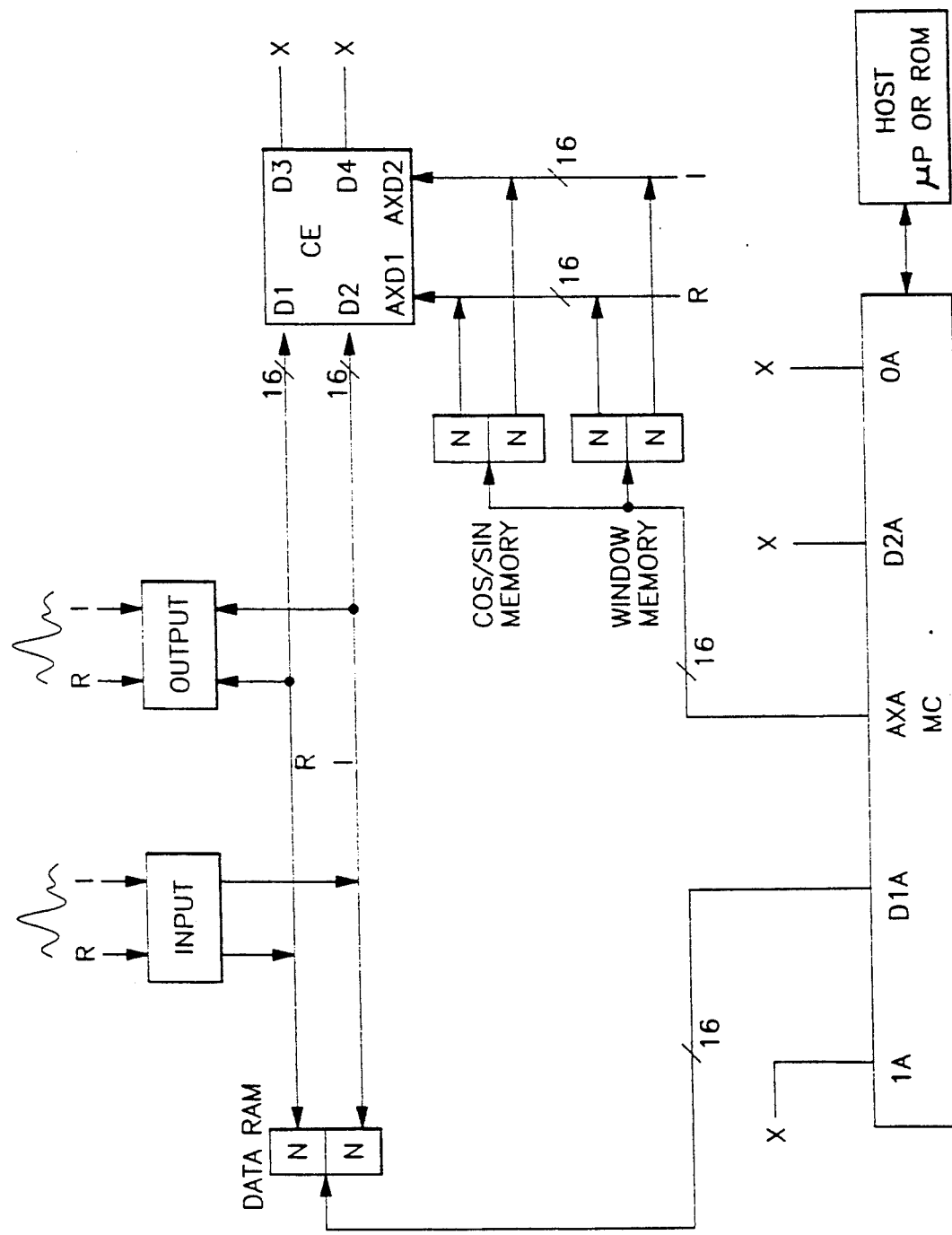
FIG. 6 is a block diagram of a Lower-End Non-Real Time System.

The lower-end system, described previously, can be collapsed to minimum hardware configuration by discarding the input and output memories as shown in FIG. 6. In this case, the MC can be programmed first to collect the input data in the data RAM. Then, data can be processed by making multiple passes through the CE. Finally, the data can be output to an external device. The MC can be programmed to generate all the address sequences on the D1A bus. The performance of such a system is similar to the previous system. However, additional time will be taken for the input and output.

1.3.5 FFT System Performance

A summary of FFT system performance, based on the CEs and the MCs is given in Table 1.1.

TABLE 1.1

| FFT - PERFORMANCE (APPROXIMATE) | | | |
|---|---|---|---|
| | HIGH-END SYSTEM | MID-RANGE SYSTEM | LOWER-END SYSTEM |
| N-Complex Point FFT | $N*M$ | $N*M*LOG_4N$ $+N*M*K$ | $2N*M*LOG_4N$ $+2N*M*K$ |
| N = 1024 Complex-Points, M = 20 NS K = 0 (No Window, Sq/Sum) | 20 · 48 μS | 102 · 4 μS | 204 · 8 μS |
| N = 1024 Complex-Points, M = 20 NS K = 2 (Window, Sq/Sum) | 20 · 48 μS | 143 · 36 μS | 286 · 72 μS |

Note:
M = Memory Cycle-Time (Read or Write)
N = Number of Complex Data Points
K = Additional Passes for Windowing. Square/Sum, etc.

The mid-range system offers a middle compromise between the amount of hardware and performance. It requires one CE, one MC, 24 memory chips and few bus drivers to implement a real-time FFT system, including the input/output data memories. The application of CE and MC is not limited to the system configurations here. Many other higher performance and intermediate performance configurations are possible due to the programmable nature of the MC and CE.

1.4 QUAD-MODE MC

The MC has been primarily designed to support the dual I/O CE for in-place, DIF, radix-4/radix-2 FFT systems. In dual I/O system, the MC is capable of producing four addresses per machine-cycle/per address-bus. However, four strobe signals have been provided to latch those four addresses into external registers in a machine cycle. The external registers could be used to address a four-port memory system, supporting the quad I/O CE.

2.0 CE—ARCHITECTURE

The Computational Element (CE) can be viewed as a very high performance, semi-programmable, application-specific vector processor which operates on arrays of data at very high speed. Although it has been primarily designed for FFT and related systems, its semi-programmable architecture lends itself in a variety of other DSP applications such as FIR filters, DFTs, complex-modulation/demodulation, etc. Its programmability, performance and cost-effectiveness allows it to be used for implementing time-domain DSP systems by using frequency-domain DSP techniques. The CE also has the capability of very high speed logical operations which makes it useful for systems such as graphics and image processing.

The CE integrates multiple multipliers, adders, registers, magnitude detectors, etc. on a single chip. It has multiple high-performance, parallel inputs and parallel outputs to maintain data-flow from external parallel devices to the on-chip processor. All the on-chip resources could be kept busy for the applications mentioned earlier. When all the computing resources are combined together, the device achieves the computation rate close to one Giga Operations Per Second (GOPS) in a pipelined mode. An operation is defined to be a multiplication, an addition or an equivalent operation. The device operates at an I/O data rate close to 5 Gigabits Per Second to maintain data flow to the processor. The key features of the CE are shown in Table 2.1.

TABLE 2.1
KEY FEATURES OF CE

* Computational Rate up to one GIGA-OPERATIONS per second (1 GOPS).
* The Data I/O Rate up to 5 Giga Bits Per Second.
* A total of 16 functions (instructions) available on single-chip.
* The FFT-specific and general-purpose functions, executed every 80 nS.
* A single-chip integration of vector-functions such as FFT Radix-4 butterfly, block multiply, block-add, block-logical functions, etc.
* Every 80 nS, operates upon 4 complex-data values and 4 complex auxiliary-data values, and produces 4 complex data values.
* For example: 1024 complex-point FFT executed in about 20 $\mu$S.

2.1 OPERAND FORMATS

Primarily, the CE operates on Complex Values. Therefore, all the Values on the CE are described in a complex format. The simplest way of handling real numbers on the CE is by setting imaginary parts of complex values to zero. When imaginary parts are also used as real values extreme care should be taken. The CE uses fractional, two's complement format through out for the arithmetic operations. For logical operations, the real and imaginary parts of a complex value contain independent logical values. Following are the formats used in the architecture of the CE for the representation of various operands.

a. Single-Precision Complex Values: In this format, a complex value is represented by two independent 16-bit values. One 16-bit value represents the real part and the other represents the imaginary part. For the arithmetic operations, each 16-bit value uses the two's complement format, the most significant bit (msb) being the sign bit. For the logical operations, the real and imaginary parts of a complex value consists of two independent 16-bit logical values.

b. Extended-Precision Complex Numbers: This format is the same as the single-precision format except that the real and imaginary parts are represented by 20 bits instead of 16 bits. It also uses two's complement, fractional format. The format is also referred to as 20-bit complex number format. The 20 bit logical value is not defined for the CE. Intermediated Values in this format are produced during the arithmetic computation.

c. Block Floating Point Format: The hardware has been included to provide the block floating-point capability to the CE for FFT applications. The machine has magnitude-detectors at the output stage to monitor the magnitude of each number, passing through the output. The detectors can be programmed to monitor the magnitude of a block of N complex numbers passing through the output. At the end of the pass, the machine produces a Scale-Factor which should be applied to right-shift (scale) every complex-number in the processed block of data before that data-block enters the next FFT computation-Pass. The right shift will prevent the machine from overflowing during the Pass. Of course, hardware has been included to shift right every data point at the input stage of the CE. The mechanism has been designed to prevent overflow during the FFT algorithm computation. The machine uses 3 bit, unsigned, binary integer format to represent the Scale Factor. The details of the block floating point scheme will be presented later.

2.2 BASIC ARCHITECTURE

Figure 7:
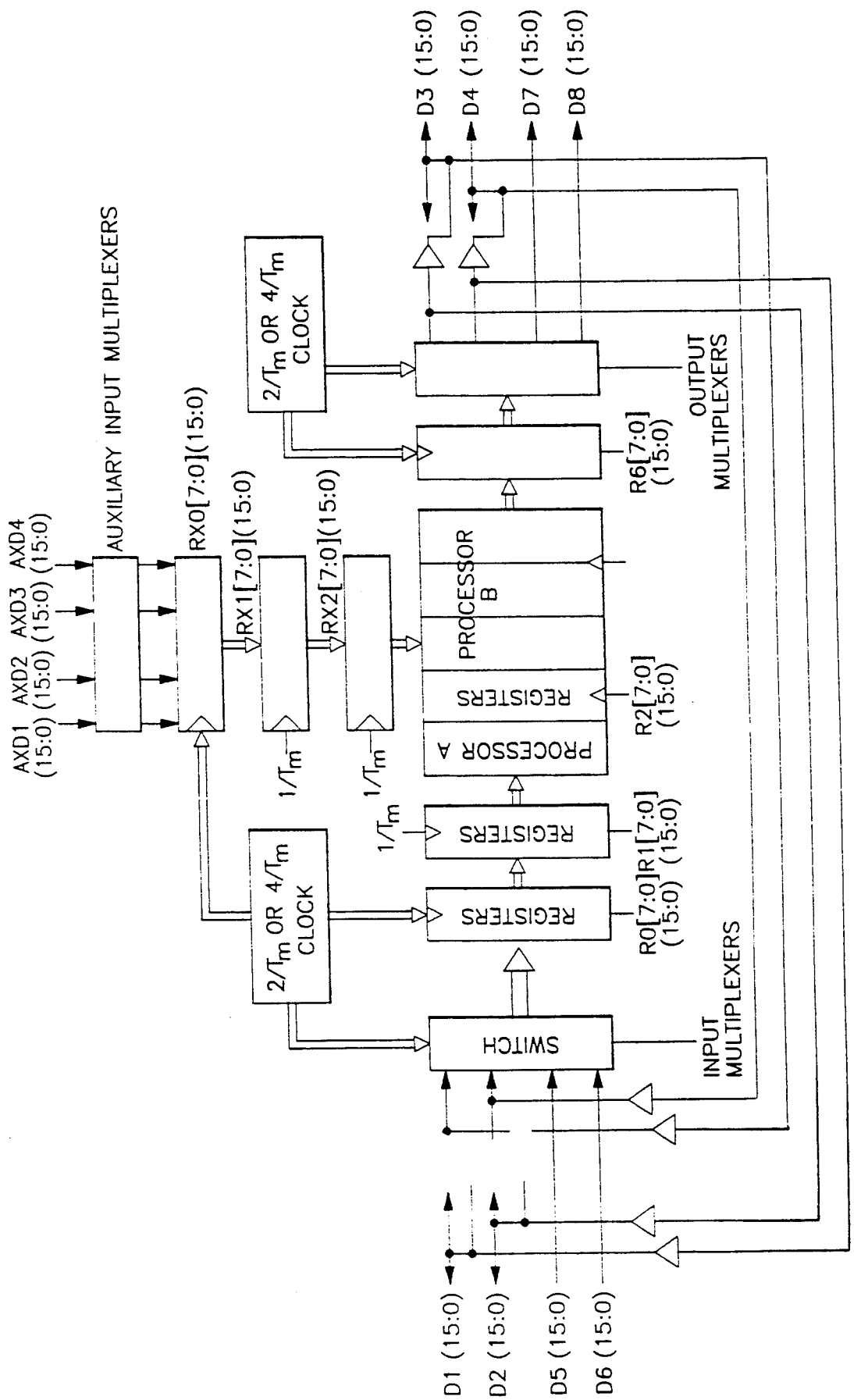
FIG. 7 is a block diagram of the CE.

A block diagram of the CE, emphasizing data inputs, auxiliary data inputs, data outputs and pipeline stages is shown in FIG. 7. As shown in the FIG. 7, all the buses are 16 bits wide to directly interface to parallel memory devices. The processors of the CE may be programmed to implement several different functions as described later. Basically, the processor has been designed to operate upon two sets of four complex values, each set consisting of four 16 bit complex values. After a pipeline latency, the processor produces a set of four 16 bit complex values as an output. As shown in the FIG. 7, the latency from the input to the output is four machine cycles due to the pipeline register stages R0, R1, R2, and R6. Effectively, these registers are clocked at the machine cycle rate. The machine cycle time is defined to be an interval during which all four complex operands are fed to the device. The machine cycle time is specified to be 80 ns for the CE. Subsequently, the machine cycle time will be referred to as Tm nanoseconds. When the pipeline is running, the processor accepts two sets of four complex numbers every machine cycle and produces one set of four complex numbers every machine cycle at the output stage. Several different input/output configurations are possible with the CE that offer different system trade-offs which will be described in the next section.

As shown in FIG. 7, four 16 bit input complex data operands are switched into a set of eight 16-bit registers, R0[7:0](15:0), from external input D buses during a machine cycle time Tm. Note that R0[7:0](15:0) stands for a set of eight 16 bit registers. The individual registers, in-turn are called R01(15:0), R02(15:0), etc. During the same machine-cycle, a corresponding input set of four 16-bit complex auxiliary data operands are switched into another set of eight 16 bit registers, called RX0[7:0](15:0), from external input AXD buses. On the next machine cycle, the values from set of R0 registers and set of RX0 registers are transferred into set of registers R1 and set of registers RX1 respectively, relieving the input registers to collect the next sets of values. During this machine cycle, several operations on data contained by R1[7:0](15:0) are performed by the Processor A and results are latched into registers R2[7:0](15:0). Meanwhile, auxiliary data contained by RX1[7:0](15:0) advances to RX2[7:0](15:0) to maintain alignment with the data. In the next machine-cycle, operations on values contained by register sets R2 and registers sets RX2 are performed by the Processor B. The Processor-B produces additional latency of one machine cycle due to internal pipelining. This latency is shown by including an additional stage of registers in the Processor-B in FIG. 7. The results (a set of four 16 bit complex values) are latched into a set of output registers R6[7:0](15:0) on the following machine-cycle. The values are fed to the output data buses during this machine-cycle over a period of Tm. Therefore, latency of four machine cycles results from the input to the output of the CE.

2.3 INPUTS/OUTPUTS—BM PIN

As described earlier, computationally, the CE operates at a machine-cycle time of Tm nS. However, faster clocks are required to input and output all the values within a machine-cycle. There are two basic modes of input/output bus operations, controlled by the bus made (BM) pin.

2.3.1 Dual I/O Mode—DIR Pin and CONFIG Pin

When input pin BM is in a logic low state, the device is said to be in the "Dual I/O" configuration. In the Dual I/O configuration, all the input and output operations are done over respective pairs of buses as shown in FIG. 8. The buses D5, D6, D7, D8, AXD3 and AXD4 are in a Don't Care state in this mode. In addition, control over the directionality of the buses is provided via the pin DIR. When pin DIR is in a logic low state, the pair D1 and D2 acts as input buses while pair D3 and D4 acts as output buses, as shown in FIG. 9. The device is said to be in "right direction mode" in this state. The directionality of the data buses is reversed when DIR pin is set to a logic high state as shown in FIG. 9, putting the device in the "left direction mode."

Basically, a set of four complex numbers (eight 16-bit values) is transferred over each pair of buses in the Dual I/O mode every Tm nS. Therefore, each bus operates at a rate of 4/Tm MHz, transferring a 16-bit word every Tm/4 nS. A CLKIN signal of 4/Tm MHz is needed in the Dual I/O mode to handle bus transfers. Every Tm/4 nS, each pair of buses carries corresponding real and imaginary parts of a complex number.

Additional flexibility in the Dual I/O Mode is provided by an input pin, called CONFIG. In the Dual I/O Mode discussions, so far, the CONFIG pin was assumed to be in the low state. The pin CONFIG (Configuration) allows the CE to be configured for Dual-Memory Systems (such as shown in FIG. 3 and FIG. 4) or for Single-Memory Systems (such as shown in FIGS. 5 and 6). When CONFIG pin is low, the CE works at full speed (machine cycle time Tm), continuously reading data from Read memories via input buses and continuously writing data to Write memories via output buses. As discussed in Chapter 1, when a single external memory is used, it takes twice the memory cycles in a given PASS, because the Read and Write operations are done sequentially rather than in parallel. The CE has to work at half the speed in this case (machine cycle time of 2Tm nS) to allow Read and Write sequentially. When CONFIG pin is set at a logic high level, the CLKIN signal is internally divided by a factor of two to slow down the CE. In this case, either the bus pair D1/D2 or the bus pair D3/D4, is used for both the read and write operations, as shown in FIG. 10. The bus pair is dynamically switched by the external DIR signal for alternate Read and Write operations. The timing will be further clarified in the following sections.

2.3.2 Quad I/O Mode

The external buses can be reconfigured by putting a logic high signal on the BM pin. In this mode, which is called the Quad I/O Mode, the CE bus configuration appears as shown in FIG. 11. Each set of four complex numbers is transferred over corresponding set of four buses instead of the two buses used in the Dual I/O mode. The buses D1, D2, D5 and D6 carry the four input complex-data values and the buses AXD1, AXD2, AXD3 and AXD4 carry the four auxiliary input complex-data values. The buses D3, D4, D7 and D8 carry the four output complex-data values. The bus-direction pin DIR and the CONFIG pin are in the Don't Care mode in this case. Therefore, the directionality of the buses can not be changed in the Quad I/O mode.

Since twice the number of buses are available to transfer each set of four complex numbers, each bus operates at half the rate compared to the Dual I/O Mode. The buses operate at a rate of 25 MHz, transferring a 16 bit value every Tm/2 nS in the Quad I/O mode. For each set, real parts of four complex numbers are transferred over corresponding four buses in the first half of the machine cycle. The four corresponding imaginary parts are transferred in the later part of the machine cycle, completing a transfer of four complex numbers.

2.4 THE CLOCK SIGNALS

Figure 12:
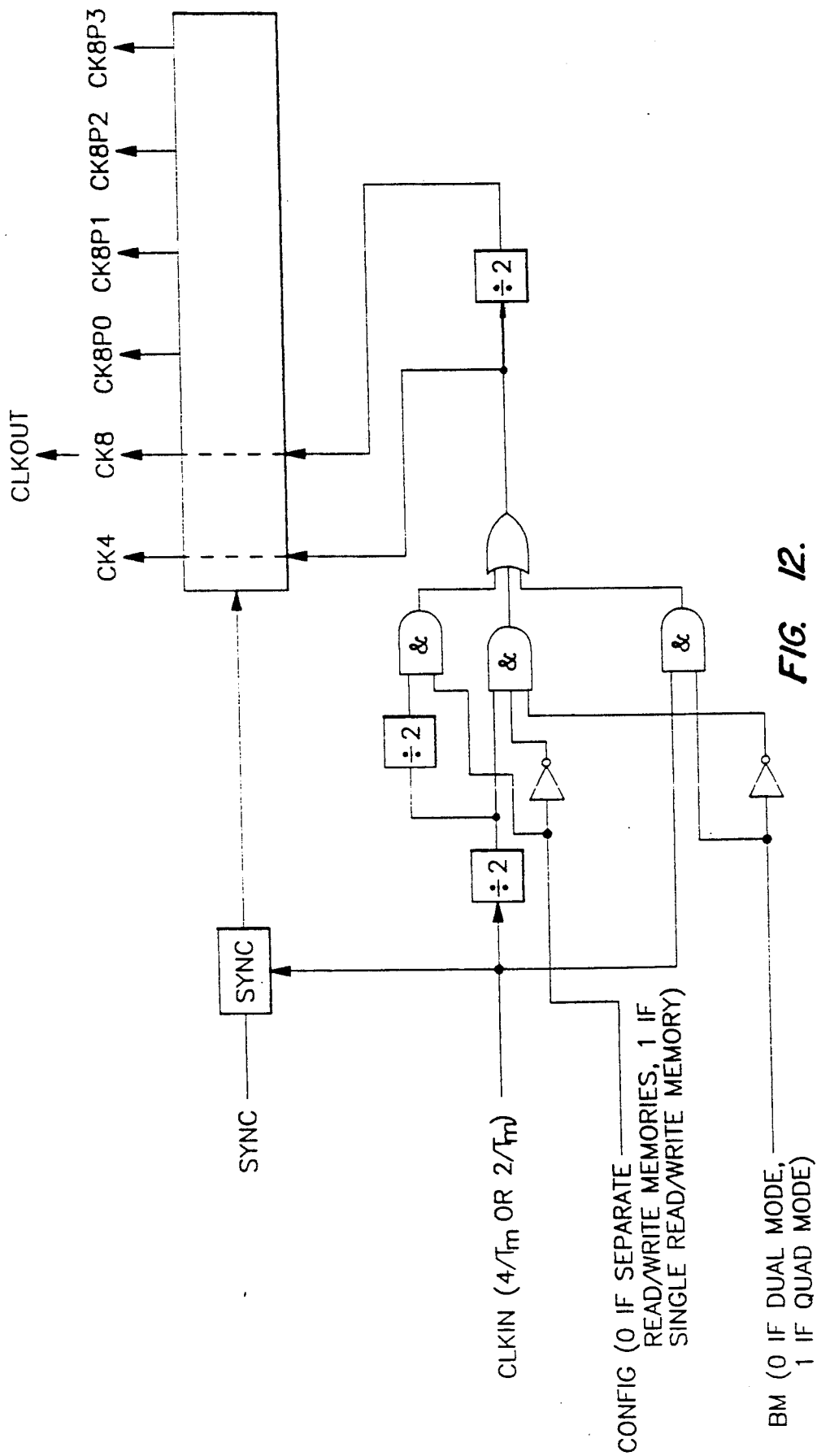
FIG. 12 is a block diagram of the Internal Clock Generator.
Figure 13:
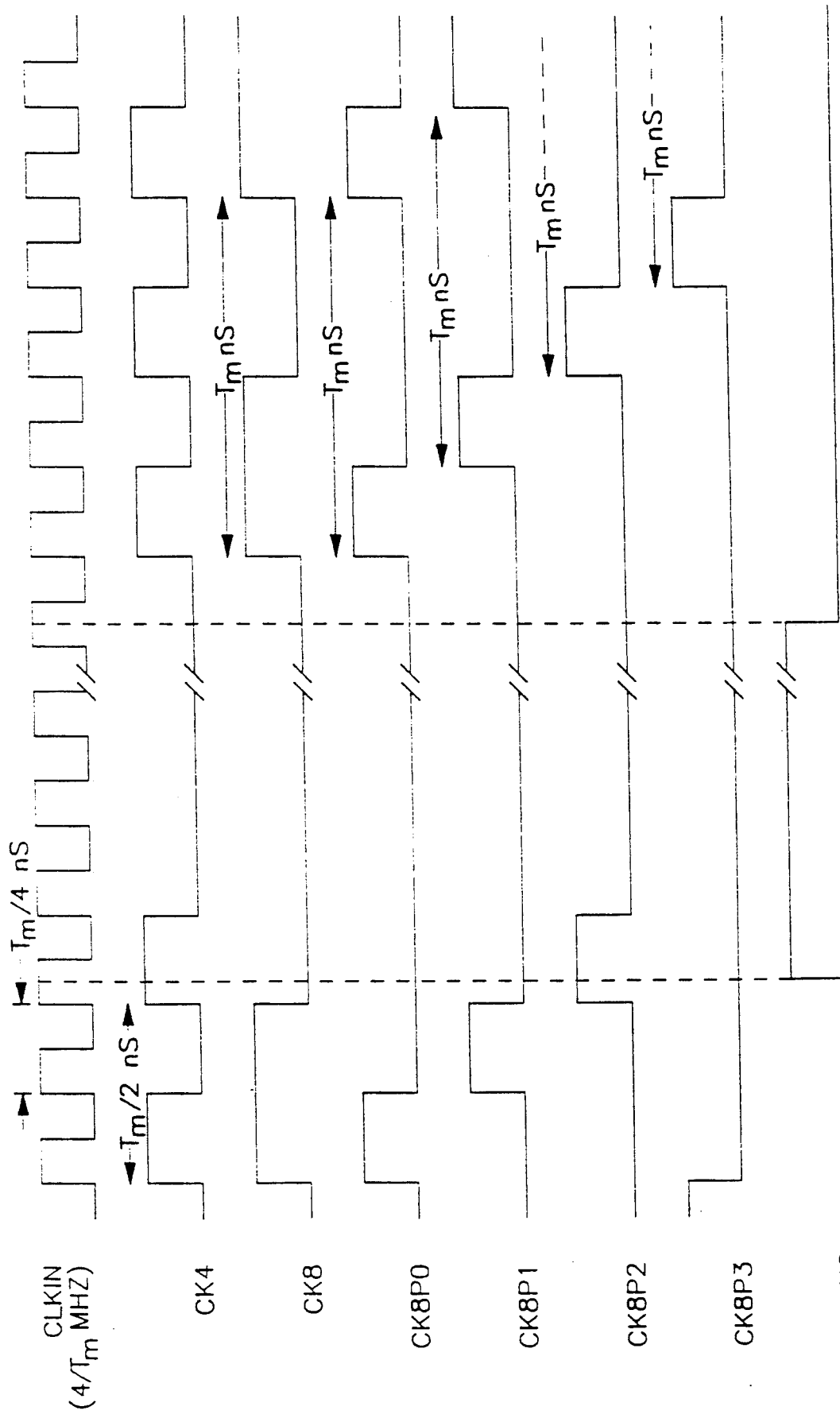
FIG. 13 illustrates the clock waveforms produced by the Internal Clock Generator when the CE is in the Dual I/O Mode with CONFIG=0.

A model of the internal clock generator of the CE is shown in FIG. 12. The clock generator is activated by a CLKIN signal from an external pin. The CLKIN signal is fed with a 4/Tm MHz clock or a 2/Tm MHz clock, depending upon the input BM signal. If the device is in a Dual I/O mode, the input frequency must be 4/Tm MHz. The input clock rate must be 2/Tm MHz, if the device is in a Quad I/O mode. The clock generator is further controlled by the input CONFIG signal. In the Dual I/O mode, when CONFIG input is zero, the clock generator generates internal clocks which are called CK2, CK4, CK8, CK8P0, CK8P1, CK8P2 and CK8P3 as shown in FIG. 13. An external signal, SYNC, is used to synchronize the internal CE clocks with internal clocks of other external devices which share the same SYNC and CLKIN signals. The CLKIN is fed at a frequency of 4/Tm MHz, which produces the CK4 signal at 2/Tm MHz and the CK8 signal at 1/Tm MHz. The CK8P0 to CK8P3 are four non-overlapping quarter phases of the CK8 signal. The signal CK8 appears at the CLKOUT output pin of the CE. When the SYNC input is applied (level high), the clock generator goes into a reset mode, taking various clock outputs to a low level as shown in FIG. 13. When the SYNC signal makes a transition from high to low, the CK4 and CK8 signals make a transition to logic high on the first following positive transition of CK2.

Figure 14:
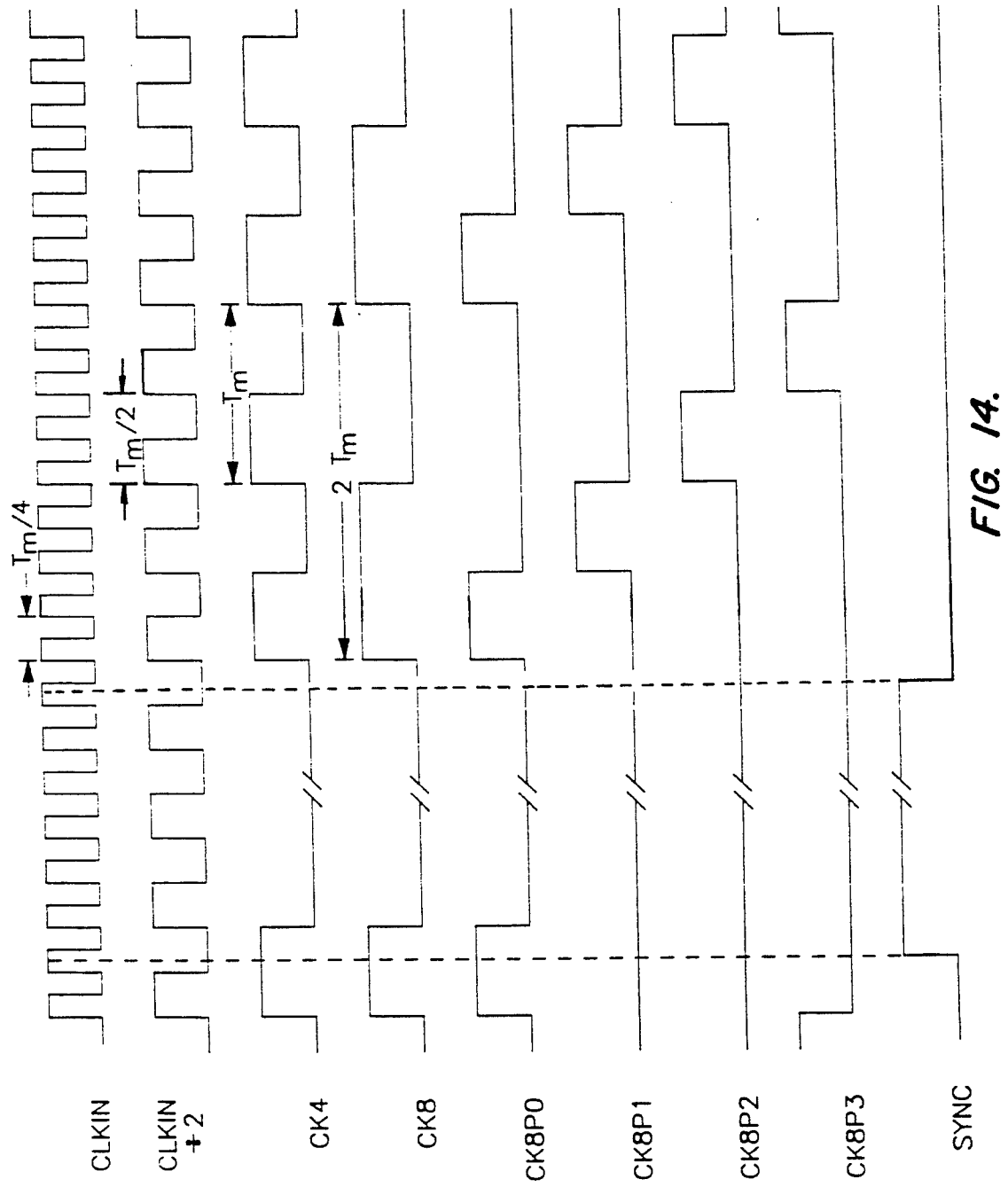
FIG. 14 illustrates the clock waveforms produced by the Internal Clock Generator when the CE is in the Dual I/O Mode with CONFIG=1.

When CONFIG is set to a high level, the clock generator produces clock waveforms as shown in FIG. 14. Although, the CLKIN signal is at a frequency of 4/Tm MHz, all the internal waveforms are slowed down by a factor of two due to an internal division of the CLKIN signal by two. The SYNC signal maintains synchronization with the CLKIN signal as described before.

Figure 15:
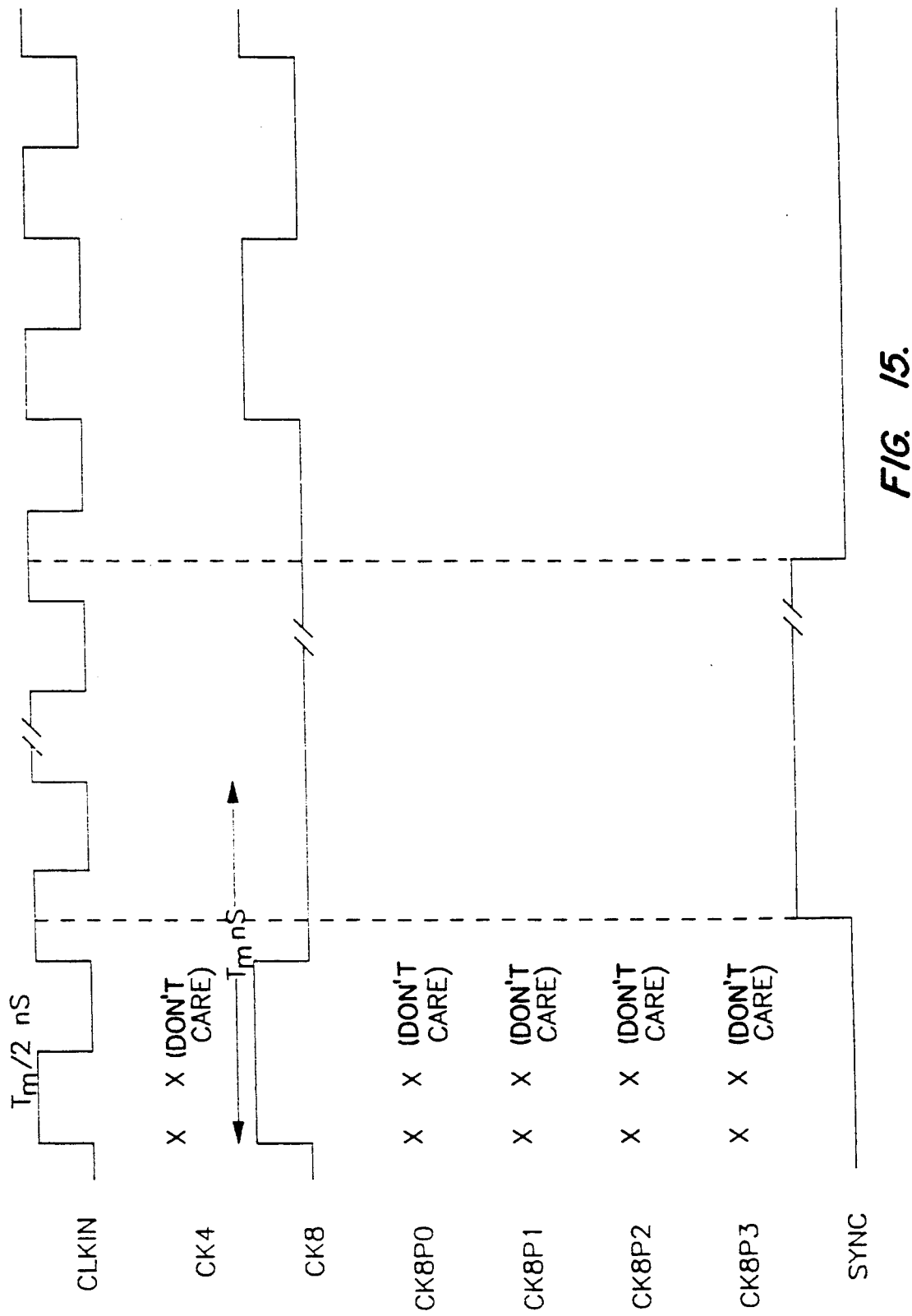
FIG. 15 illustrates the clock waveform produced by the Internal Clock Generator when the CE is in the Quad I/O Mode.

In the QUAD I/O mode, the clock waveforms appear as shown in FIG. 15. The CK4, CK8P0, CK8P1, CK8P2 and CK8P3 are in the Don't care state. The SYNC signal operates, as before, in synchronism with the CLKIN signal which is fed at a frequency of 2/Tm MHz.

Note that the logic shown in the FIG. 12 is a model of the clock generator. The actual implementation on the chip is different. On the chip, minimum skew is achieved between CLKIN and various internal clocks. The clock signals shown in this section will be used throughout these specifications in order to clarify the timing of various elements.

2.5 DEFINITION OF I/O OPERANDS

As stated earlier, the device operates on a set of four single precision, complex data values and a set of four single precision, complex auxiliary data values, every machine cycle. It produces a set of four single precision, complex data values every machine cycle as an output.

Let us define a set of input data operands to be as following:
   Data Input Operand 0: $r0+j\ i0$;
   Data Input Operand 1: $r1+j\ i1$;
   Data Input Operand 2: $r2+j\ i2$; and
   Data Input Operand 3: $r3+j\ i3$.
Where r# and i# are respectively the real and the imaginary parts of input single-precision complex numbers. The j is the square root of the negative unity. The set of four input data operands will be referred to as $(r+ji)[3:0]$ in the future.

Similarly, $(c+ji)[3:0]$ is a set of four input auxiliary data operands as following:
   Auxiliary Data Input Operand 0: $c0+j\ s0$;
   Auxiliary Data Input Operand 1: $c1+j\ s1$;
   Auxiliary Data Input Operand 2: $c2+j\ s2$; and
   Auxiliary Data Input Operand 3: $c3+j\ s3$.

In the same way, $(x+jy)[3:0]$ is defined to be a set of single precision, complex, output data values produced by the CE as following:
   Data Output Value 0: $x0+j\ y0$;
   Data Output Value 1: $x1+j\ y1$;
   Data Output Value 2: $x2+j\ y2$; and
   Data Output Value 3: $x3+j\ y3$.

The symbols defined in this section will be used throughout these specifications to refer to input/output values.

Note that when logical operations are performed, then, r0, i0, a0, b0, x0, y0, etc. are treated as independent logical values. However, the term 'Complex Value' or 'Complex Number' is used to refer to those operands.

2.5.1 Input/Output—Timing

Figure 16:
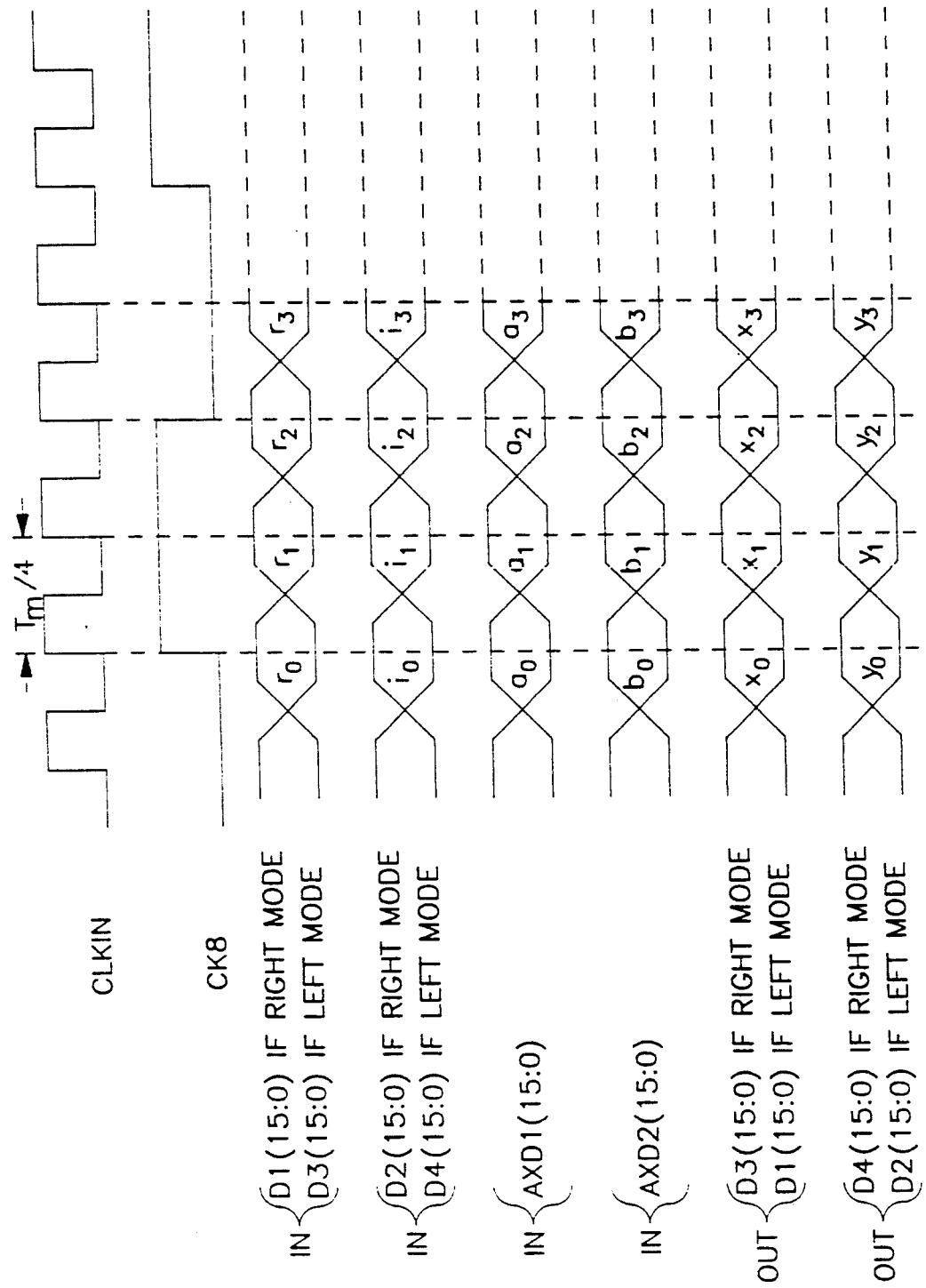
FIG. 16 illustrates the timing of various input/output operands when the CE is in the Dual I/O Mode and CONFIG=0.

A timing diagram, showing the timing of various input/output operands, which have been defined in the previous section, is shown in FIG. 16 for the Dual I/O Mode when CONFIG pin is held in a low state. The buses are operated four times per machine cycle as mentioned before. Note that, for example, the value $(r0+j\ i0)$ is fed in first and the value $(r3+j\ i3)$ is fed in at the end of a machine cycle. The various I/O time slots (within a machine cycle) on various buses are referred to as "r0 slot", "i0 slot", "a0 slot", etc.

Figure 17:
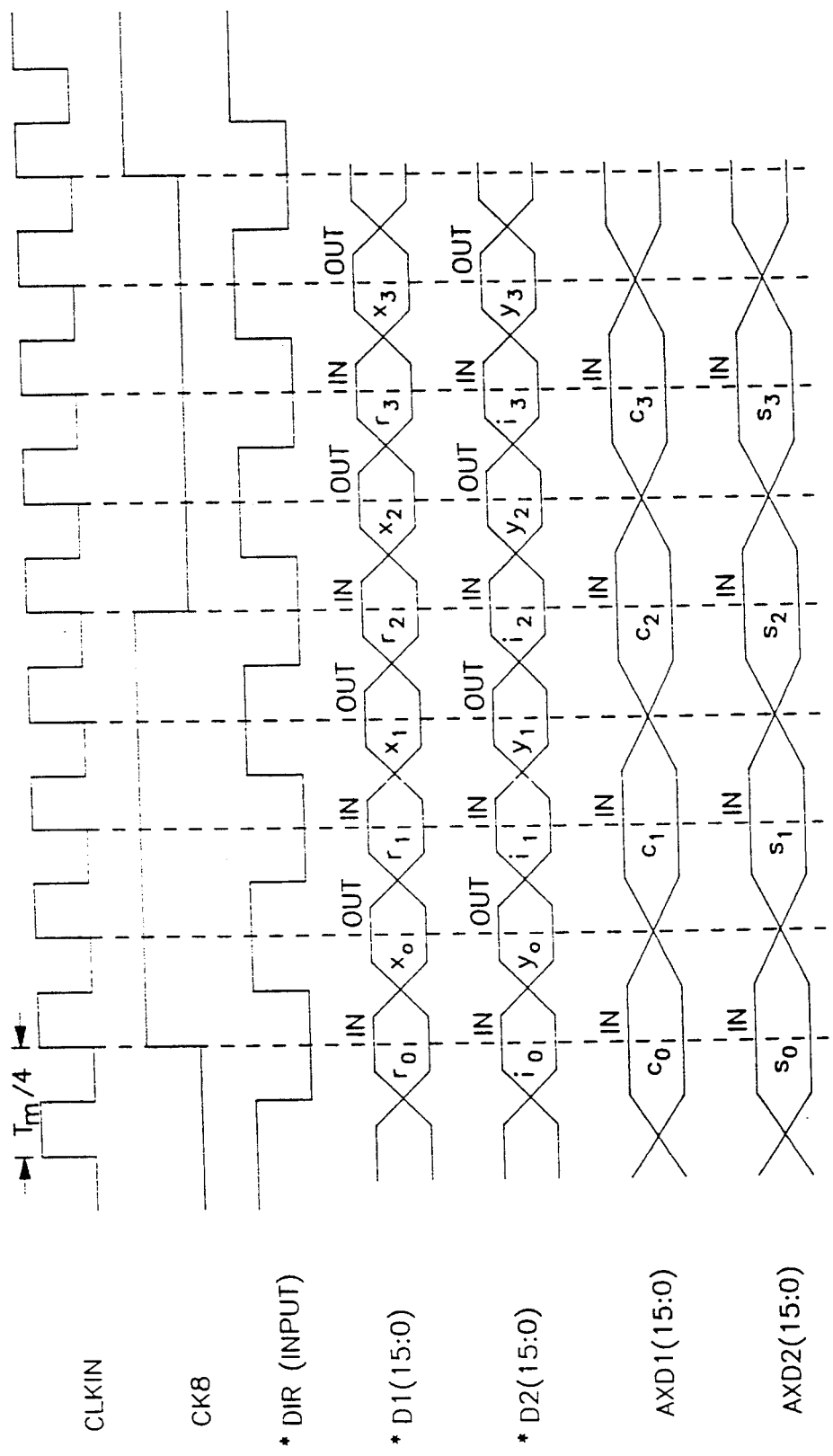
FIG. 17 illustrates the timing of various input/output operands when the CE is in the Dual I/O Mode and CONFIG=1.

The timing of I/O operands for the Dual I/O Mode, when CONFIG pin is held in a high state, is shown in FIG. 17. Note that the CLKIN is at a frequency of 4/Tm MHz and the machine cycle is stretched to 2Tm nS. Alternate read and write operations are performed over the bidirectional bus pair D1/D2 or D3/D4. The bus directionality is controlled by an external signal DIR as shown in the FIG. 17. When DIR signal is applied in accordance with the timing shown, the CE is responsible for providing correct output data and clocking in the correct data. Note that the FIG. 17 shows the timing of data buses D1 and D2. Instead, if buses D3 and D4 are used, the polarity of the applied signal DIR must be reversed.

Figure 18:
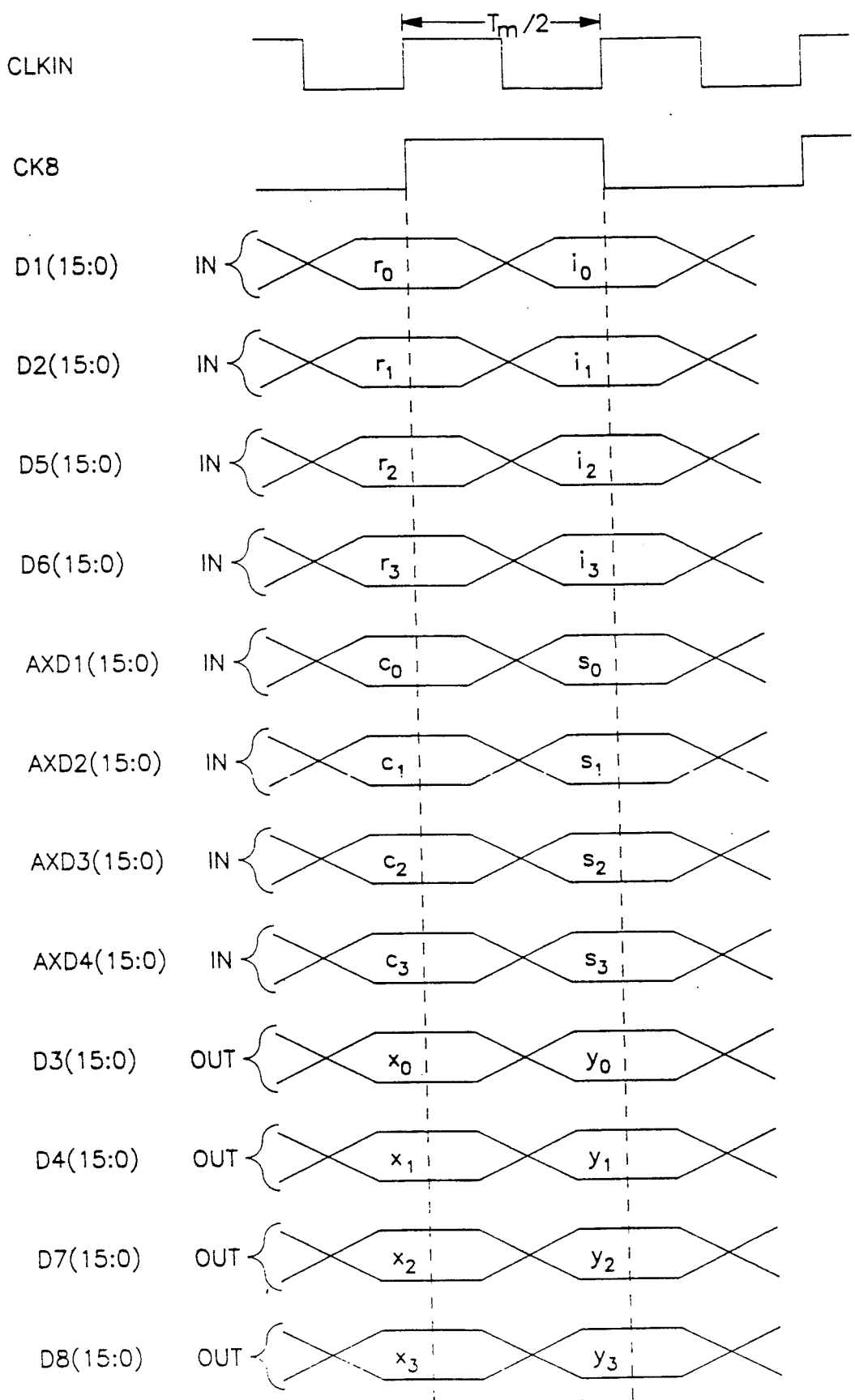
FIG. 18 illustrates the timing of various input/output operands when the CE is in the Quad I/O Mode.
Figure 19A:
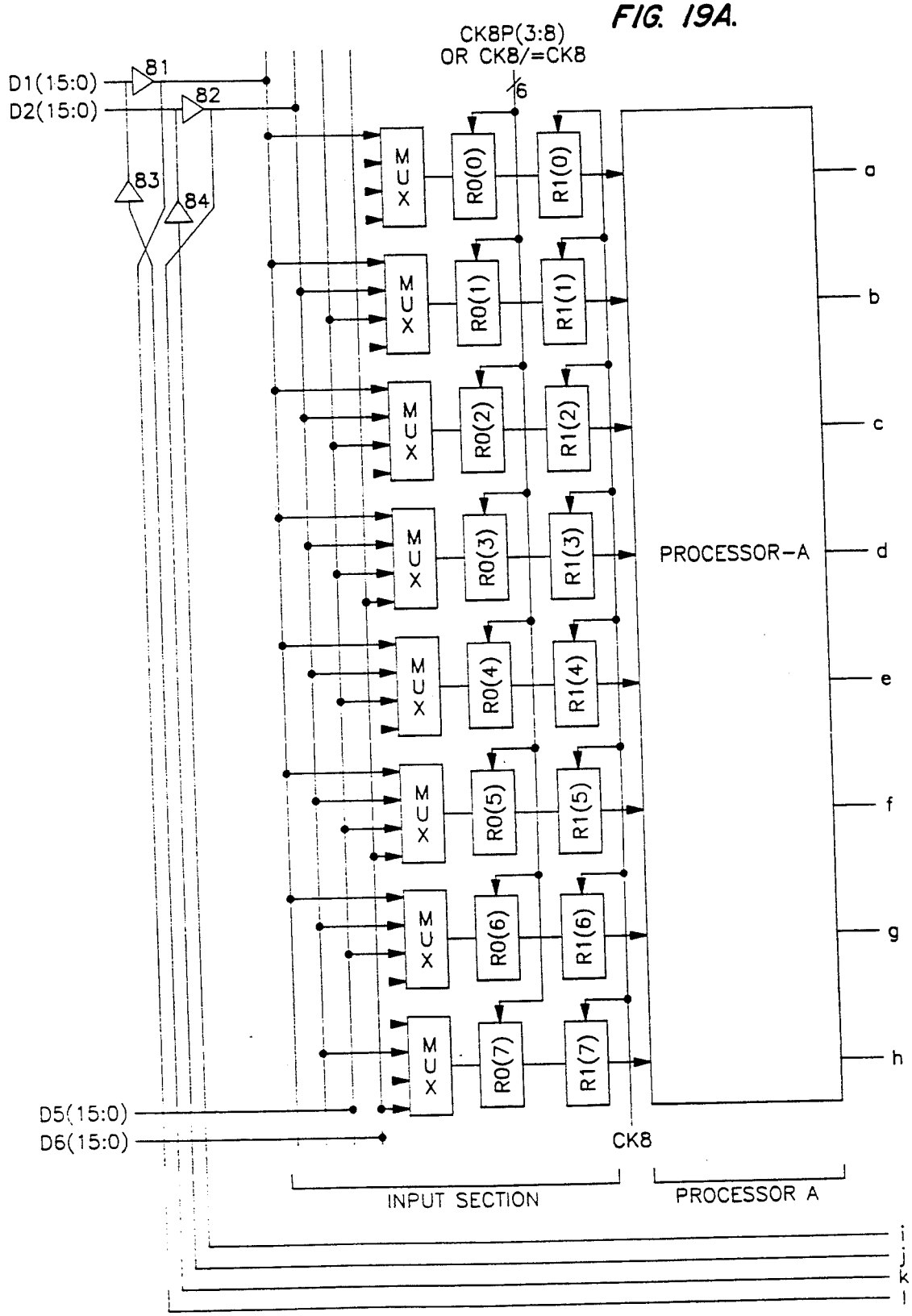
Figure 19B:
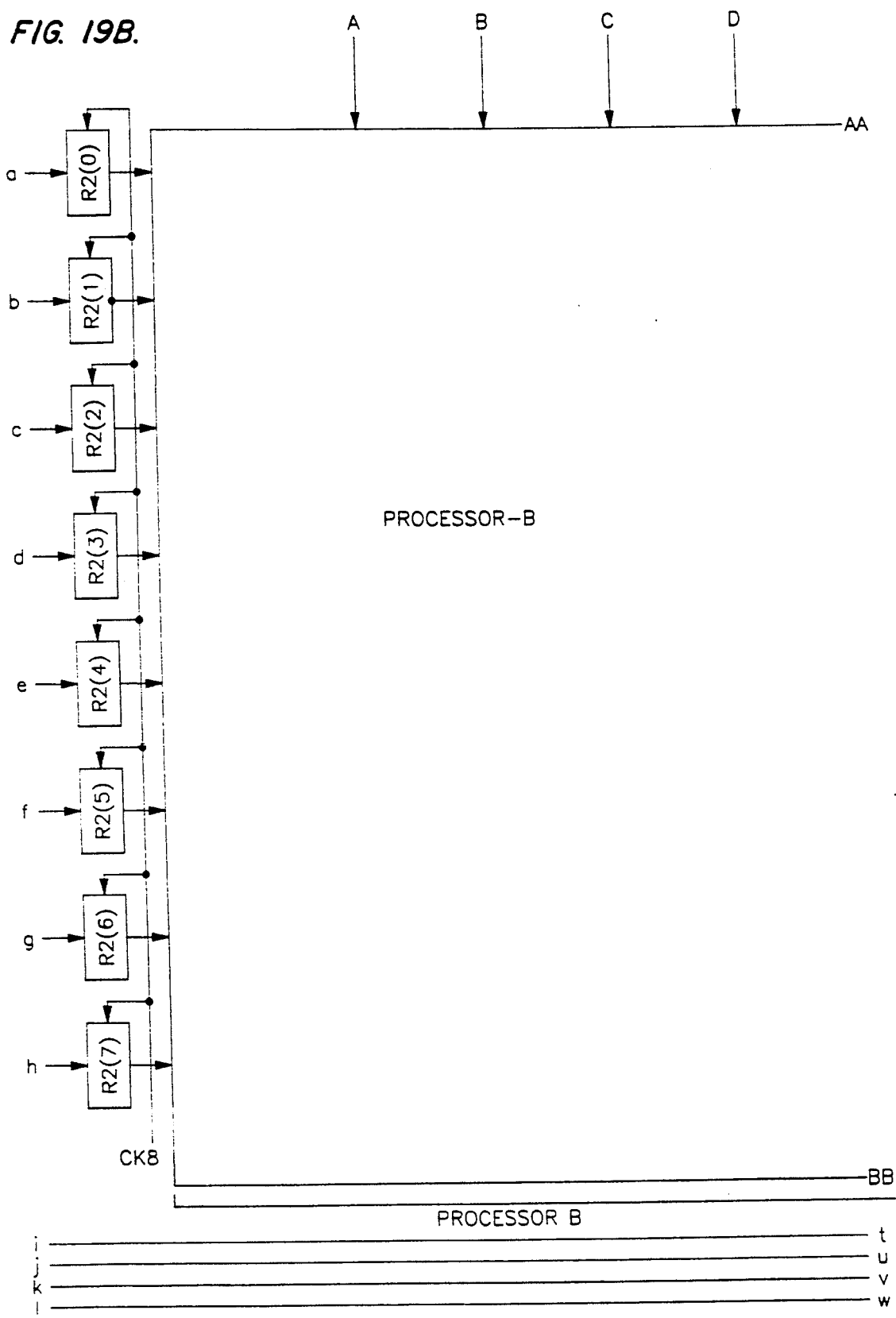
Figure 19D:
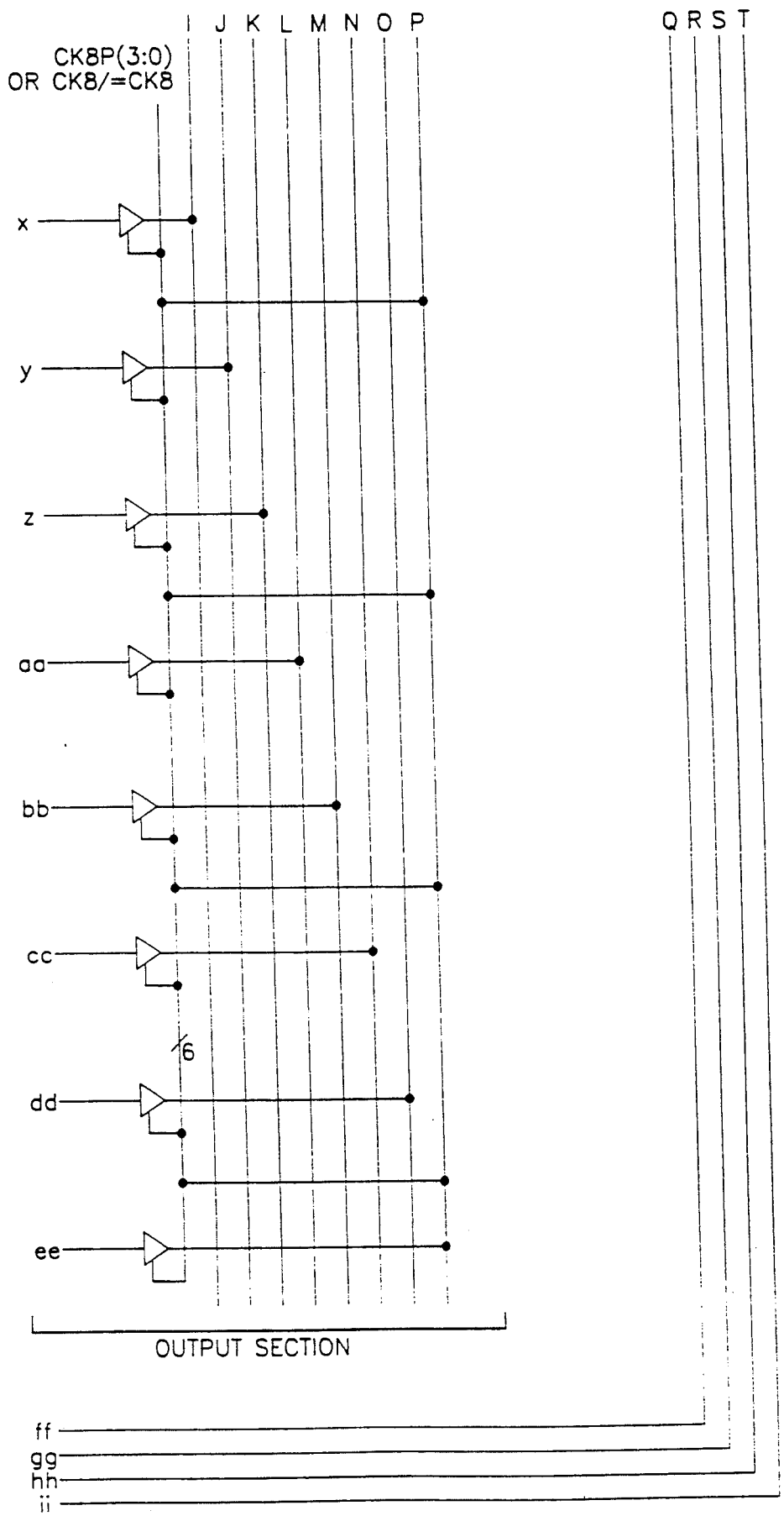
Figure 19E:
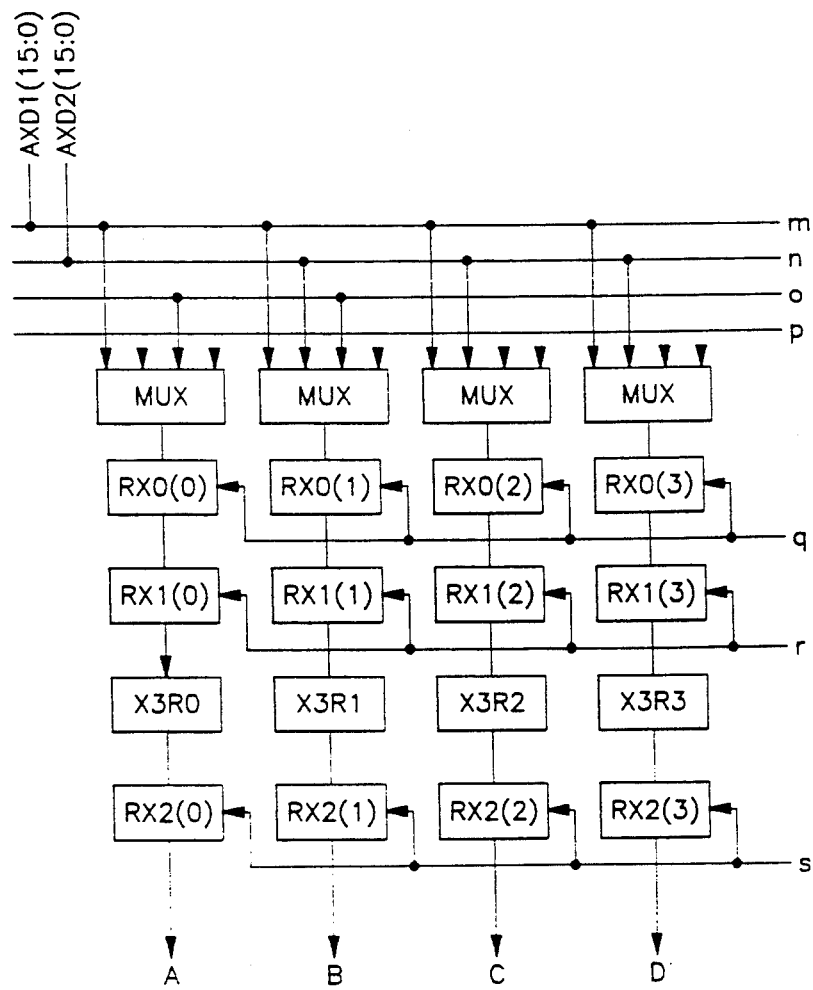
Figure 19F:
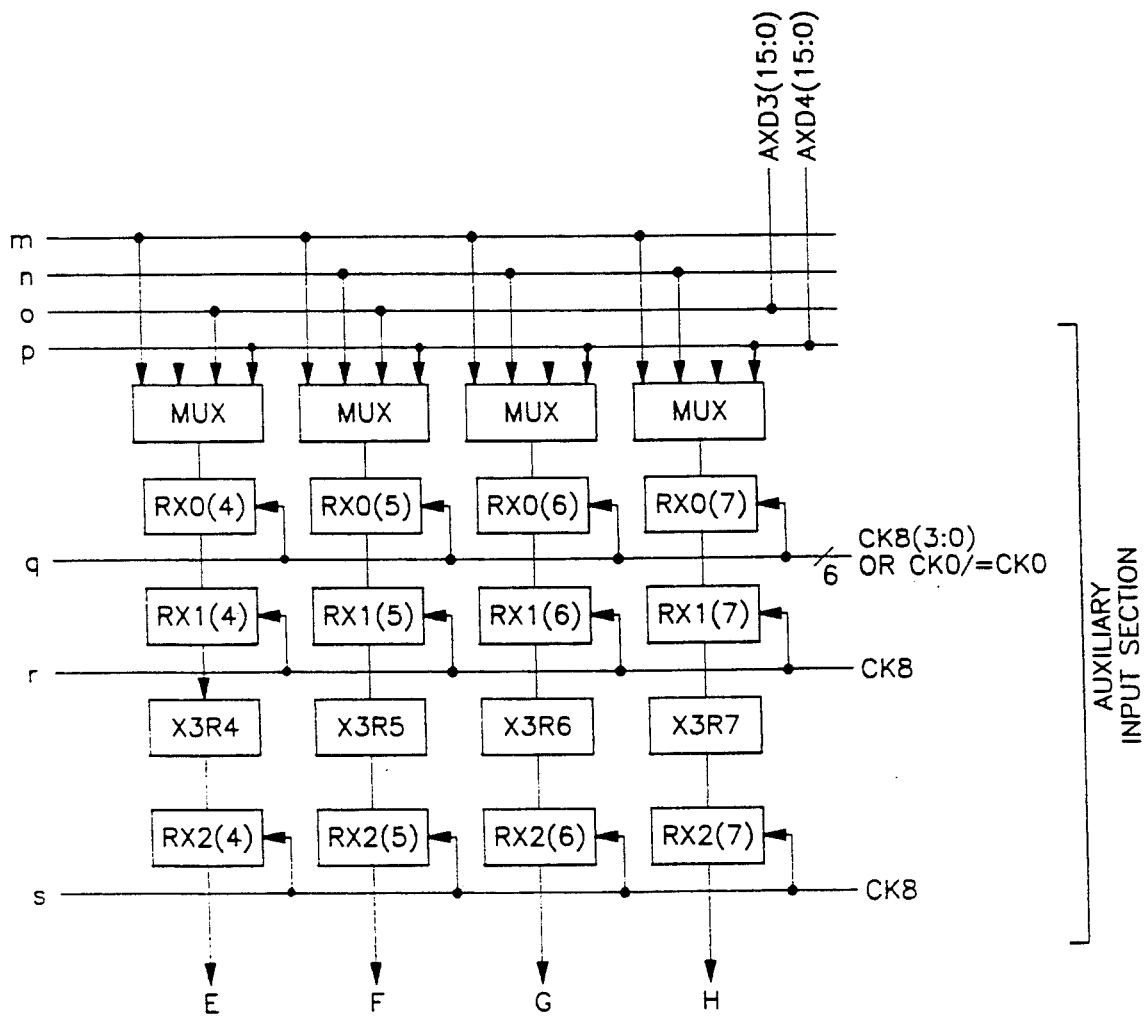
Figure 19G:
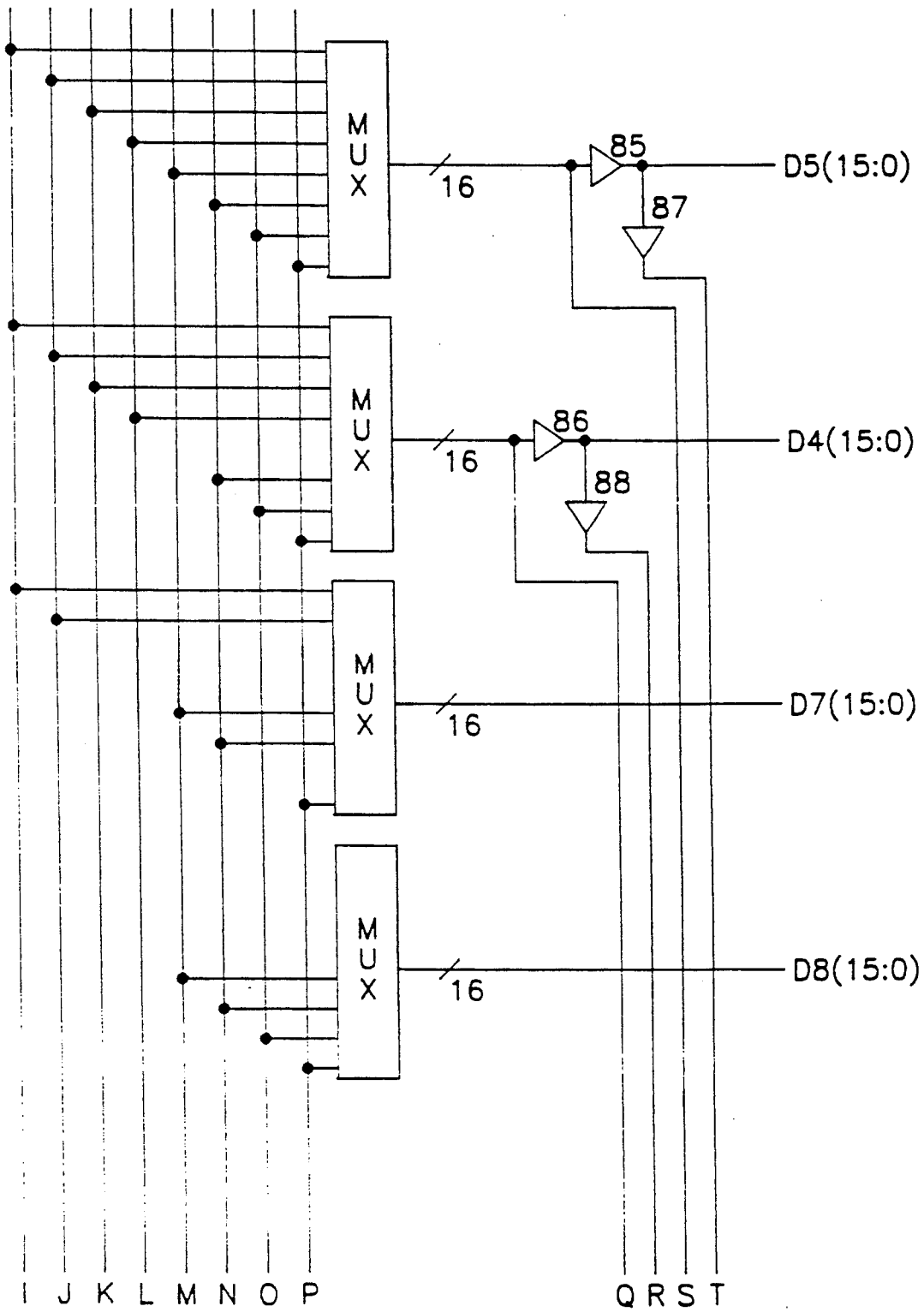

The I/O timing for the Quad I/O Mode is shown in FIG. 18. As mentioned earlier, the device uses all the buses in this mode and each bus is operated at a rate of 2/Tm MHz as shown in FIG. 18. Note that four real parts of a set of complex numbers are transferred during the first half of the machine cycle. The corresponding four imaginary parts are transferred during the second half of the machine cycle.

2.6 INPUT/OUTPUT—ARCHITECTURE

The I/O architecture of the CE is shown in the block diagram of FIG. 19.

The device has a set of 8 input/output data buses D[8:1](15:0) and a set of 4 input auxiliary data buses AXD[4:1](15:0) as discussed previously. The buses could be used in the Dual or Quad I/O modes.

2.6.1 Data Input Section

Internally, the device has a set of four input buses which are called IB[4:1](15:0). As discussed in the previous sections, the device receives a set of four input data values $(r+ji)[3:0]$ every machine-cycle over external data buses. The values are received over internal bus pair IB1/IB2 or over four buses IB1/IB2/IB3/IB4, depending upon the BM pin. All together, eight values are clocked in (four real and four imaginary). The incoming data is channeled through input multiplexers to a set of eight 16 bit registers which are called R0[7:0](15:0). It is assumed that every register, shown in the architecture of CE, is clocked on a positive edge.

Each in-coming data value (r0, i0, r2, i2, etc.) is assigned to one of the R0# registers. The pattern of assignment of various members of the input set of data values $(r+ji)[3:0]$ to various members of the set of registers R0[7:0] may change from instruction to instruction. An instruction is a group of logical values, applied on six input pins INS(5:0), as shown in control block of FIG. 19. An instruction configures the Processor A and Processor B to execute various functions described earlier (Butterfly, Block-Multiply, etc). The instruction-set is summarized in the next section. A detailed account of each instruction is presented in the next chapter. Each instruction requires the input set of data $(r+ji)[3:0]$ in a different sequence in the input registers of the Processor A. Therefore, the assignment of input data values to register set R0 changes from instruction to instruction as stated earlier. This is achieved by controlling the input multiplexers and the sequence of clocks to various members of register set R0[7:0] as the input data comes in. The R0[7:0] registers are fed with the clock-set CK8P(3:0) or by CK8/CK8-depending upon the BM mode. The exact assignment of the input data values will be discussed in the Appendix I. Basically, all the eight input data values are clocked into R0[7:0] register-set within a machine cycle in a sequence defined by the instruction being executed. The data is clocked into the next set of registers R1[7:0](15:0) by CK8 in the next machine cycle, making it available for the Processor A. The Processor A executes on the data, depending upon the instruction, and results are latched into a set of registers R2[7:0](15:0) which are further processed by the Processor B.

2.6.2 Auxiliary Data Input Section

In parallel with data, a set of four input auxiliary data values, (c+js)[3:0], is collected over a set of internal auxiliary input buses, XIB[4:1](15:0). The bus pair XIB1/XIB2 or all the four buses XIB[4:1] may be used depending upon the I/O modes. As in the case of data, the auxiliary data is clocked into a set of input auxiliary registers RX0[7:0](15:0) using the multiplexers and controlling the clock-inputs to the registers. Again, the assignment of input auxiliary values to the registers RX0[7:0] may vary from instruction to instruction. The exact assignment will be described in the Appendix I. All the eight values, (c+js)[3:0], are clocked into the register set RX0[7:0] over a machine cycle in a sequence defined by the instruction. In the next machine cycle, the values are moved to the register set RX1[7:0](15:0) by CK8 signal. The auxiliary data is further delayed by a machine cycle by moving it into the next set of registers, RX2[7:0](15:0), by CK8 signal. A series of 'one bit right shift and round' circuits have been included in between each member of the register-set RX1[7:0] and the corresponding member of register-set RX2[7:0]. Each input auxiliary value may be shifted by one bit to the right by controlling the XSIN pin. After shifting, a Round bit, RNDX, is added to the lsb of the shifted value to perform unbiased rounding. The RNDX is determined by the following logical equation.

RNDX=DB1.DB0

Where DB0 is the discarded lsb bit and DB1 is the next higher significant bit. Note that when logical instructions are implemented, the shift is logical and no rounding is performed.

When Auxiliary data is clocked into register-set RX2[7:0], it gets aligned with the data contained by the register set R2[7:0]. Both register-sets feed the data to the Processor B for further computation.

2.6.3 Data Output Section

The Processor B, which causes an additional latency of one machine-cycle due to its internal pipelining, produces a set of values (x+jy)[3:0] in the register set R6[7:0](15:0). The Processor B assigns various members of the set (x+jy)[3:1] to various registers in the set R6[7:0], in different ways for different instructions. The assignment will be discussed in the Appendix I.

After the output values have been produced in the register set R6[7:0], those are read to the internal output bus set OB[4:1](15:0) during the same machine cycle. Either the bus pair OB1/OB2, or all the buses OB1/OB2/OB3/OB4 are used, depending upon the I/O modes. The output values from the register-set R6[7:0] are sequenced to the output buses by using tri-state buffers and multiplexers at the output of registers, in accordance with the timing discussed in section 2.5. Either the clocks CK8P[3:0], or CK8/CK8- are used to drive the tri-state buffers, depending upon the I/O mode. The assignment and timing of the output registers will be further clarified in the instruction descriptions.

2.7 INSTRUCTION-SET: OPCODES AND SUMMARY

The CE has a variety of programmable input/output options which have been described so far. In addition, the Processor A and Processor B may be programmed to execute a variety of instructions as shown in Table 2.2.

TABLE 2.2
Opcodes and Instruction Summary

| OPCODE | | | | | | | |
|---|---|---|---|---|---|---|---|
| I5 Conj Comp Out | I4 Conj Comp In | I3 | I2 function | I1 | I0 | MNEMONIC | DESCRIPTION |
| *DEDICATED FFT CLASS* | | | | | | | |
| CO | CI | 0 | 0 | 0 | 0 | BFLY4 | A Radix-4, DIF, FFT Butterfly. |
| CO | CI | 0 | 0 | 0 | 1 | BFLY2 | Two Radix-2, DIF, FFT Butterflies. |
| CO | CI | 0 | 0 | 1 | 0 | FFT2N | Recombine N Complex Point FFT to 2N Real Point FFT. |
| CO | CI | 0 | 0 | 1 | 1 | FFTNN | Recombine N Complex Point FFT to two N Real point FFTs. |
| *GENERAL ARITHMETIC CLASS* | | | | | | | |
| CO | XX | 0 | 1 | 0 | 0 | AFLOW | Arithmetic Flow through: Pass data Complemented/ Unaffected. |
| CO | CI | 0 | 1 | 0 | 1 | BMUL | Block multiply two sets of comple numbers. |
| CO | CI | 0 | 1 | 1 | 0 | BSQSM | Block Square/Sum a set of complex numbers. |
| CO | CI | 0 | 1 | 1 | 1 | BADD | Block Add two sets of complex numbers. |
| CO | CI | 1 | 0 | 0 | 0 | BSUB | Block Subtract two sets of complex numbers. |
| CO | XX | 1 | 0 | 0 | 1 | BCONJ | Block Conjugate a set of complex numbers. |
| CO | XX | 1 | 0 | 1 | 0 | BCONS | Block of Constants: produce ZERO or ONE on outputs. |
| CO | XX | 1 | 0 | 1 | 1 | BCMUL | Block Multiply two Sets of Complex Values with one set Conjugated. |
| *GENERAL LOGICAL CLASS* | | | | | | | |
| CO | XX | 1 | 1 | 0 | 0 | LFLOW | Logical Flow through: Pass Data Inverted or unaffected. |
| CO | CI | 1 | 1 | 0 | 1 | BAND | Block AND two sets of complex values. |
| CO | CI | 1 | 1 | 1 | 0 | BOR | Block OR two sets of complex values. |
| CO | CI | 1 | 1 | 1 | 1 | BXOR | Block XOR two sets of complex values. |

As described in the Table 2.2, there are three classes of instructions. There is a Dedicated FFT Class which contains four instructions, dedicated to the specific FFT algorithms. There are eight instructions in the General Arithmetic Class. These instructions are fairly general purpose in nature. Some of the instructions such as BMUL, BSQSM and BADD are also useful for FFT systems. The BMUL is useful for FFT windowing and BSQSM can be used for post-FFT squaring/summing. The BADD can be used for post-FFT averaging, etc. All these instructions can be used to implement more general purpose arithmetic algorithms. The General Logical Class of instructions contains four instructions to perform various logical operations. Although the CE has been primarily designed for arithmetic intensive applications, the logical capability makes it useful where very high performance bit manipulation may be desired in addition to arithmetic. One such application is image/graphics processing.

Basically, all the instructions operate upon one set or two sets of four complex values and produce one set of complex values. The instruction bits I(5:0) (Table 2.2) are defined at the input pins of the device. The Primary Function of an instruction is defined by the bits I(3:0). The bit I4 is called CI which stands for Conjugate-Input or Complement-Input. The bit CI, which is active high, is used to conjugate, arithmetically-complement or logically-complement the incoming data values. The functionality of the CI depends upon the Class of instructions. In FFT Class, the CI is used for conjugate control. All the incoming complex data values are conjugated by two's complementing the imaginary parts before operations are performed by the instruction. In the Arithmetic Class, the CI acts as a global two's complement control. All the incoming complex values (real and imaginary) are two's complemented before the values are operated upon. The CI also acts as complement control for the logical Class of instructions. However, in this case, all the incoming values are logically complemented (inverted) before the operation, defined by the instruction, is performed.

The CO bit behaves in a similar fashion for three classes of instructions, except that conjugate or complement operation is performed at the output. First the operation, defined by the instruction, is performed. Then, the outgoing data is conjugated or complemented. Note that the CI impacts the incoming data through the data-input section only. It does not impact the auxiliary input data.

The conjugate control, along with FFT instructions, can be used to implement inverse FFTs. The conjugate facility also allows the implementation of time-domain filtering by using frequency domain techniques. The complementing facilities, along with the instructions in the Arithmetic Class and the Logical Class, provide additional functionality for a variety of applications.

An instruction must be set-up one machine-cycle in advance of the data. Typically, the instruction will remain static for processing a block of N complex values.

2.8 PROCESSOR A—ARCHITECTURE

The Processor A derives its inputs from the register set R2[7:0]. The Processor A is basically dedicated to perform initial summing operations associated with various FFT oriented instructions (BFLY4, BFLY2, FFTN, etc) which are shown in the instruction descriptions. For general purpose instructions (such as BMUL, BADD, BXOR), the Processor A is basically in the flow-through mode to pass the data to the Processor B.

2.8.1 Input Complementers

Figure 20A:
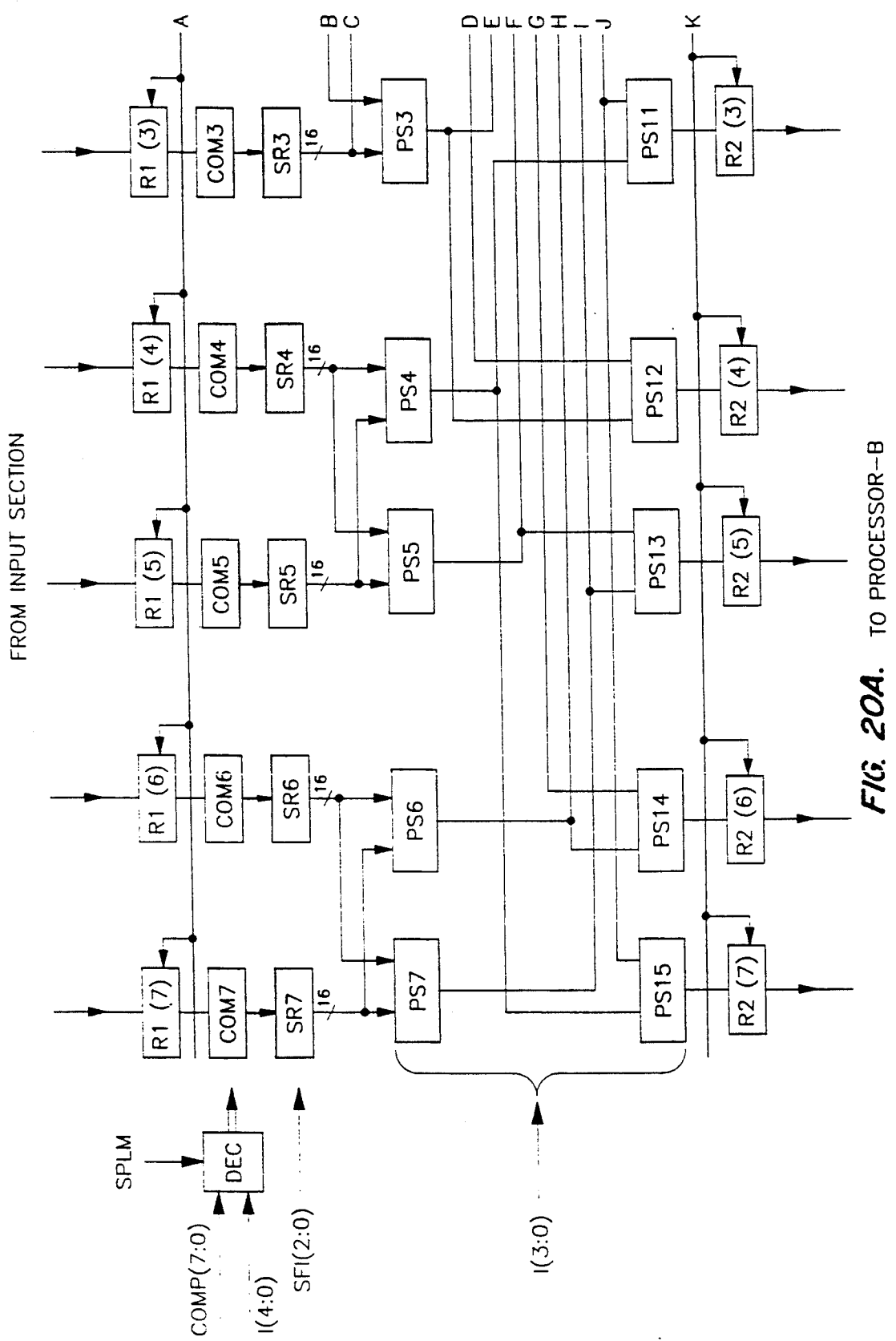

A block diagram of the Processor A is shown in FIG. 20. The eight inputs to the Processor A are first passed through a set of two's complementers, designated as COM0-COM7 in FIG. 20. The complementers are directly controlled by the input pins COMP(7:0) or by the I4 bit in the instruction, depending upon the SPLM (SPECIAL MODE) pin and the class of effective instruction. When SPLM pin is in a high state each complementer is directly controlled by the values on pins COMP(7:0), for FFT class of instructions. For example, if COMP0 is high, then complementer COM0, produces a two's complement when data passes through it. If COMP0 is low then data passing through COM0 is unaffected. Similarly, complementers COM1-COM7 are affected by the values on pins COMP1-COMP7. When pin SPLM is in a low state, the complementers are not affected by inputs COMP(7:0). Instead, the bit I4 (Conjugate Input—CI) controls the input complementers. When I4 is low, the data through the Complementers is unaffected. If I4 is high, the data values are affected as described in the descriptions of individual instructions in Chapter 3.

2.8.2 Shift And Round

After complementers, the data is passed through a set of Shift and Round circuits, designated as SR0-SR7 in FIG. 20. The SR blocks produce a shift on incoming data as defined by pins SFI(2:0). All the SR blocks produce the same amount of shift. The sign bit is extended into the most significant bit (msb) positions if an arithmetic instruction is being implemented, otherwise, zeros are inserted in the msb positions. Table 2.3 describes the SFI(3:0) inputs and the produced shift.

TABLE 2.3

| Shift Values | | | |
|---|---|---|---|
| SFI2 | SFI1 | SFI0 | PRODUCED SHIFT |
| 0 | 0 | 0 | NO SHIFT |
| 0 | 0 | 1 | 1 BIT |
| 0 | 1 | 0 | 2 BITS |
| 0 | 1 | 1 | 3 BITS |
| 1 | 0 | 0 | 4 BITS |
| OTHER STATES | | | NOT VALID |

As shown in the Table 2.3, shift up to four only is allowed. When arithmetic instructions are implemented, the shifted values are rounded to perform an Unbiased Round, by adding a bit RND to the shifted value. The bit RND is determined by the following logical equation:

$$RND = (SFI2\text{-}.\ SFI1\text{-}.\ SFI0\ .\ DB1\ .\ DB0) +$$
$$(SF2\text{-}.\ SF1\ .\ SF0\text{-}.\ DB1\ .\ [DB0 + DB2]) +$$
$$(SF2\text{-}.\ SF1\ .\ SF0\ .\ DB2\ [DB0 + DB1 + DB3]) +$$
$$(SF2\ .\ SF1\text{-}.\ SF0\text{-}.\ DB3\ .\ [DB0 + DB1 + DB2 + DB4]).$$

Note that DB0 to DB4 are unshifted data bits; the bit DB0 being the least significant bit (lsb). The RND bit is forced to be a zero when logical instructions are implemented.

2.8.3 Sum Stages

The data passes through a first set of adder stages, designated as PS0 to PS7 (Programmable Summers) in FIG. 20. The values are further combined by a second stage of Programmable Summers, called PS8-PS15. A Programmable Summer is an adder, containing programmable inputs as shown in the notation of FIG. 20. Either input of a PS can be two's complemented. Either or both inputs may also be programmed to be zero, disregarding the incoming data. In this way, a PS can be used to Add, subtract, flow-through or produce zeros. The PS are automatically programmed by the instruction bits I(3:0) as described in the instruction descriptions. The output from the second PS stage is directly latched into the R2[7:0] register-set. The interconnections of PS devices have been determined to implement various FFT instructions. However, data flows through unaffected for other instructions.

2.8.4 Definition of Intermediate Operands

For arithmetic instructions, typically, the Processor-A produces a set of four single-precision, complex values. Let us define those values to be a set $(m+jm)[3:0]$. The value $(m0+jn0)$ is contained by the register-pair R20 and R21; m0 being contained by register R20, and n0 being contained by R21. Similarly, the remaining values are contained by the remaining registers in the same sequence.

2:9 PROCESSOR B—ARCHITECTURE

Figure 21A:
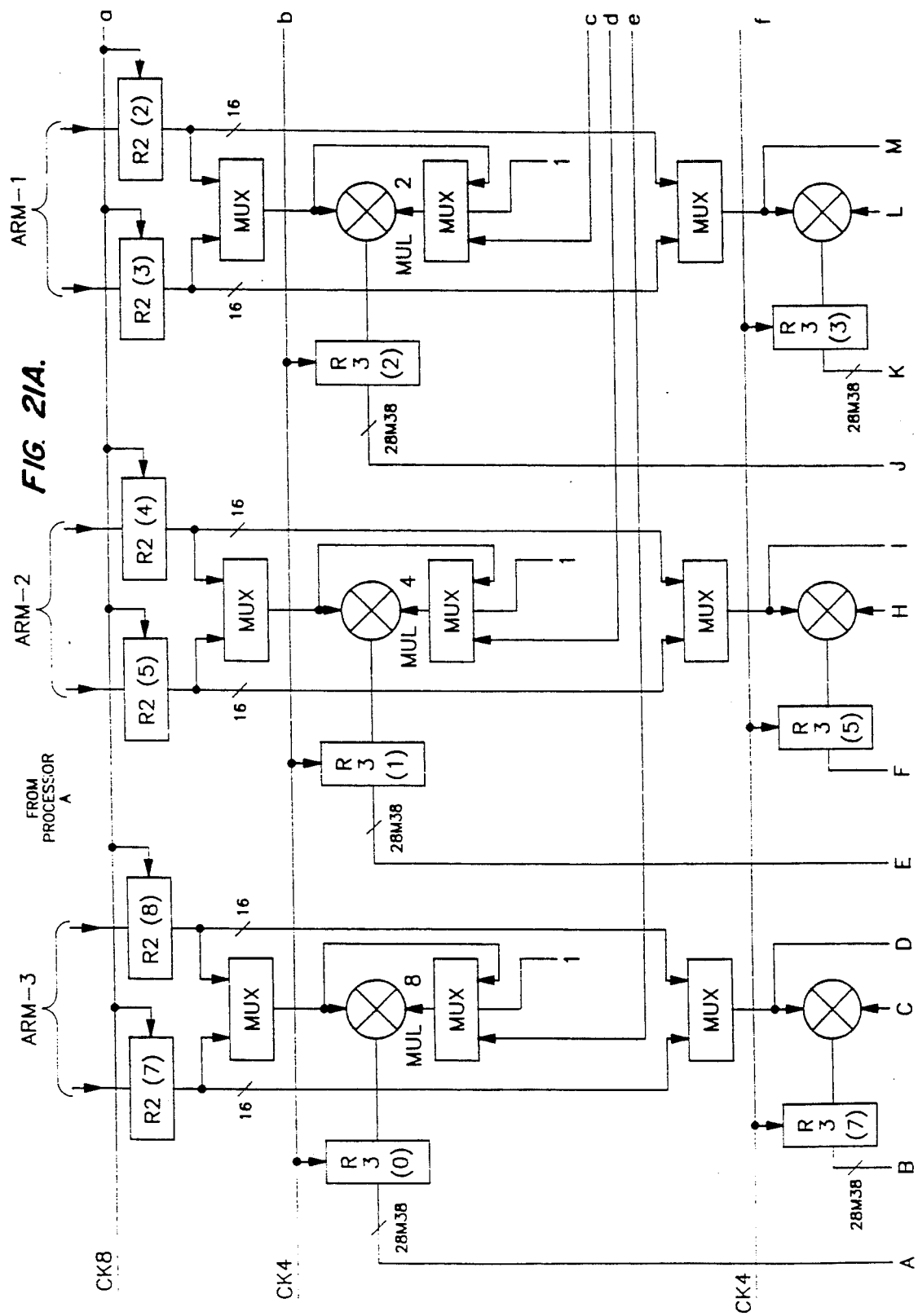
Figure 21D:
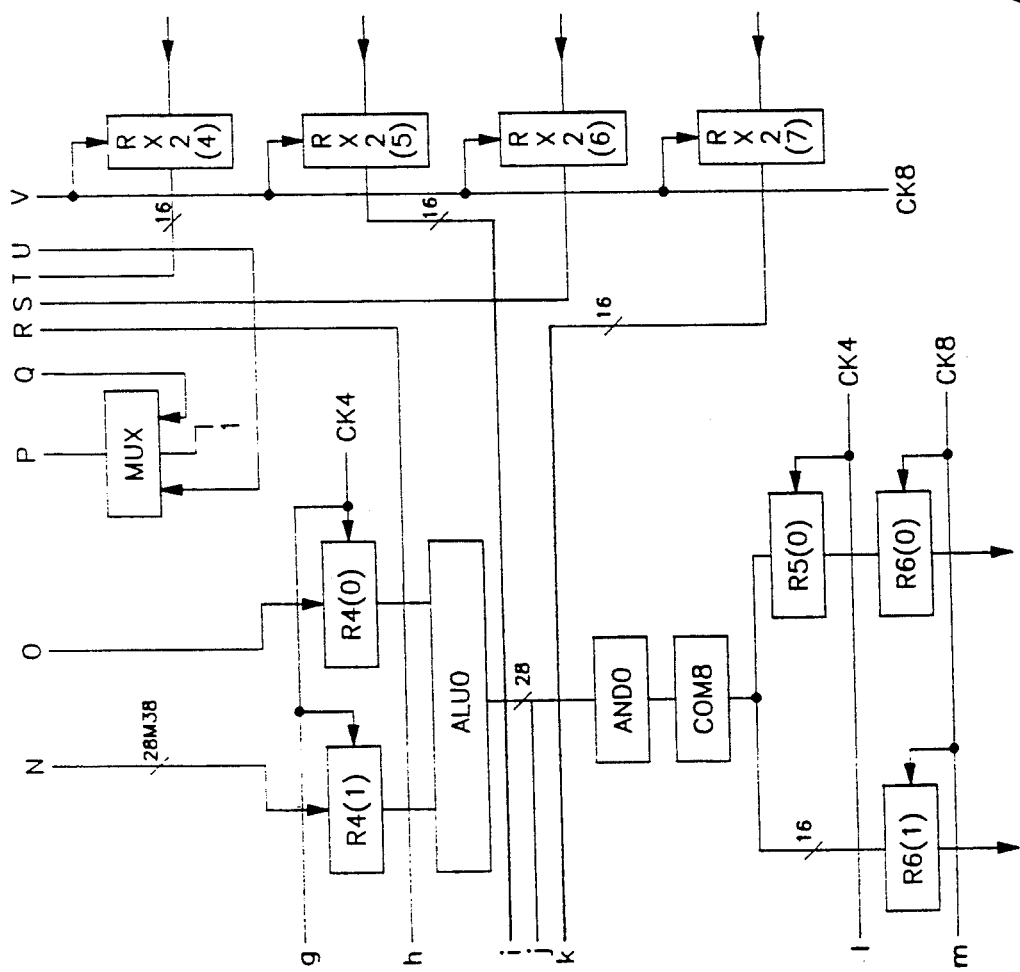

The Processor-B operates upon two sets of complex numbers, a set $(m+jn)[3:0]$ contained by R2[7:0] registers, and a set $(c+js)[3:0]$ contained by RX2[7:0] registers. A block diagram of Processor B is shown in FIG. 21. The Processor B has been defined to work at twice the speed of Processor A, operating twice in a machine cycle. The Processor B contains eight 16×16 multipliers, four 20 bit ALUs and several pipeline registers. The internal pipeline registers of the Processor B are clocked by the 2/Tm MHz clock, CK4, due to the processor cycle-time of Tm/2 nS. Basically, the processor is organized to perform four complex multiplications in one machine cycle. The two multipliers and one ALU is interconnected to form one 'Arm' of the Processor, as shown in FIG. 21. All the four Arms shown in FIG. 21 are identical except the highlighted data paths. The highlighted data paths allow ALU0 to be able to feed the data to ALU1. Similarly, the ALU2 can feed the data to the ALU3. Those 'special' paths are used by only one instruction, FFT2N. In the normal mode (when all other instructions are executed), the four Arms appear identical as seen by ignoring highlighted data paths in FIG. 21. For those instructions, all the Arms are identical and independent. This is called 'normal' mode of operation. When, FFT2N instruction is executed, it uses the 'special' mode of operation.

2.9.1 Processor B: Normal Mode

In the Normal Mode, each Arm (FIG. 21) has data paths to execute a complex multiply operation in one machine-cycle. For example, the Arm 0 operates on two input complex-numbers, $(m0+jn0)$ and, say, $(c0+js0)$. Both input numbers remain stable for a complete machine-cycle, Tm nS, in respective registers R2# and RX2#. During the first half of Tm, the multiplexers of MUL0 and MUL1 are configured to produce m0.c0 and n0.s0, respectively. The products are left justified, truncated to 20 bits, and latched into registers R30 and R31 which are clocked by a CK4 clock. Note that the registers R3# are implemented inside the multiplier as intermediate pipeline registers. For the sake of convenience, those are shown at the outputs of the multipliers in FIG. 21. Next, the products are transferred to registers R40 and R41, which are clocked by CK4. Then, the ALU0 performs a function (mO.c0−no.s0) which is the real part of the complex multiplication. The computed value is rounded to 16 bits, then passed through a two's complementer COMP0, and, then, latched into an intermediate register R50. After producing m0.c0 and n0.s0, the multiplexers of MUL0 and MUL1 are switched in the second half of the machine cycle. In the second half, MUL0 and MUL1 produce n0.c0 and m0.s0, respectively. As before, the data flows through the CK4 pipeline, following the previous data. The ALU0 performs a function (n0.c0+m0.s0), which is an imaginary part of the output. The result is latched into register R61 by a CK8 signal. At the same time, the corresponding output real-term, residing in the register R50, is latched into register R60. Therefore, registers R60 and R6(1) contain results of a complex multiplication, which have been termed $(x0+jy0)$ previously, as an output. The timing of the Arm is further clarified in the timing diagram of FIG. 22. Note that the registers R3# and R4# produce an additional latency of one machine-cycle. This latency has been shown by including a stage of artificial CK8 pipeline registers in the equivalent diagram of the Processor B in FIG. 7.

As shown, the multiplexers of MUL0 and MUL1 (FIG. 21) have provisions to produce $m0^{}2$ and $n0^{}2$, which can be further added by ALU0 to execute a SQSUM instruction. The input data can also be passed through the multipliers unaffected by selecting a '1' on the multiplexers. The data then can be operated upon by using the ALU. The ALU supports various functions such as Add with either input complemented, Logical AND, Logical OR, Logical EXOR, One's Complement, as required by various instructions.

In the Normal Mode, all the four Arms operate as described above. The Processor-B operates in a different mode, called Paired Mode, when the instruction FFT2N is executed, which is described in the next section.

2.9.2 Processor B: Paired-Mode

In the Paired-Mode, Arm-0 and Arm-1 are interconnected together by using the highlighted path, as shown in FIG. 21. Similarly, Arm-2 and Arm-3 are interconnected. These data paths are used by the instruction FFT2N as described in its description in the next chapter. In this mode, only one complex-value is produced as an output, by Arm-1 and Arm-3.

The mathematical equations, implemented for FFT2N are discussed in the instruction set description. It can be easily verified that the latency from the input to the output of the Processor-B in the Paired Mode is the same as the Normal Mode (One Machine-Cycle), by producing a timing diagram similar to that shown in FIG. 22.

2.9.3 Processor B: Round And Complement

When ALU0–ALU3 implement arithmetic instructions (FIG. 21), their outputs are rounded to 16 bits. The output of each ALU is first truncated to 16 bits and, then, a bit RNDB is added. The RNDB is determined by the following logical equation to perform Unbiased Rounding:

$$RNDB = DB2.[DB0 + DB1 + DB3].$$

Note that DB0–DB3 are the discarded bits on truncation, the DB0 being the lsb.

The data is passed through the Complementers after Rounding as shown in FIG. 21. The effect of complementers on the output data is described in the individual description of each instruction in Chapter 3.

2.10 SCALE FACTOR GENERATOR

The CE has the capability of generating a Scale Factor (SF) corresponding to a N-point Pass of the data. After a current Pass, the SF is used in the next Pass to produce a right-shift on the data before the processing. The shift ensures that an overflow will not occur during the next Pass. This mechanism is also called 'Conditional Scaling' or 'Block Floating Point.' The SF is automatically generated for the BFLY4 and BFLY2 instructions. For other instructions, the device generates a SF of zero. An alternative SF may be determined externally and fed to the Input Shifters of the device.

Figure 23:
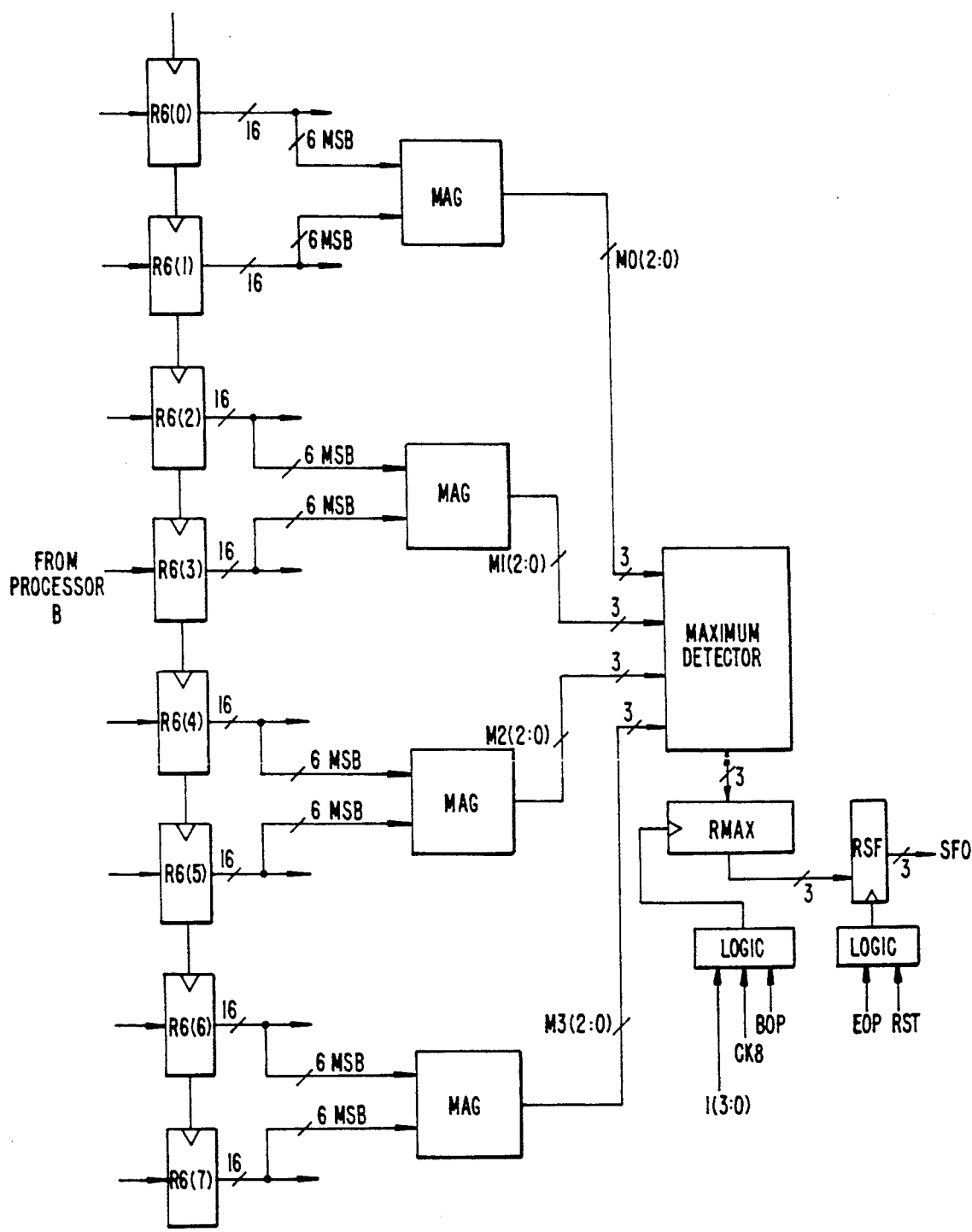
FIG. 23 is a block diagram of the Scale Factor Generator.

A block diagram of the Scale Factor Generator is shown in FIG. 23. As shown, four magnitude detectors are connected to the four pairs of the output registers, contained by set R6[7:0]. Each pair of the registers holds one of the output complex values. By evaluating the 6 msb of the real and imaginary parts, each Magnitude Detector Block (MAG) generates a 3 bit SF. All the SFs are fed to a Maximum-SF-Detector which holds the running maximum SF in the register RMAX. Initially, the RMAX is cleared by a BOP (Beginning Of Pass) signal. The BOP signal is supplied by an external device, marking the start of a data stream. The BOP signal is supplied one machine-cycle before the first set of input data is supplied for a given Pass. Following the latency of the chip, the BOP signal arrives one machine cycle before the first set of output values arrive in the register set R6[7:0]. The RMAX is cleared initially at the beginning of a Pass. Then every machine cycle, the outputs of MAG blocks and contents of the RMAX are mutually compared and the maximum SF is latched into RMAX register. This process continues until an EOP (End of Pass) signal is received by the CE on an external pin. The EOP signal is supplied one machine-cycle before the last set of input data values are applied to the CE. Along with the pipeline, the EOP arrives one machine-cycle before the last set of outputs are generated in the register set R6[7:0]. After the last set of outputs have been monitored and RMAX has been latched, the EOP signal latches the final SF into an output register RSF. The contents of RSF are driven on to the output pins SFO(2:0). The contents of RSF remain static the whole Pass. Therefore, the SFO(2:0) pins can be directly tied to the SFI(2:0) (Scale Factor In) pins of the next device. If one CE is used in a recursive mode, the SFO pins can be tied back to the SFI pins of the same device. If the device is not to be operated in the automatic conditional scaling mode, the SFO pins can be ignored. In this case, externally determined SF can be applied to the SFI pins. Note that the RSF register is initially cleared (set to zero) by an external RST (Reset) signal. The Reset Signal is applied directly, without any pipeline latency.

Note that each Magnitude Detector employs an algorithm to determine a SF which is required to prevent an overflow during the next BFLY4/BFLY2 pass. The SF Generator is active during BFLY2 and BFLY4 instructions only. Obviously, the device is looking ahead a SF for the next Pass during a current BFLY4/BFLY2 Pass. It is assumed that the next Pass is also going to be BFLY2 or BFLY4. If the next Pass corresponds to an instruction other than BFLY4/BFLY2, then a SF other than the one produced by the device may be required. Such management will have to be done externally.

2.10.1 The Magnitude Detector

Figure 24:
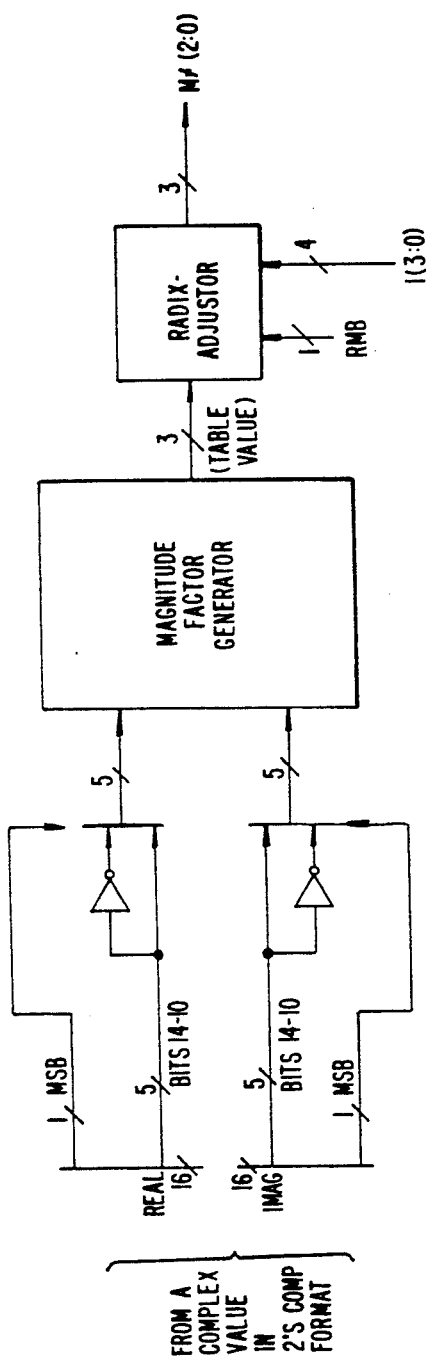
FIG. 24 is a block diagram of the Magnitude Factor Detector.

The details of the MAG block, discussed in the last section, are shown in FIG. 24. The 6 msb bits of real and imaginary parts of a complex value are taken. The 5-bit magnitude of the 6 msb bits is determined by evaluating the sign bit. If the sign bit is a one, the next 5-bits are inverted, otherwise the next 5 bits are taken as they are. It is shown by using multiplexers in FIG. 24. The 5-bit magnitudes of the real and imaginary parts are applied to the inputs of a Table-look-up logic which implements the Table shown in Table 2.4.

TABLE 2.4

MAGNITUDE FACTOR TABLE
ONE QUADRANT OF IDEAL SCALE VALUES STATED
IN POWERS OF 2 REAL INPUT

IMAGINARY INPUT
1111111111111111

TABLE 2.4-continued

MAGNITUDE FACTOR TABLE
ONE QUADRANT OF IDEAL SCALE VALUES STATED
IN POWERS OF 2 REAL INPUT

```
  0 1 2 3 4 5 6 7 8 9 A B C D E F 0 1 2 3 4 5 6 7 8 9 A B C D E F
00 1 1 2 2 2 2 3 3 3 3 3 3 3 3 3 4 4 4 4 4 4 4 4 4 4 4 4 4 4 4 4
1 1 1 1 2 2 2 2 3 3 3 3 3 3 3 3 3 4 4 4 4 4 4 4 4 4 4 4 4 4 4 4 4
2 1 1 2 2 2 2 2 3 3 3 3 3 3 3 3 3 4 4 4 4 4 4 4 4 4 4 4 4 4 4 4 4
3 2 2 2 2 2 2 3 3 3 3 3 3 3 3 3 3 4 4 4 4 4 4 4 4 4 4 4 4 4 4 4 4
4 2 2 2 2 2 2 3 3 3 3 3 3 3 3 3 3 4 4 4 4 4 4 4 4 4 4 4 4 4 4 4 4
5 2 2 2 2 2 3 3 3 3 3 3 3 3 3 3 3 4 4 4 4 4 4 4 4 4 4 4 4 4 4 4 4
6 2 2 2 3 3 3 3 3 3 3 3 3 3 3 3 3 4 4 4 4 4 4 4 4 4 4 4 4 4 4 4 4
7 3 3 3 3 3 3 3 3 3 3 3 3 3 3 3 3 4 4 4 4 4 4 4 4 4 4 4 4 4 4 4 4
8 3 3 3 3 3 3 3 3 3 3 3 3 3 3 3 3 4 4 4 4 4 4 4 4 4 4 4 4 4 4 4 4
9 3 3 3 3 3 3 3 3 3 3 3 3 3 4 4 4 4 4 4 4 4 4 4 4 4 4 4 4 4 4 4 4
A 3 3 3 3 3 3 3 3 3 3 3 3 4 4 4 4 4 4 4 4 4 4 4 4 4 4 4 4 4 4 4 4
B 3 3 3 3 3 3 3 3 3 3 3 4 4 4 4 4 4 4 4 4 4 4 4 4 4 4 4 4 4 4 4 4
C 3 3 3 3 3 3 3 3 3 3 4 4 4 4 4 4 4 4 4 4 4 4 4 4 4 4 4 4 4 4 4 4
D 3 3 3 3 3 3 3 3 4 4 4 4 4 4 4 4 4 4 4 4 4 4 4 4 4 4 4 4 4 4 4 4
E 3 3 3 3 3 4 4 4 4 4 4 4 4 4 4 4 4 4 4 4 4 4 4 4 4 4 4 4 4 4 4 4
F 4 4 4 4 4 4 4 4 4 4 4 4 4 4 4 4 4 4 4 4 4 4 4 4 4 4 4 4 4 4 4 4
10 4 4 4 4 4 4 4 4 4 4 4 4 4 4 4 4 4 4 4 4 4 4 4 4 4 4 4 4 4 4 4 4
11 4 4 4 4 4 4 4 4 4 4 4 4 4 4 4 4 4 4 4 4 4 4 4 4 4 4 4 4 4 4 4 4
12 4 4 4 4 4 4 4 4 4 4 4 4 4 4 4 4 4 4 4 4 4 4 4 4 4 4 4 4 4 4 4 4
13 4 4 4 4 4 4 4 4 4 4 4 4 4 4 4 4 4 4 4 4 4 4 4 4 4 4 4 4 4 4 4 4
14 4 4 4 4 4 4 4 4 4 4 4 4 4 4 4 4 4 4 4 4 4 4 4 4 4 4 4 4 4 4 4 4
15 4 4 4 4 4 4 4 4 4 4 4 4 4 4 4 4 4 4 4 4 4 4 4 4 4 4 4 4 4 4 4 4
16 4 4 4 4 4 4 4 4 4 4 4 4 4 4 4 4 4 4 4 4 4 4 4 4 4 4 4 4 4 4 4 4
17 4 4 4 4 4 4 4 4 4 4 4 4 4 4 4 4 4 4 4 4 4 4 4 4 4 4 4 4 4 4 4 4
18 4 4 4 4 4 4 4 4 4 4 4 4 4 4 4 4 4 4 4 4 4 4 4 4 4 4 4 4 4 4 4 4
19 4 4 4 4 4 4 4 4 4 4 4 4 4 4 4 4 4 4 4 4 4 4 4 4 4 4 4 4 4 4 4 4
1A 4 4 4 4 4 4 4 4 4 4 4 4 4 4 4 4 4 4 4 4 4 4 4 4 4 4 4 4 4 4 4 4
1B 4 4 4 4 4 4 4 4 4 4 4 4 4 4 4 4 4 4 4 4 4 4 4 4 4 4 4 4 4 4 4 4
1C 4 4 4 4 4 4 4 4 4 4 4 4 4 4 4 4 4 4 4 4 4 4 4 4 4 4 4 4 4 4 4 4
1D 4 4 4 4 4 4 4 4 4 4 4 4 4 4 4 4 4 4 4 4 4 4 4 4 4 4 4 4 4 4 4 4
1E 4 4 4 4 4 4 4 4 4 4 4 4 4 4 4 4 4 4 4 4 4 4 4 4 4 4 4 4 4 4 4 4
1F 4 4 4 4 4 4 4 4 4 4 4 4 4 4 4 4 4 4 4 4 4 4 4 4 4 4 4 4 4 4 4 4
```

Axis values are 5-bit hexadecimal magnitude representations of 6-bit 2's complement inputs.

The Table has two 5-bit inputs and it produces a 3-bit value ranging from 0 to 4 as shown in Table 2.4 as an output. The output value is called the Table Value. The Table Value is translated into a 3 bit Magnitude Factor, depending upon the Radix system being used for the FFT Pass. As shown in FIG. 24, the Table Value is passed through Radix-Adjustor logic. The Radix-Adjustor adjusts the Table Value for the desired Radix and outputs the value on M#(2:0) lines as an output which is fed to the Maximum-Detector. The Radix-Adjustor adjusts the Table Value as shown in Table 2.5.

TABLE 2.5

MAGNITUDE ADJUSTER TABLE

| RADIX MODE | TABLE VALUE | VALUE SENT TO MAX DETECTOR | | |
|---|---|---|---|---|
| | | M ≠ (2) | M ≠ (1) | M ≠ (0) |
| 16 | 4 | 1 | 0 | 0 |
| | 3 | 0 | 1 | 1 |
| | 2 | 0 | 1 | 0 |
| | 1 | 0 | 0 | 1 |
| | 0 | 0 | 0 | 0 |
| 4 | 4 | 0 | 1 | 0 |
| | 3 | 0 | 0 | 1 |
| | 2 | 0 | 0 | 0 |
| | 1 | 0 | 0 | 0 |
| | 0 | 0 | 0 | 0 |
| 2 | 4 | 0 | 0 | 1 |
| | 3 | 0 | 0 | 0 |
| | 2 | 0 | 0 | 0 |
| | 1 | 0 | 0 | 0 |
| | 0 | 0 | 0 | 0 |

Note that a Radix Adjustor chooses between Radix-4 and Radix-2 by evaluating instruction bits I(3:0) for instructions BFLY4 and BFLY2. Although the CE does not support a Radix-16 butterfly on a single chip, a radix-16 mode has been included in the Radix-mode-Adjustor. Note that a Radix-16 butterfly can easily be implemented by several Quad I/O CEs, each CE implementing a BFLY4 instruction. The Radix-Adjustor detects a Radix-16 mode by detecting a BFLY4 instruction and a logic-high value on the external RMB (Radix Mode Bit) pin.

2.10.2 Scale-Factor Accumulator

A Scale-Factor (SF) Accumulator has been included on the CE which keeps a running accumulation of the SFs at every Pass. It is an accumulation of various SFs applied on previous Passes. The Accumulated SF from the Final Pass can be used to normalize the block of the processed data.

Figure 25:
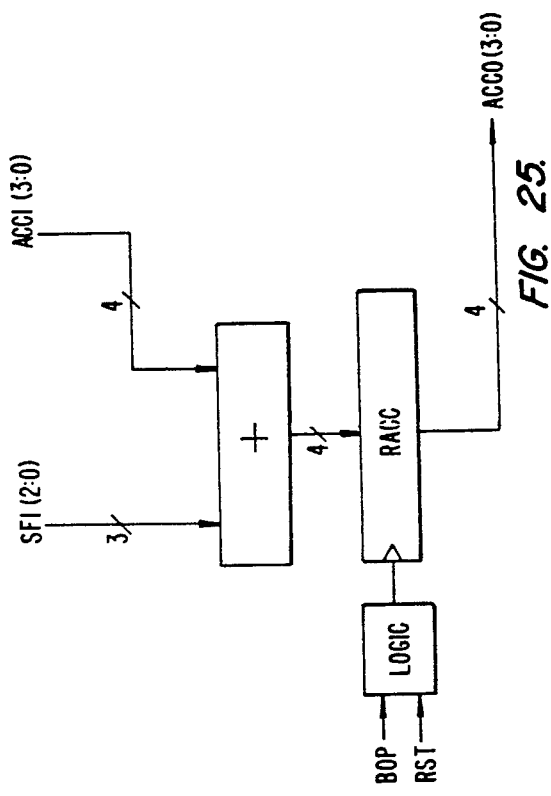
FIG. 25 is a block diagram representing the Scale-Factor Accumulator.

A block diagram of the Scale Factor Accumulator is shown in FIG. 25. The input value on SFI(2:0), which is also fed to the input shifters, and input data on ACCI (3:0) pins is added by using a 4 bit adder. The output of the adder is latched into a register RACC by using the signal BOP (Beginning Of Pass). The contents of RACC are driven on the output pins ACCO(3:0). When several CEs are cascaded, the ACCI(3:0) inputs of a current CE are fed from ACCO(3:0) outputs from a previous device. When single CE is used recursively, the ACCI and ACCO pins are tied together. As discussed in the previous section, the SFO(2:0) signals which, in-turn, feed the next SFI(2:0) are latched on the EOP signal. Therefore, the adder output (FIG. 25) is well settled by the time BOP signal is applied to the RACC. The BOP signal from pins is directly used to latch the RACC register without any pipeline latency. Note that the RACC register can be cleared (set to zero) any time by applying an external RST (Reset) signal. The RST signal is applied to RACC directly without any pipeline latency.

2.11 OVERFLOW SIGNAL—OVF

The CE has an output pin, designated as OVF, which signals the overflow from the Processor-A, Processor-B and SF-accumulator in a time multiplexed fashion.

Figure 26:
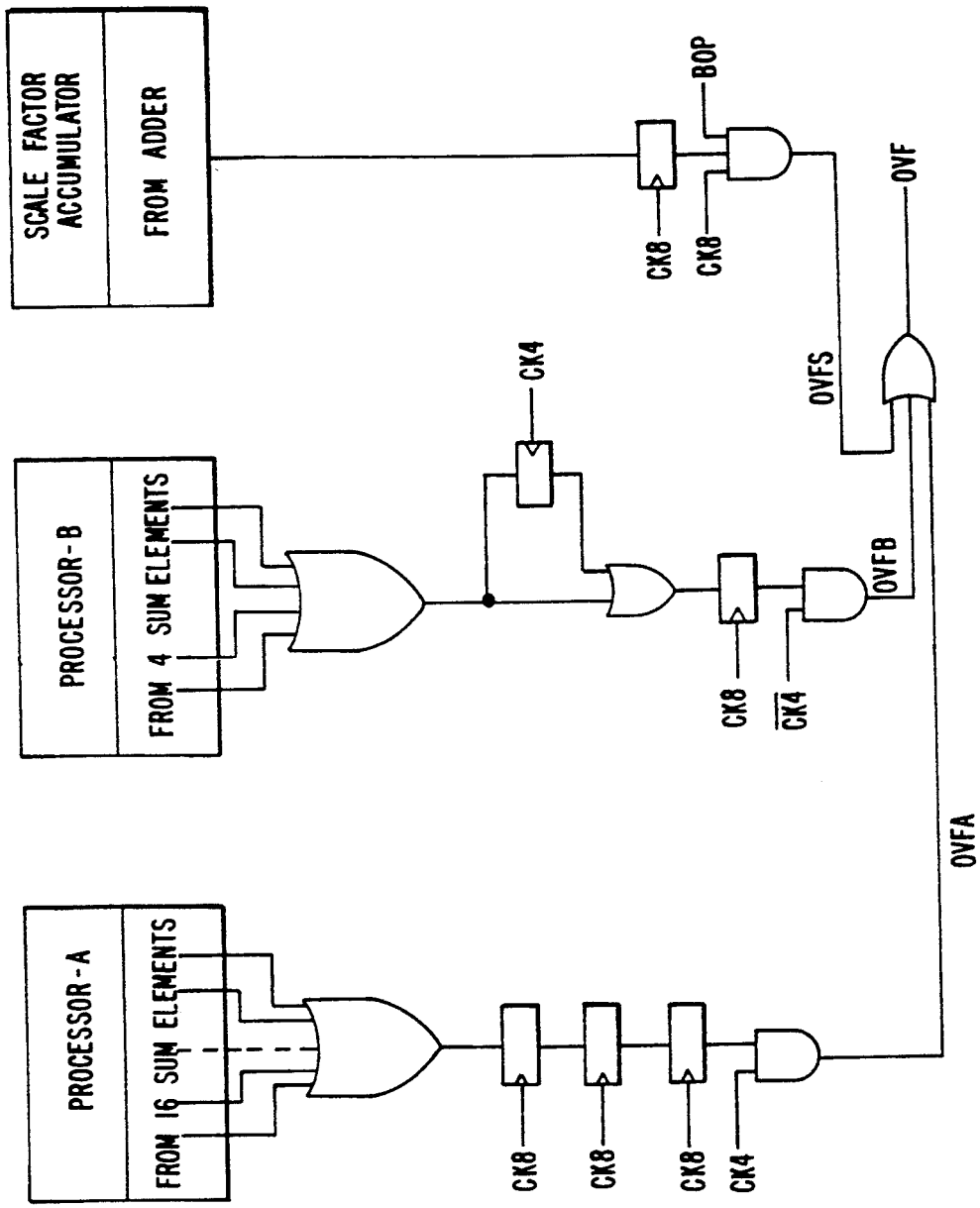
FIG. 26 is a block diagram of the OVF generator.

A block diagram of the OVF generator is shown in FIG. 26. As discussed in the previous section, the SF-Accumulator is updated once every pass by using the BOP signal. On the BOP signal, the overflow from the SF-Accumulator is outputted on the OVF pin for one machine cycle. As initiated by the BOP signal, the valid data is inputted to the CE from the next machine-cycle onwards. Once data begins to arrive at the output, the corresponding overflow signals from the Processor-A and Processor-B also arrive on the OVF pin along with data. When a specific output set of values, (x+jy)[3:0], is being outputted on to the output pins, during a machine-cycle, the corresponding overflow is outputted during the same machine cycle. During the first half of the machine-cycle, the overflow from Processor-A, OVFA is outputted (FIG. 26). During the second half of the machine-cycle, the overflow from the Processor-B, OVFB, is outputted. Therefore, the overflow of Processor-A or Processor-B is detected every machine-cycle on the OVF pin. When BOP signal is applied, the overflow of the SF-Accumulator is detected for a given Pass.

As shown in FIG. 26, the overflow bits from various blocks (OVFA, OVFB and OVFS ) are appropriately delayed by using pipeline register so that alignment with the data-flow is maintained. The timing of the OVF signal and various other control signals will be clarified in forth coming sections. Note that the overflow for BFLY4/BFLY2 Passes can be protected by using the Conditional Scaling, provided on the CE. Similarly, for other Passes, the overflow can be protected by applying appropriate scale factors externally. However, the OVF output may be used as a diagnostic output to ensure the non-overflow.

2.12 VARIOUS SIGNALS AND PIPELINING

The CE is a pipelined device as mentioned earlier. All the input/output signals have been carefully pipelined so that the pipelining does not cause any inconvenience to the user. The data pipelining have been well explained in the previous sections. In this section, the pipelining of various signals is described in relation to the input/output data.

Various I/O signals of the CE can be divided into separate categories, as discussed below.

2.12.1 General Pipelined Signals

These signals flow in a pipeline along with the data to control various blocks of the CE. These signals should be applied, at least, one machine cycle before the machine cycle during which the first set of data-block is inputted (to be impacted). Following are the signals in this category.

SFI(2:0)—Scale Factor Inputs
XSIN—Auxiliary Scale Factor Input
I(5:0)—Instruction inputs
SPLM—Special Mode Bit
RMB—Radix Mode Bit
EOP—End of Pass Signal
BOP—Beginning of Pass Signal All these signals are sampled into CE on a positive-going edge of the 1/Tm(CK8) clock. Due to the internal pipelining of these signals, to match the data pipeline, the data can be applied in the next machine cycle without having to wait for the propagation of those signals to all the pipeline stages. These signals can be changed to start a different Pass, while the data corresponding to previous Pass is still flushing through the pipe. Although, in typical applications, these signals will be changed after the data for a current Pass is flushed through the chip.

All the signals, except EOP and BOP, are static signals, which typically remain static on pins for the whole Pass. Therefore, these signals are called Pass-Static. The BOP and EOP are pulsed signals which are activated only once during each Pass. These are called Pass-Pulsed signals. The EOP and BOP are sampled on the positive edge of the 1/Tm Clock. The EOP and BOP should not exceed the machine-period of the CE.

2.12.2 Reset Signal

The Reset (RST) signal is used to initially reset the device. It is used to reset the registers RSF and RACC to zero. This signal is not pipelined internally. It directly impacts those registers as long as it is active (high). The signal is sampled on the positive edge of the 1/Tm clock.

2.12.3 BM and CONFIG Signals.

The BM (Bus Mode) and CONFIG (Configure) signals are pipelined either. These signals are also static in nature, impacting the CE as long as they are active. These signals directly impact the corresponding block of the CE when applied. The signals are sampled on the positive edge of the 1/Tm clock.

2.12.4 DIR Signal

The DIR (Directional) signal is Pass-Static when device is used in a mode corresponding to CON- FIG=0. The signal is switched dynamically when CONFIG=1, as shown in previous sections. The signal is directly connected to internal direction buffers of the CE without any pipelining.

2.12.5 COMP(7:0) Signals

These signals, which control the Complementers on the input data section (when bit SPLM is high), are as dynamic as data. The signals are sampled, along with the data values, using positive edges of CK4(2Tm) clock. The signals are sampled at the same time the data, which is to be impacted, is sampled.

2.12.6 Pipelining Timing Diagrams (CONFIG=0)

Figure 27:
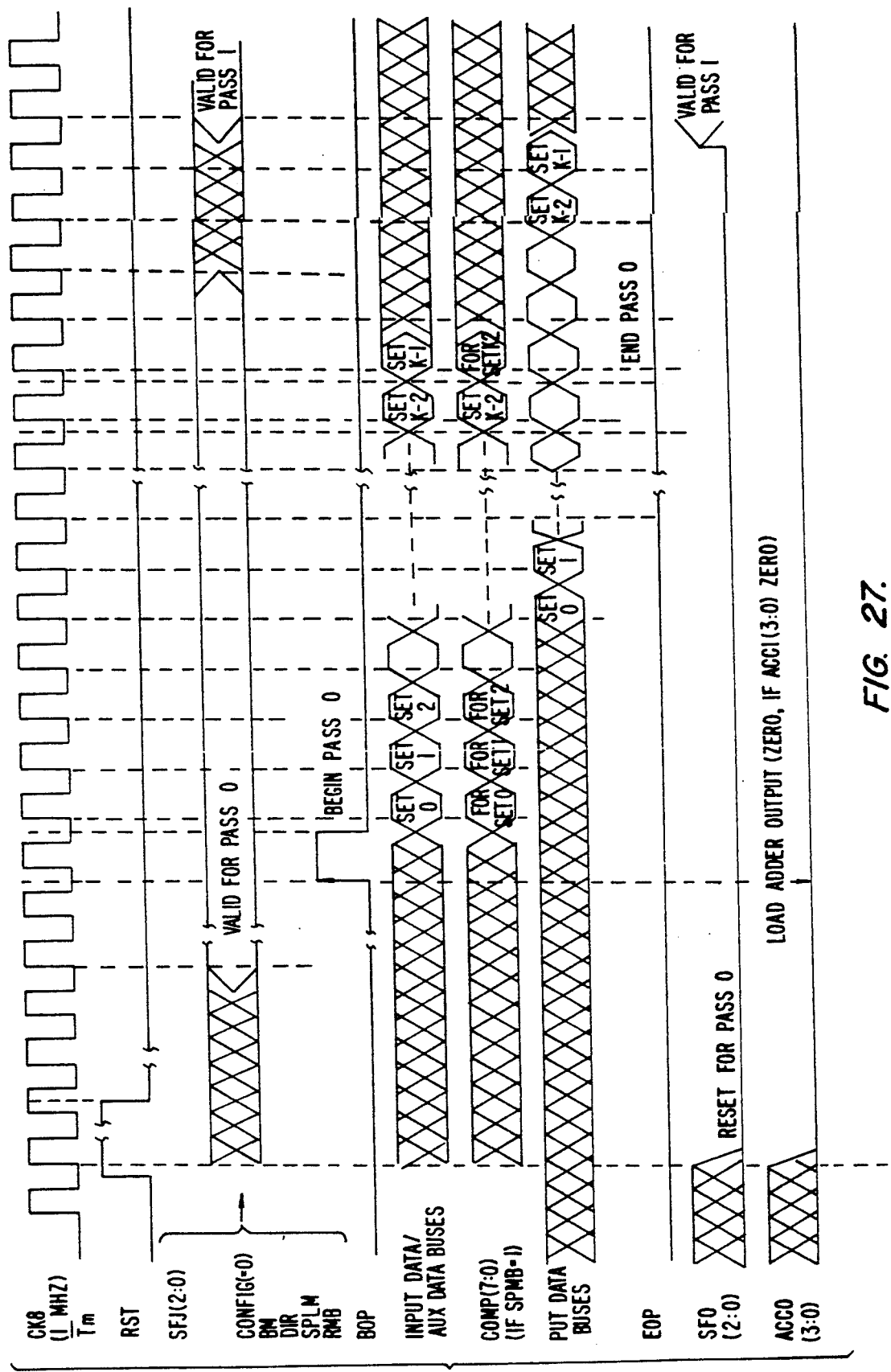
FIG. 27 is a timing diagram of a Pass of N Complex Values through the CE.

A timing diagram, showing the timing of a Pass of N Complex Values through the CE, is shown in FIG. 27. There are K input data sets and K output data sets. Except FFT2N Instruction, each Instruction deals with sets of four Complex Values. For those instructions, K=N/4. The timing shown here corresponds to a system where separate Read and Write memories are employed (CONFIG.=0). Therefore data flows in one direction only during any Pass.

The timing diagram is related to the CK8 Clock (1/Tm), which is always produced as an output. Initially, a RST signal is applied to the CE as shown in FIG. 27. The RST can be of any duration, but a minimum of one machine-cycle. After the RST signal, various Pass-Static signals are applied as shown in FIG. 27. After one machine-cycle (from the application of the Pass-Static signals), the device is ready to begin a Pass. The start of valid incoming data is marked by the BOP (Beginning of Pass) signal. Note that the BOP can be applied any time after one machine-cycle on which the Pass-Static signals were set up. The valid data must be applied one machine-cycle after the BOP has been sampled by the CK clock. Therefore, the Set-0 of the data-/aux-data is fed in the next machine-cycle as shown in FIG. 27. As discussed earlier, normally, a set consists of four complex values. The detailed timing of input/output buses, which depends on signals BM and CONFIG, have been discussed in the previous sections. The FIG. 27 shows the transfer of a set of values by showing buses to be active during a machine-cycle. In practice, the buses will switch two or four times, depending upon the BM (Bus Mode), as discussed in the previous sections.

Along with the Set-0 of the data, the corresponding Comp(7:0) signals are also applied, if SPLM (Special Mode Bit) is set to a logic high (for FFT instructions). The next sets of values are applied in succession, as shown in FIG. 27. The first set of output values (Set-0), appears on the output buses three cycles after the Set-0 was fed-in, due to the pipeline latency of the machine. The input/output process continues in this fashion until an EOP (End of Pass) signal is applied as shown in FIG. 27. The EOP must be applied so that it is sampled by the CK8 clock one machine-cycle before the last set of input-data is to be fed-in. After the last set (Set K−1) has been fed-in, the output Sets continue to be produced for another four cycles due to the latency. A pipelined EOP signal is used to latch the final Scale-Factor (SF) into the RSF register, on the next machine-cycle after the last set has been output. The SF is now available for the next Pass, as shown in FIG. 27 on the SFO (2:0) pins.

The whole process of the next Pass ( Pass I) can now begin by setting-up the next group of Pass-Static Signals, etc. as shown in FIG. 27. Note that the BOP signal is used to perform the accumulation of the SF. The ACCO(3:0) is not shown changing in FIG. 27. The ACC is initially cleared by the RST. The ACC does not change in Pass-0 due to the BOP signal, because ACCI is assumed to be zero in the Pass-0, producing a zero output at ACCO (3:0).

2.12.7 Pipelining Timing Diagrams (CONFIG=1)

Figure 28:
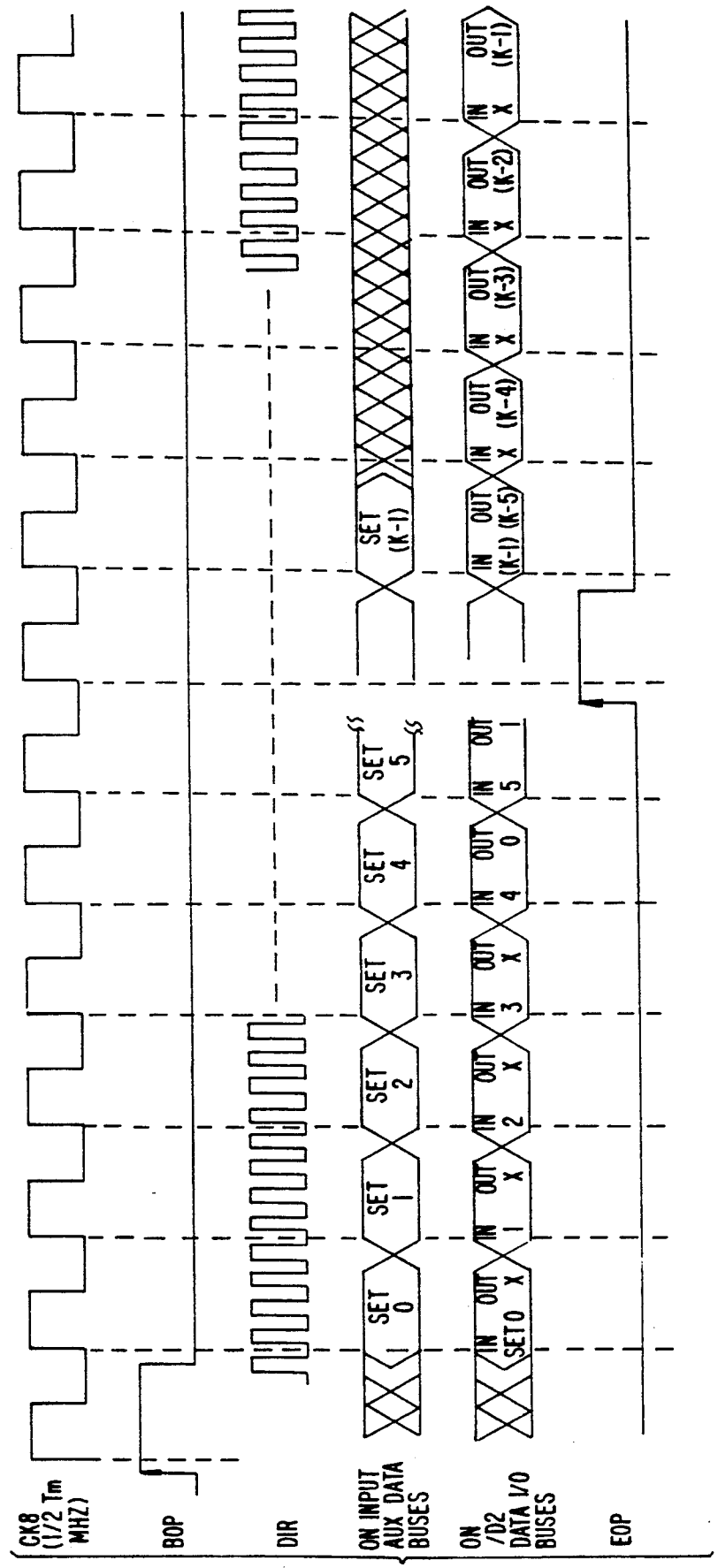
FIG. 28 is timing diagram for a Pass of K sets of values.

The timing diagram for a Pass of K sets of values, as above, is shown in FIG. 28. It is assumed that the system employs a single Read/Write memory, therefore CONFIG pin is in a logic high state. The data buses are used in a bidirectional mode for alternate Read/Write, controlled by DIR signal as discussed before. The Reset and Pass-Static signals are applied as before. Effectively, the machine-cycle of the device stretches to 2Tm nS. The Beginning of a Pass is marked by the BOP signal as before. The Sets-0 are transferred over the next two CK8 machine-cycles. The detailed timing of the various I/O buses has been described before for this case. However, in FIG. 28, it is shown that the auxiliary data Set-0 is inputted over two machine cycles. The selected pair of data buses (D1/D2 or D3/D4) operate as bidirectional buses, performing interlaced Read/Write operations controlled by the DIR signal. The data Set-0 is inputted on alternate Read cycles over two CK8 cycles. The alternate write cycles carry the Don't Care data because valid data starts coming after the due pipeline latency.

The process continues until the cycle, during which input Set-4 is fed-in. During this cycle, the output data Set-0 appears at the output in an interlaced fashion with the data being read-in. The process continues until an EOP signal is applied, indicating the End-Of-Pass. The EOP must be applied one machine-cycle before the last valid set of data has to enter the device, as shown in FIG. 28. Note that after the last set of data has been entered, the output sets continue to come out for another four cycles due to the pipeline latency. Of course, the interlaced input data is in the Don't Care state.

2.12.8 Processor-Pipelining Timing

Figure 29:
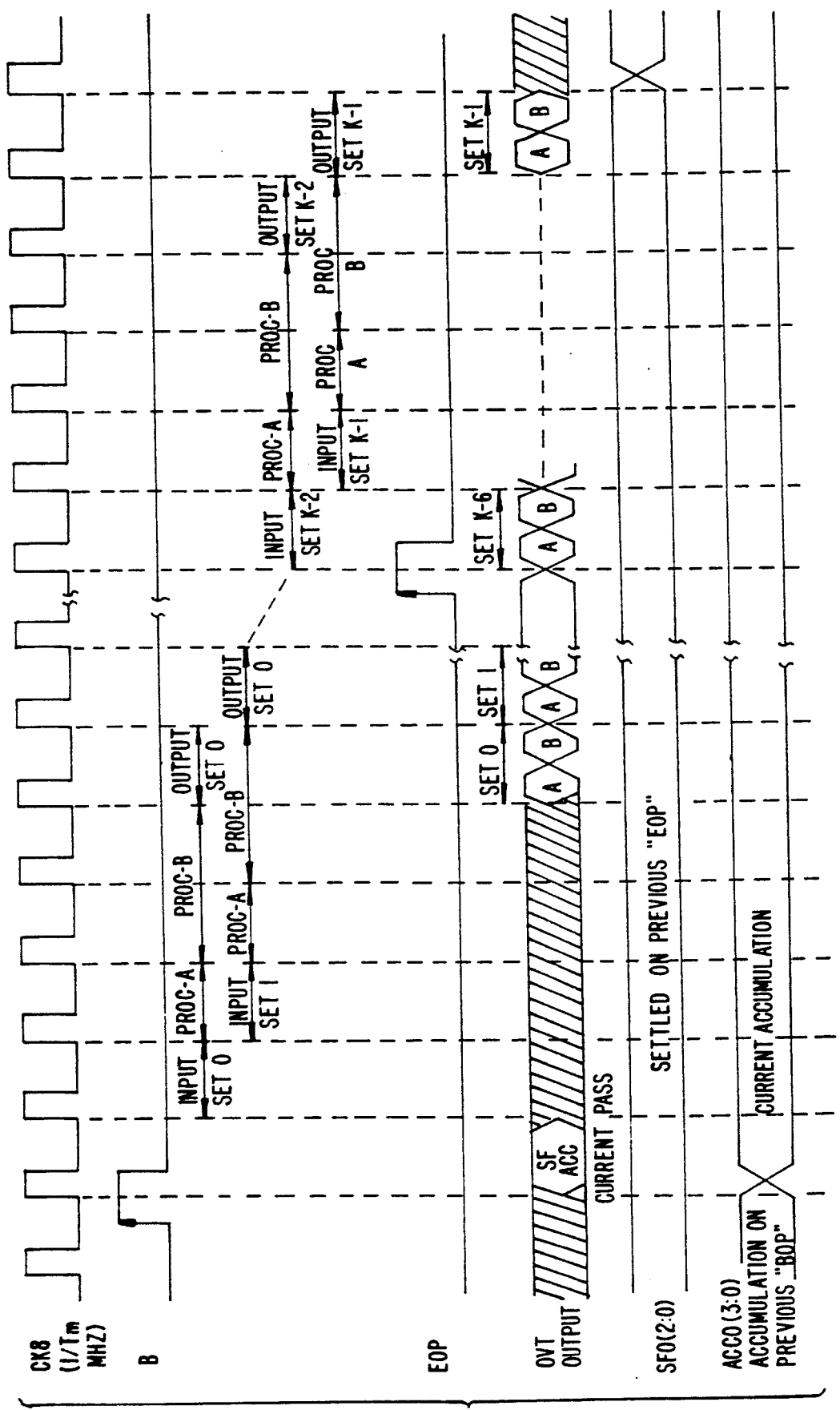
FIG. 29 is a timing diagram of the pipelining of Processor-A and Processor-B for a given Pass when CONFIG=0.

A timing diagram, showing the pipelining of the Processor-A and Processor-B is shown in FIG. 29 for a given Pass. The diagram applies to a system-mode when CONFIG=0. A diagram corresponding to CONFIG=1 can be readily produced by effectively stretching the machine-cycle to two CK8 cycles.

As before, a Pass is started by the BOP signal. During the next machine-cycle, the first set (set 0) is inputted, which is processed by the Processor-A in the next machine-cycle. Further, Processor-B processes the data over two machine-cycles. The first processed set (set 0) is outputted in the next machine-cycle. The process is repeated continuously in a pipelined fashion until signal EOP arrives, as discussed before. The data keeps coming out until the pipeline is flushed.

The overflow pin (OVF) provides the status of the overflow as shown in FIG. 29. The overflow of SF accumulator, which gets latched on the BOP signal, is provided on OVF pin in the machine-cycle following the sampling of the BOP signal. Next, the overflow from processors A and B, resulting from the processing of Set 0, is provided in the machine-cycle during which the set 0 is being outputted. The overflow from the Processor-A is provided during the first half of the machine-cycle and from Processor-B during the second half of the machine-cycle. From here on, every machine-cycle, overflows from each processor is provided corresponding to each output set until the last set is outputted.

Again, note that the SFO(2:0) outputs are produced at the end of the last output set by latching the RSF register by a pipelined EOP signal. The BOP is used to latch the SF accumulator (RACC), therefore ACCO(3:0) produces new accumulated value in the beginning of each Pass as shown in FIG. 29.

2.13 NON-FUNCTIONAL TESTING

Figure 30:
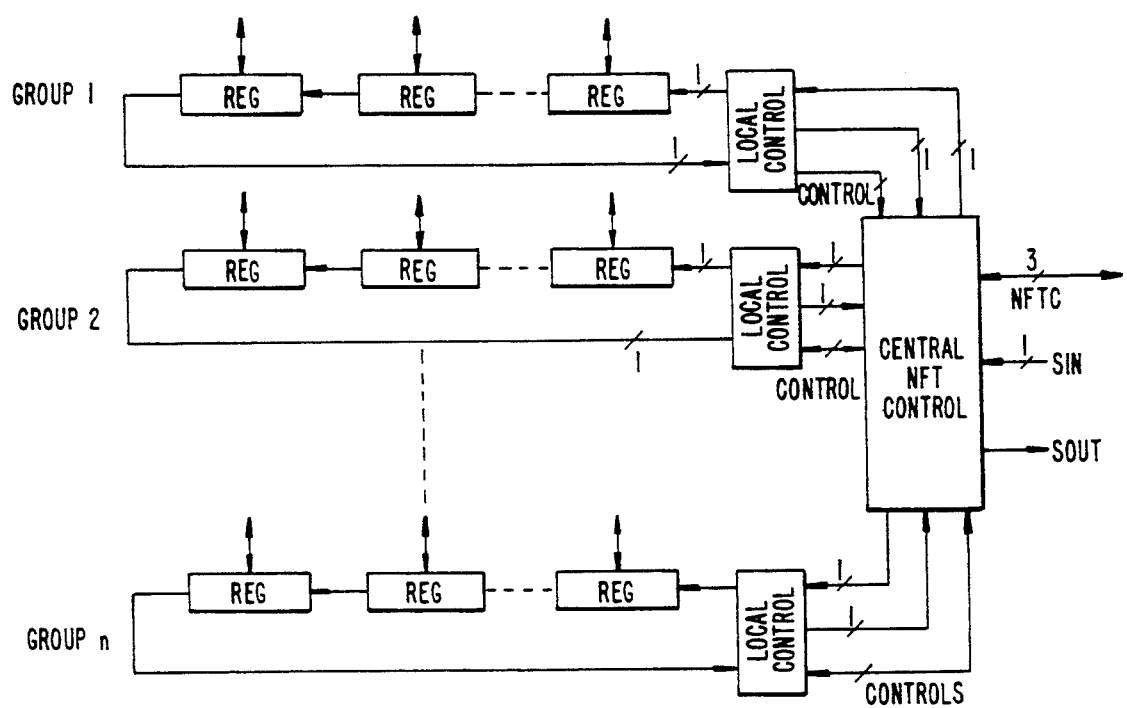
FIG. 30 is a block diagram of how the registers of the CE are divided into several different groups.

Additional hardware has been included on the CE to perform Non-Functional Testing (NFT). Various registers of the CE are read or written in a parallel fashion when CE is functioning normally. For non-functional testing various registers can be scanned-in or scanned-out by using a serial path. All the registers of the CE are divided into several different groups as shown in FIG. 30. All the registers in a group are placed on one scan path as shown. Each group has local control to handle scan-in and scan-out. All the local control blocks are controlled by a central control block. The central control block handles the interfacing to the external pins. There are two external pins for scanning-in and scanning-out. There are three additional control pins. For scanning, a particular group of registers is first selected which is read and written using external SIN/SOUT pins. Further details of the NFT logic will be determined during the design.

The NFT hardware provides additional test capability which is particularly useful for automatic test pattern generation. In addition, the NFT hardware proves very useful for diagnostic purposes, specially for development tools. The CE can be frozen any time and then data could be scanned out. A new set of data can also be scanned in.

2.14 COMPLETE BLOCK DIAGRAM

Figure 31:
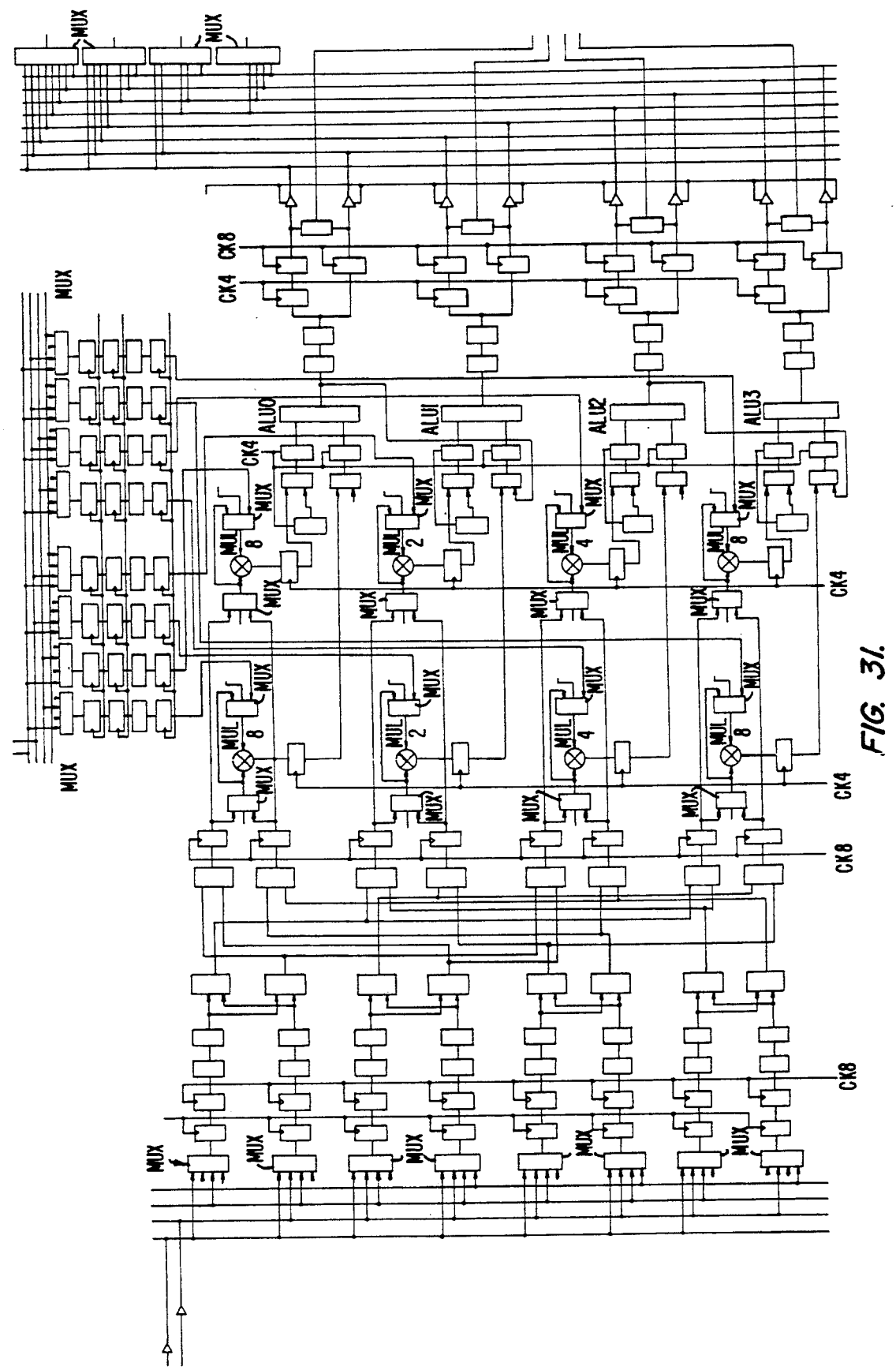
FIG. 31 is a block diagram showing all of the I/O pins of the CE.
Figure 32:
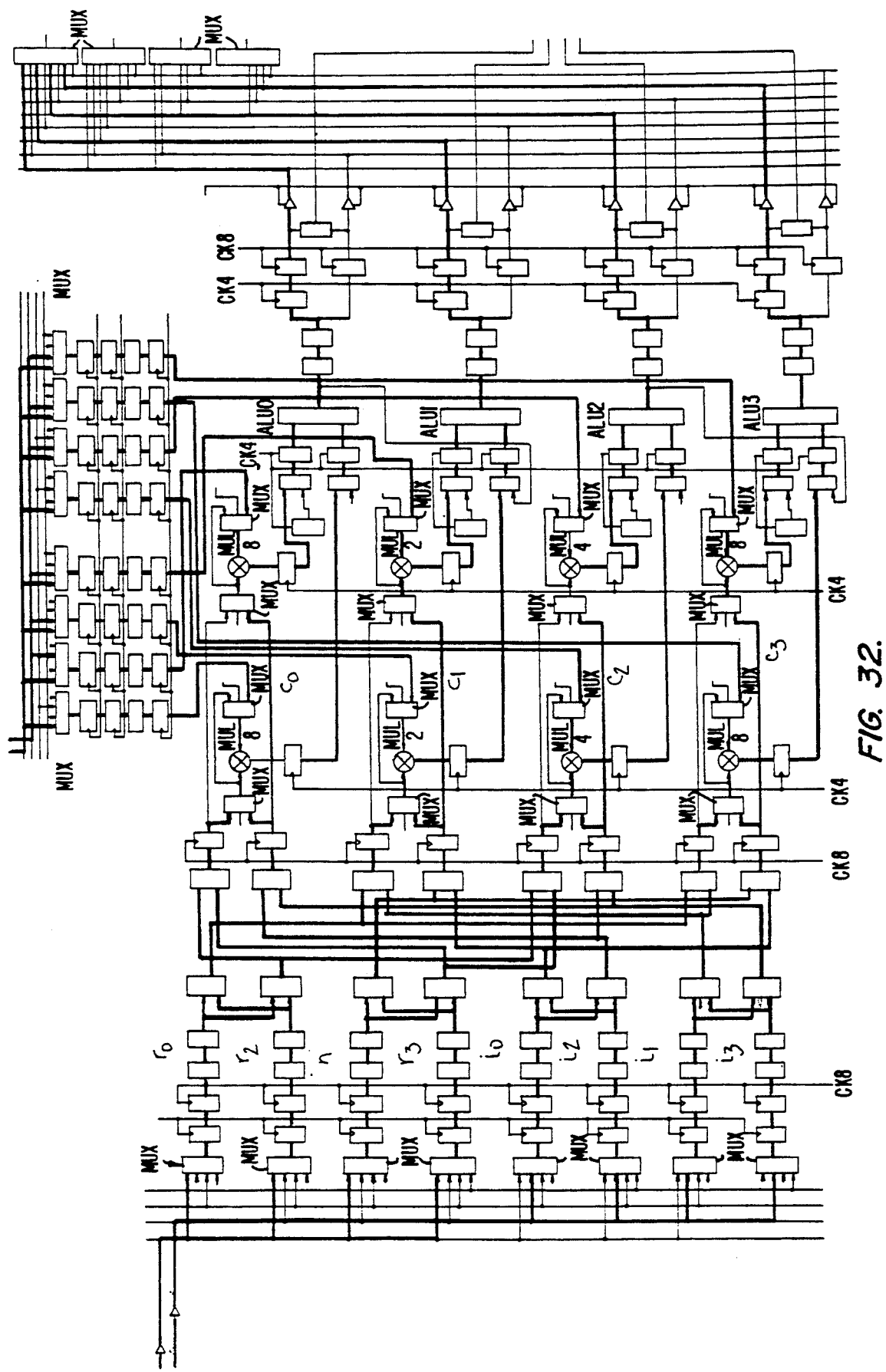
FIGS. 32 through 57 illustrate the data flow for each of the instructions discussed in Section 3.0.
Figure 33:
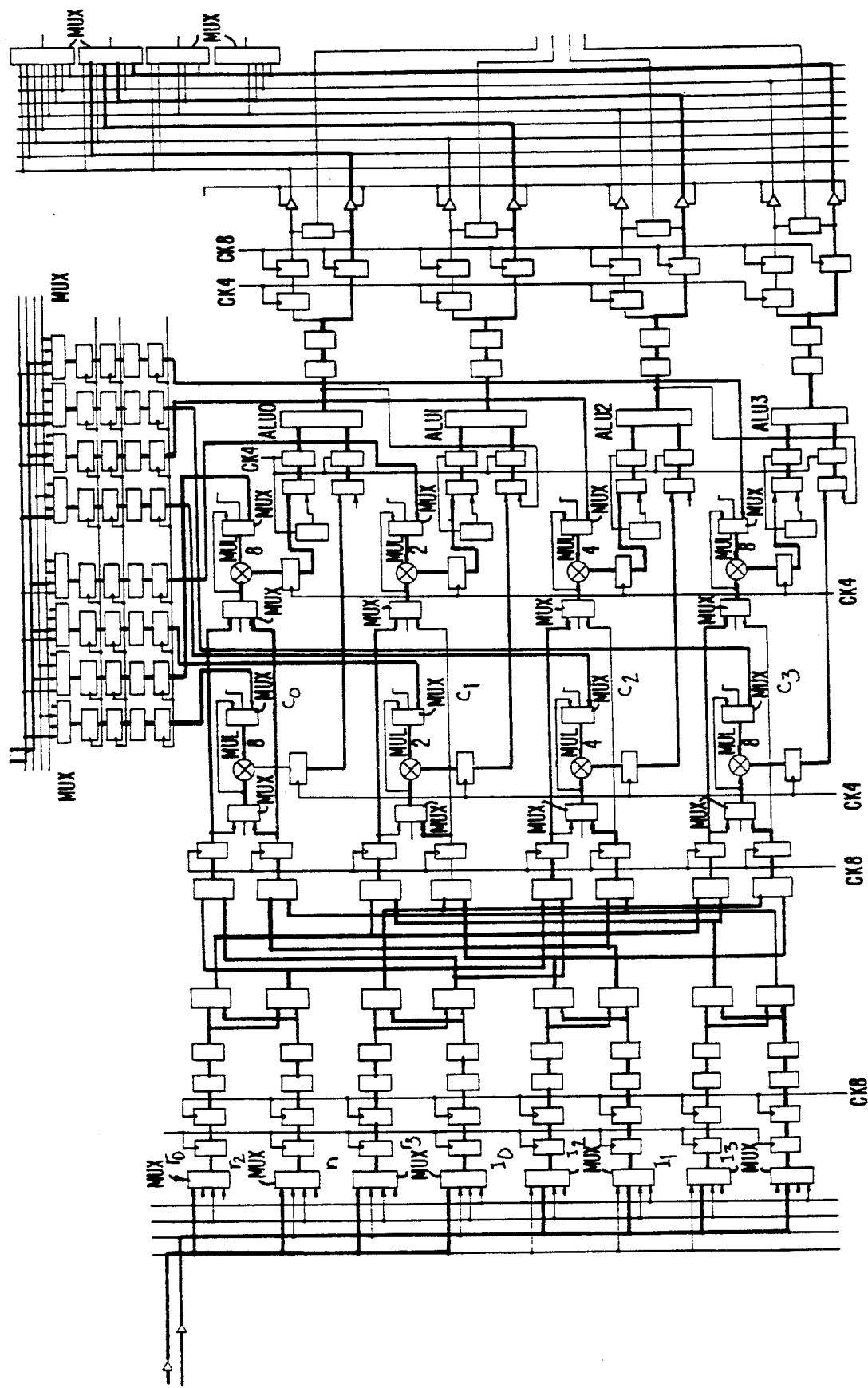
Figure 34:
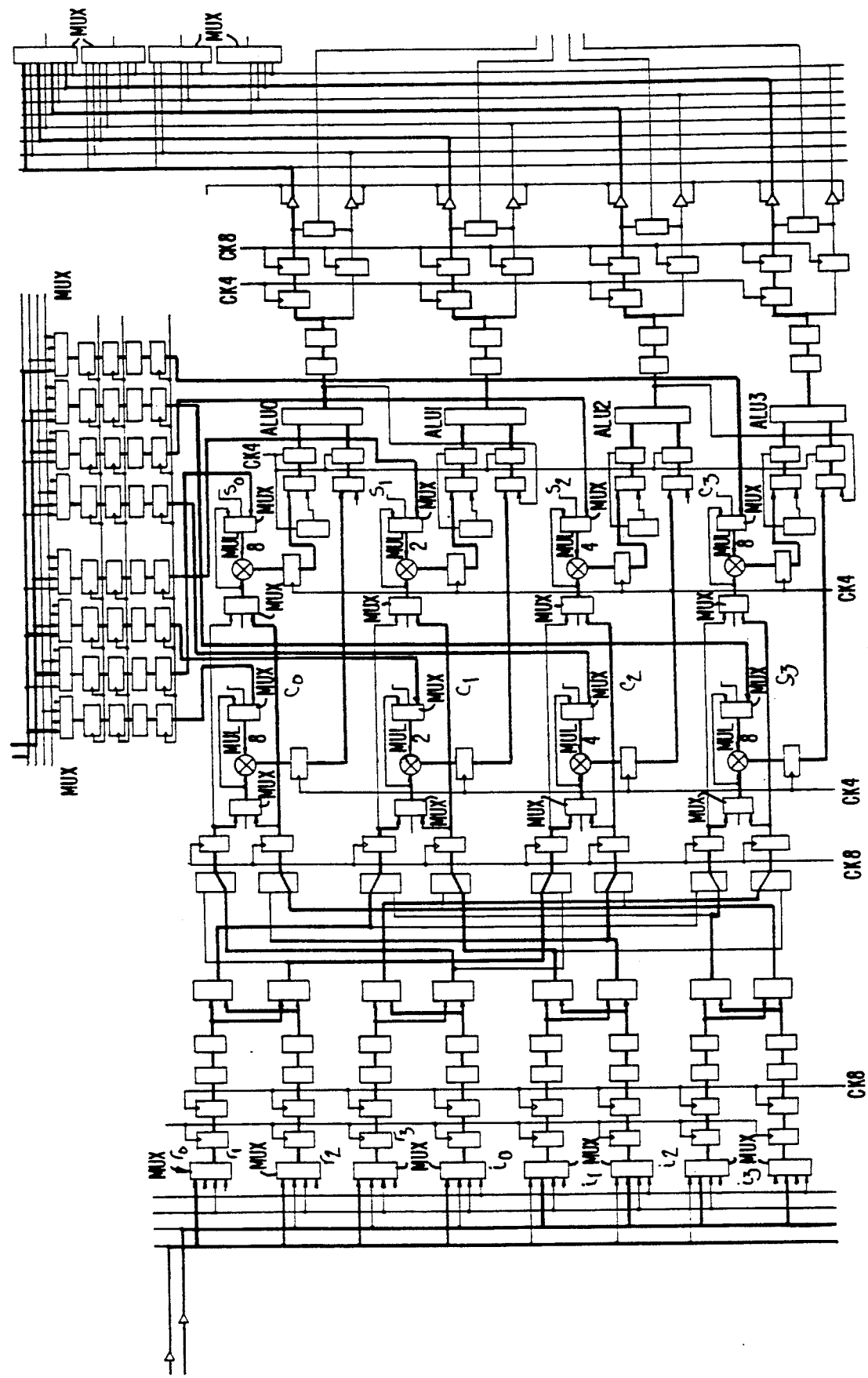
Figure 35:
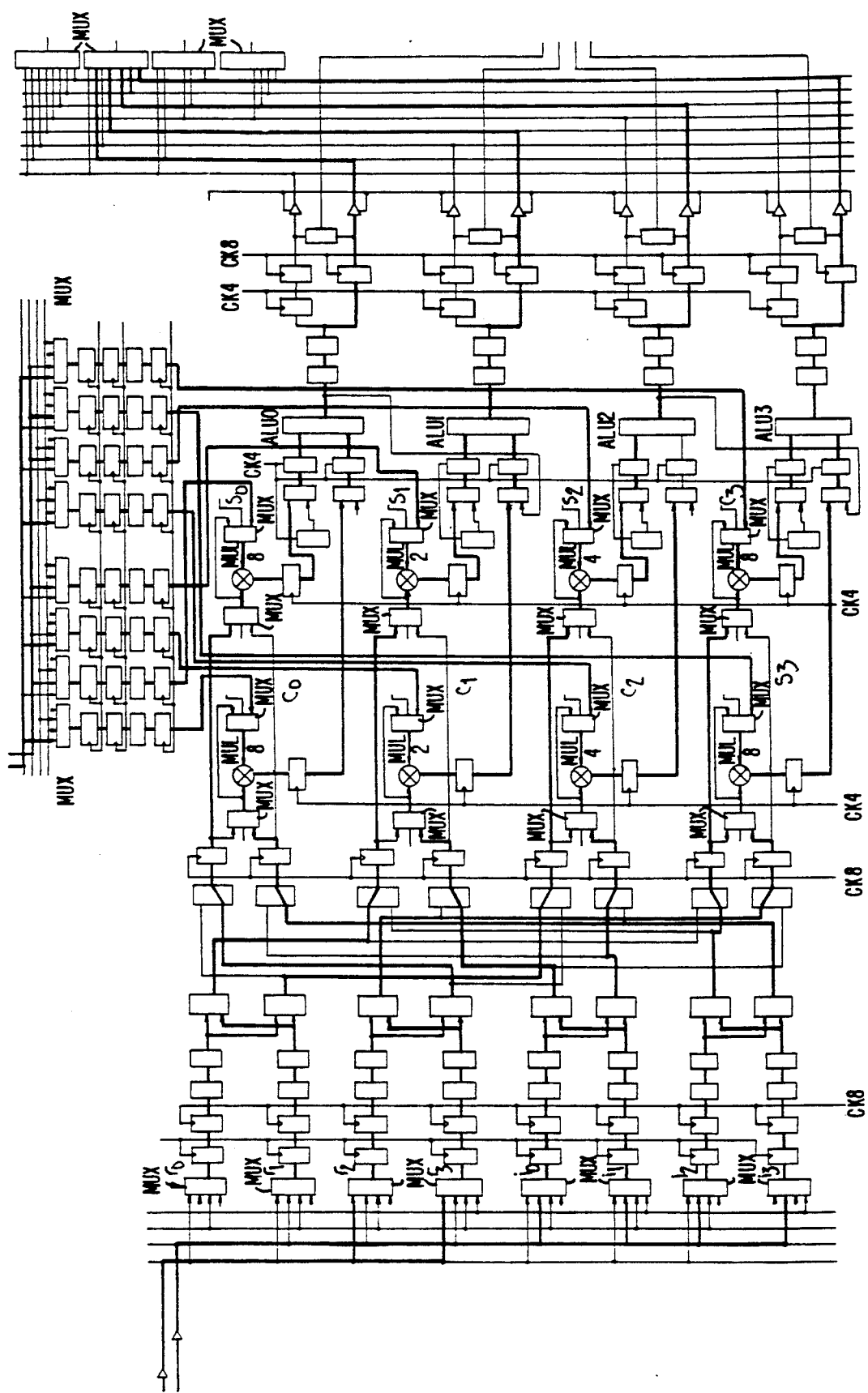
Figure 36:
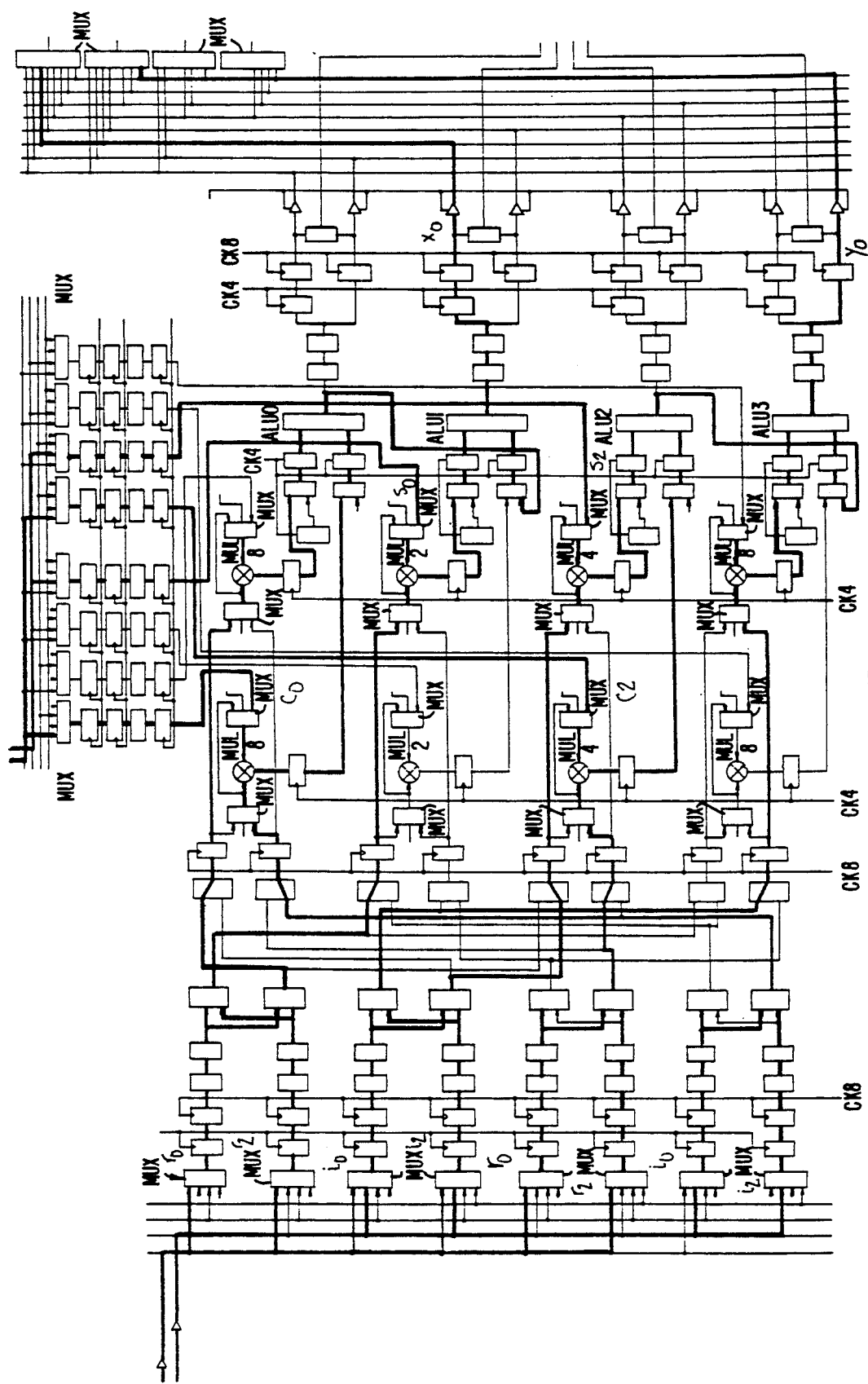
Figure 37:
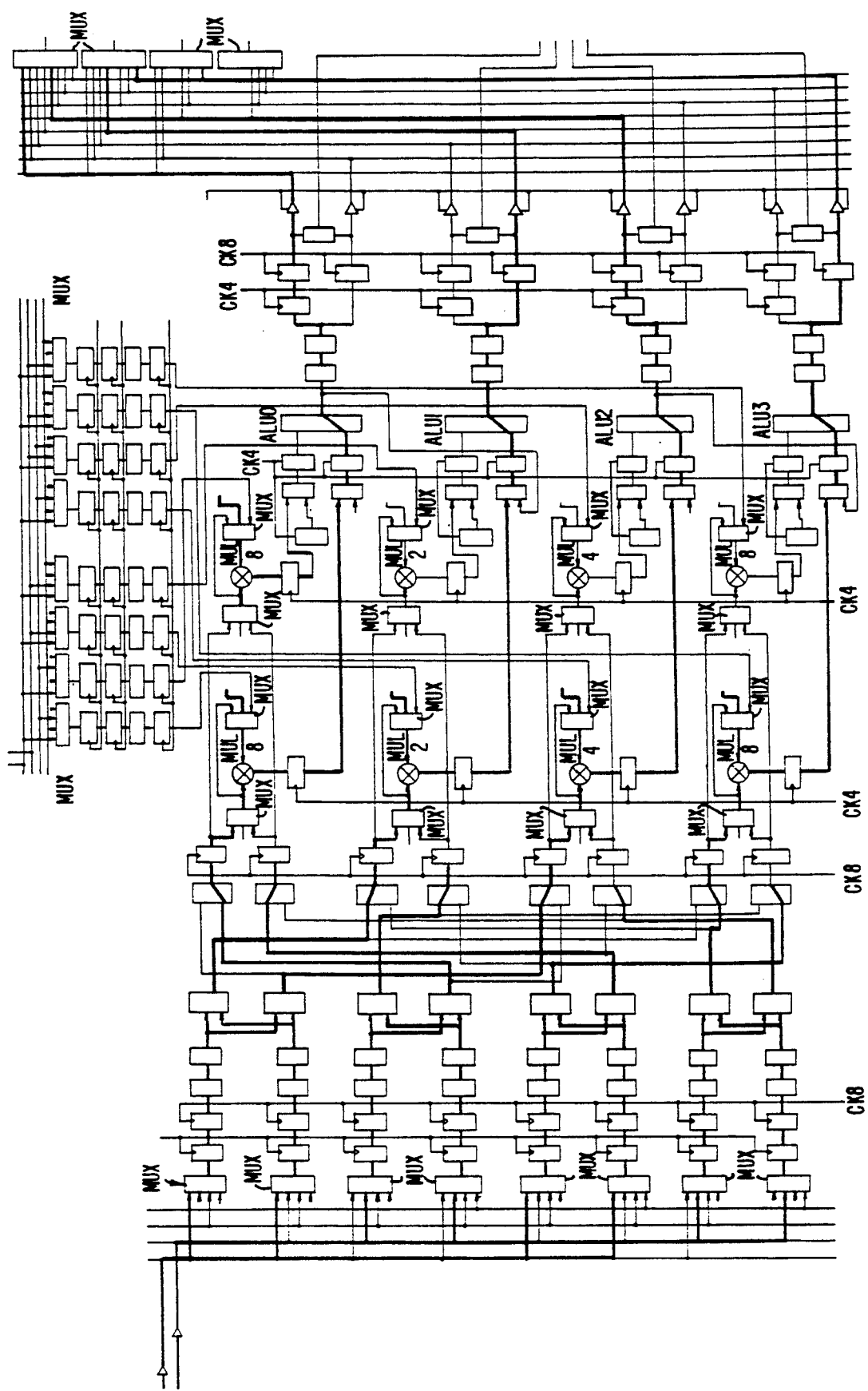
Figure 38:
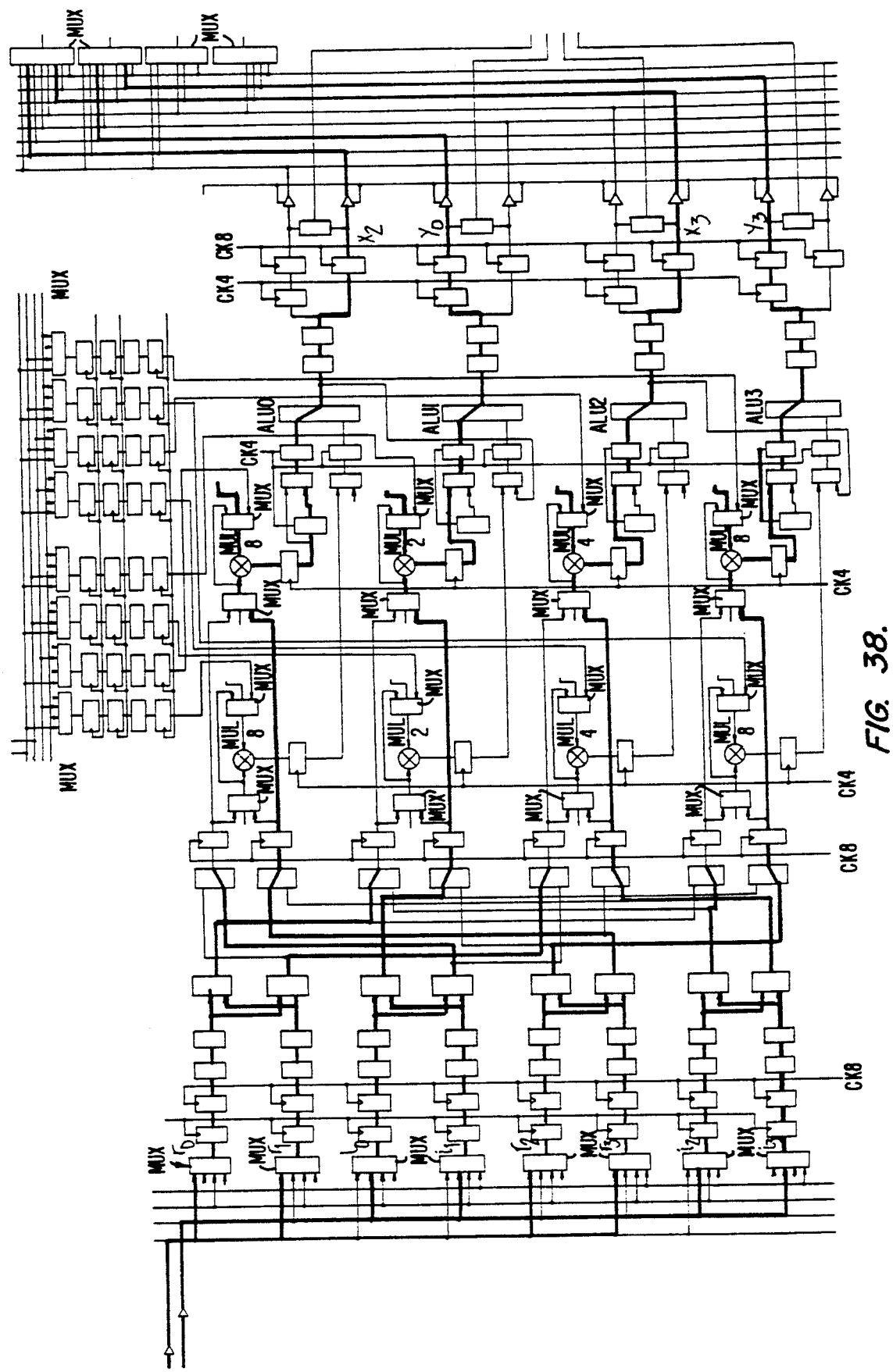
Figure 39:
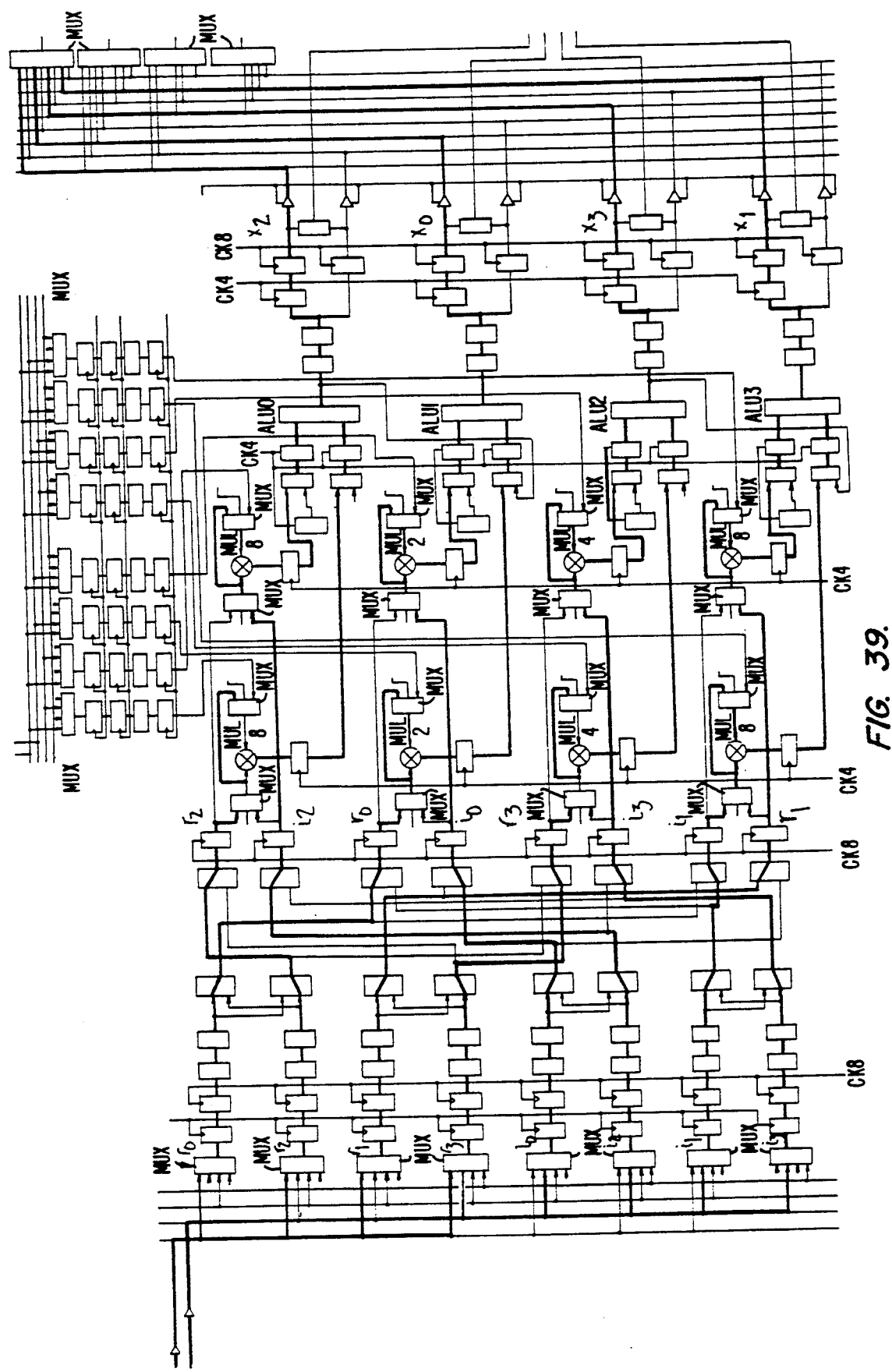
Figure 40:
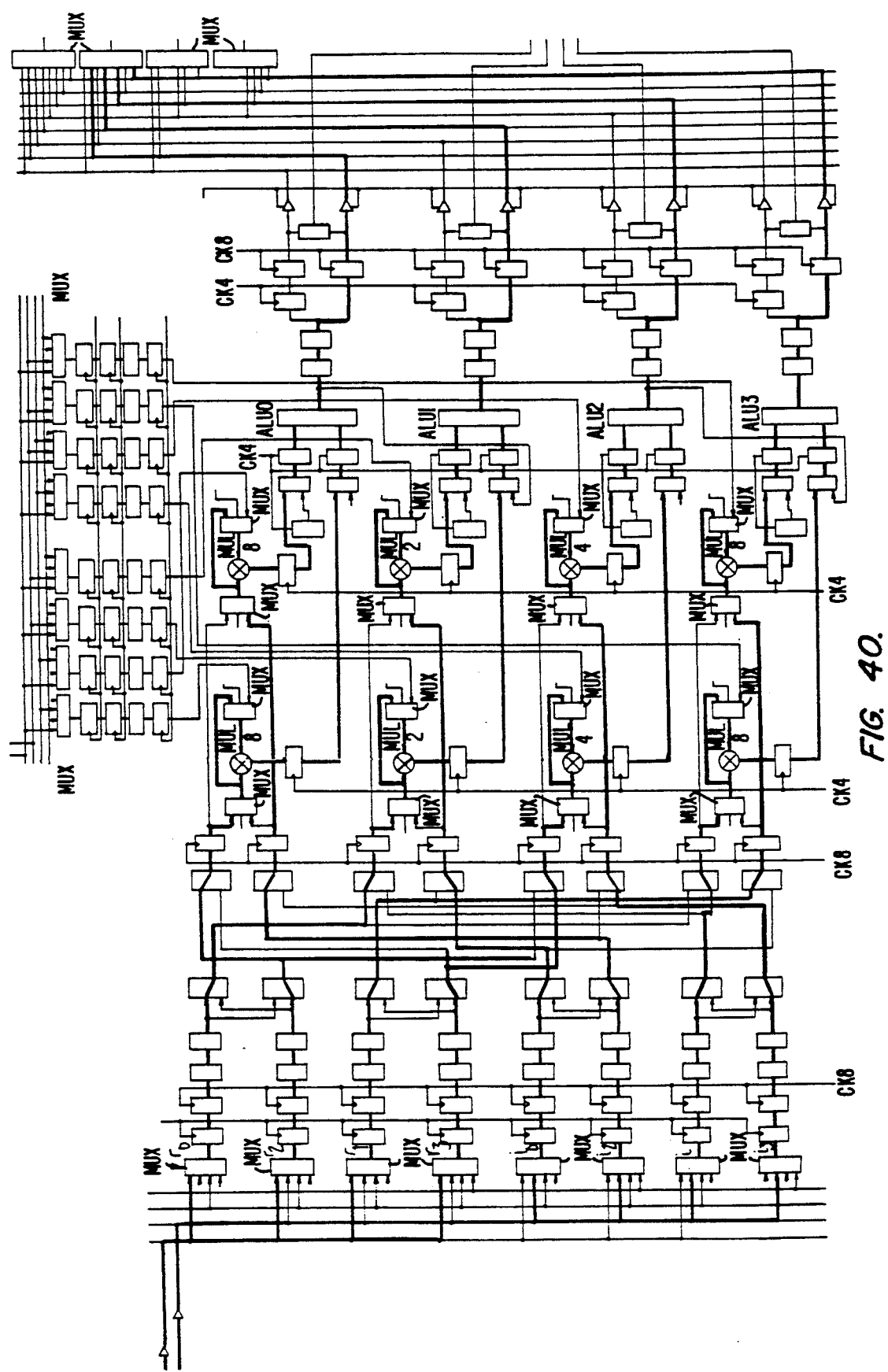
Figure 41:
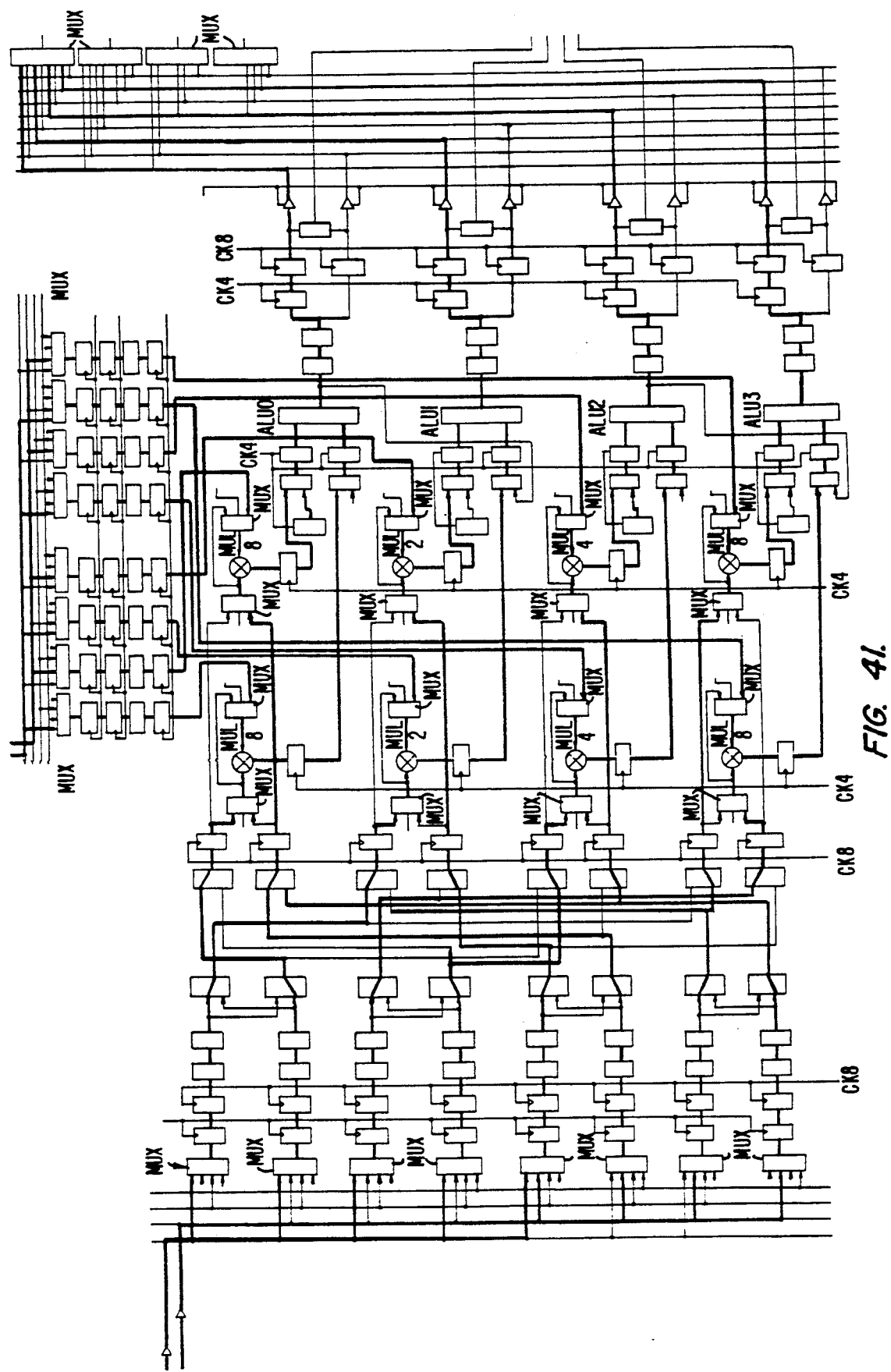
Figure 42:
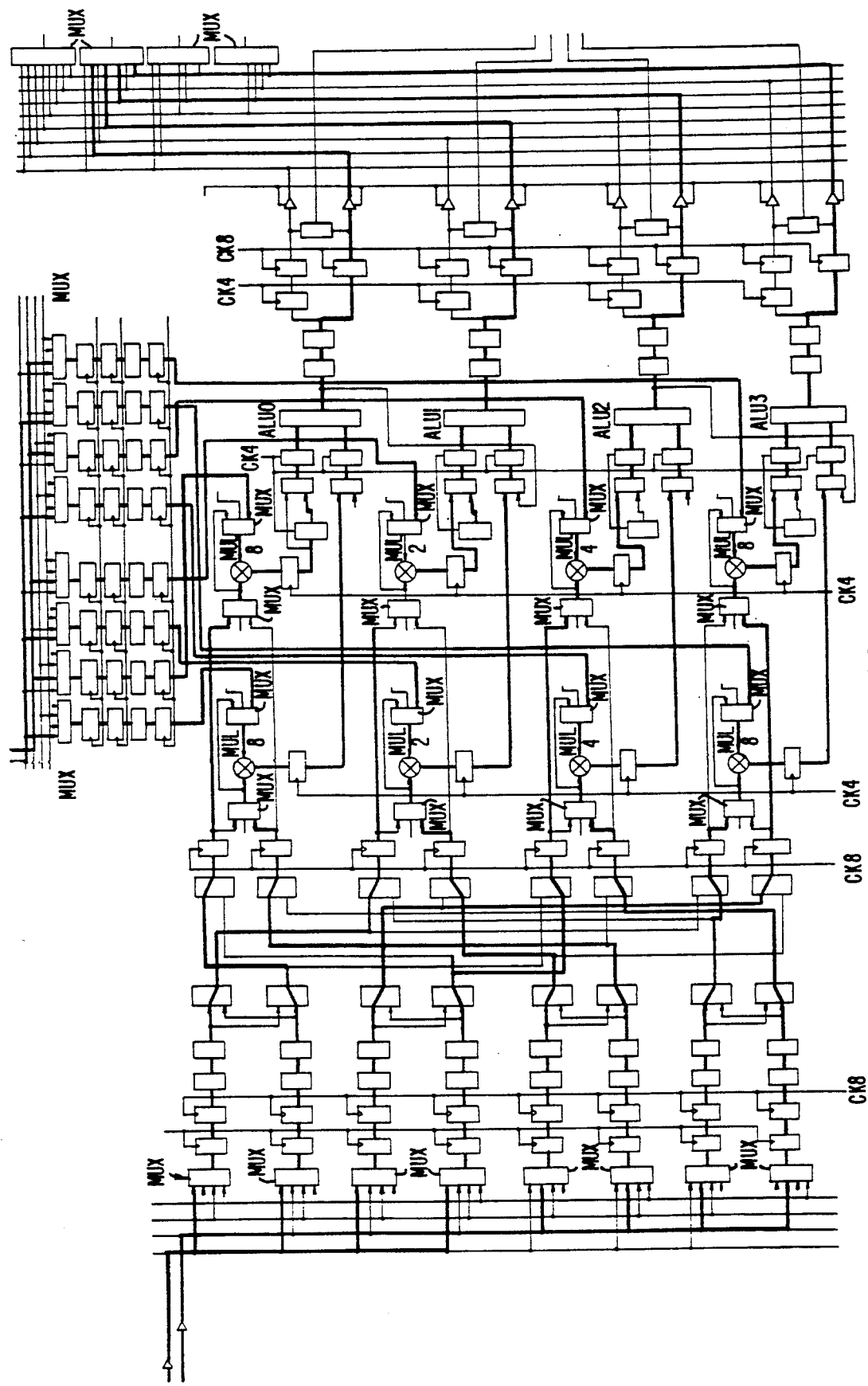
Figure 43:
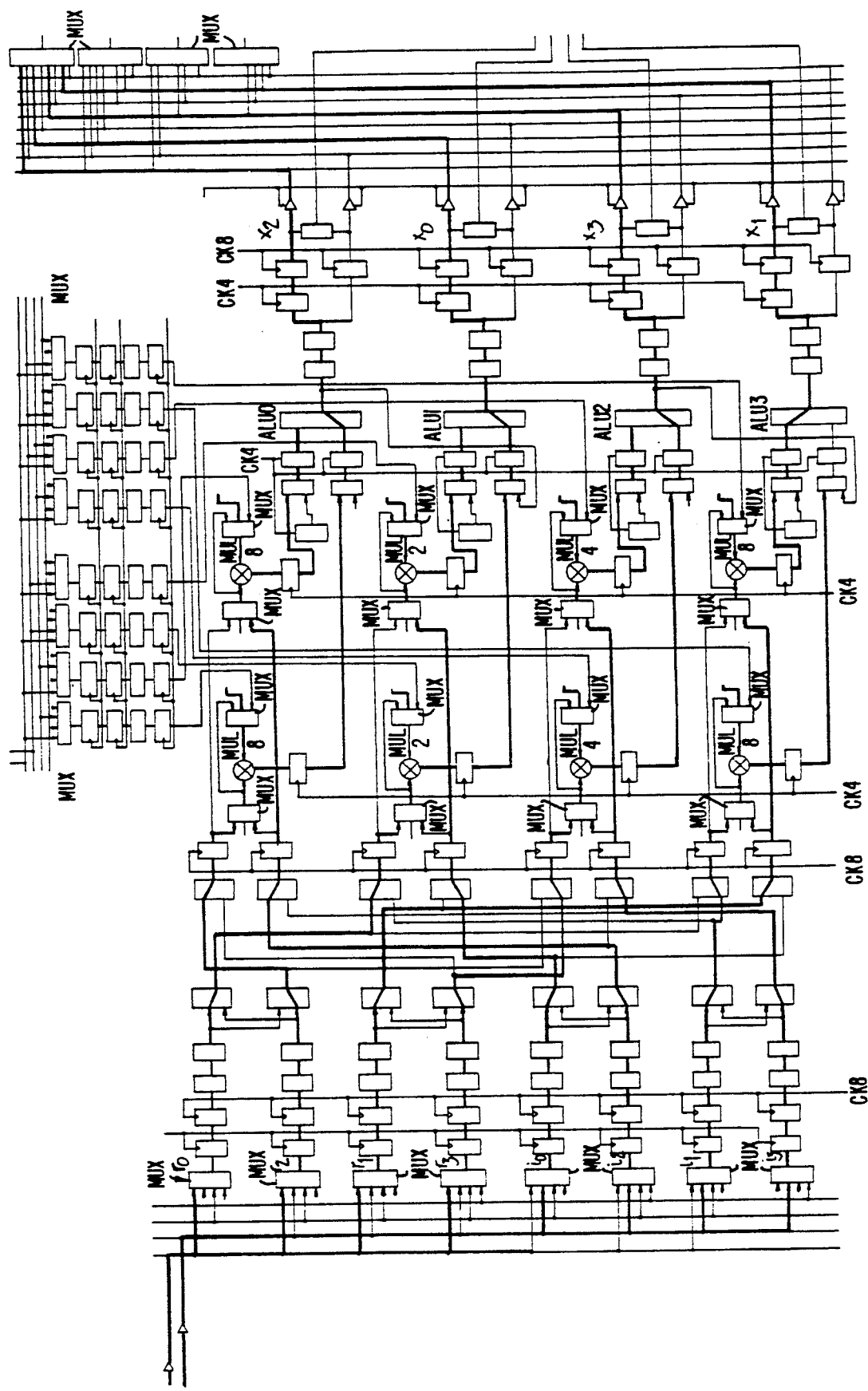
Figure 44:
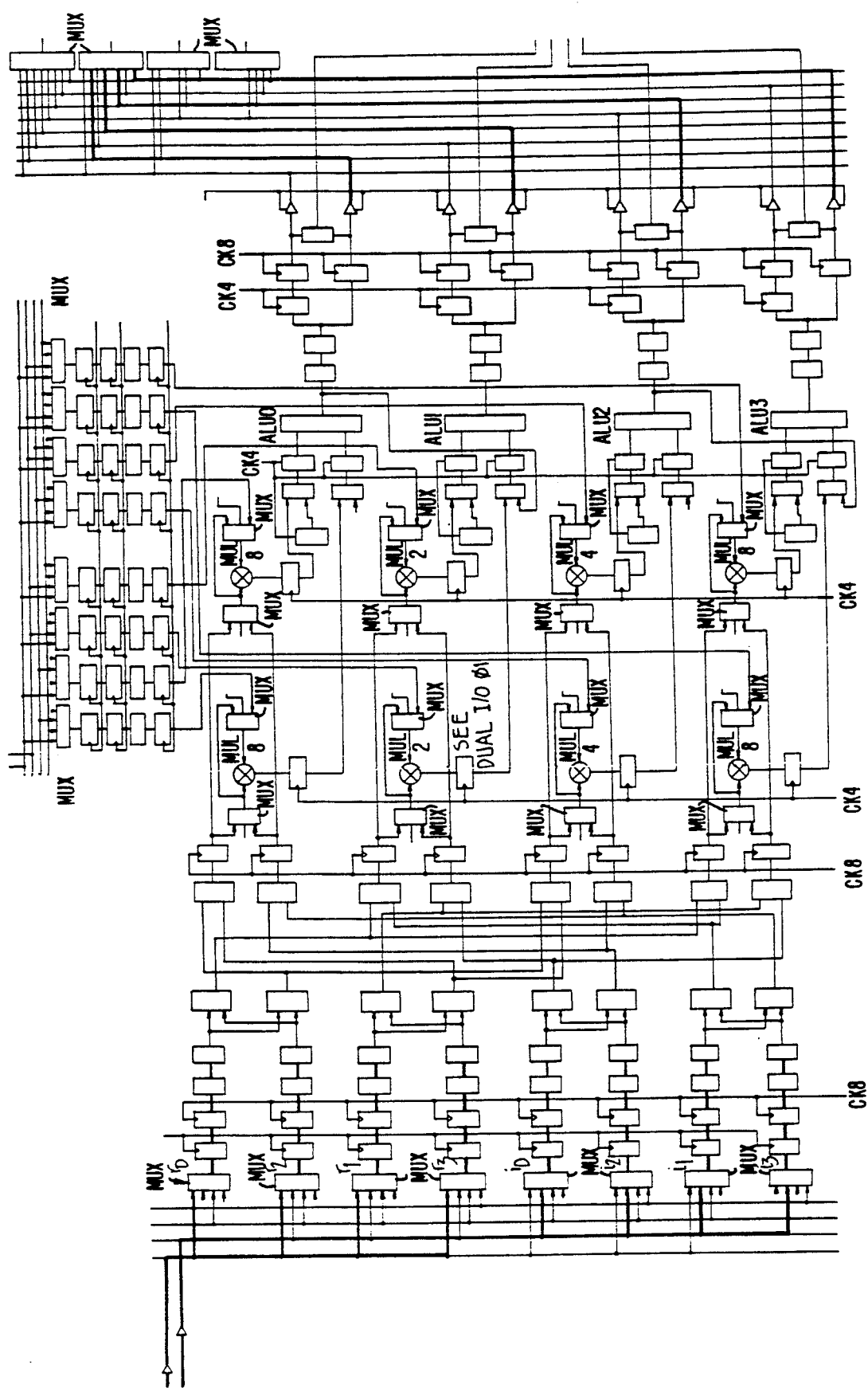
Figure 45:
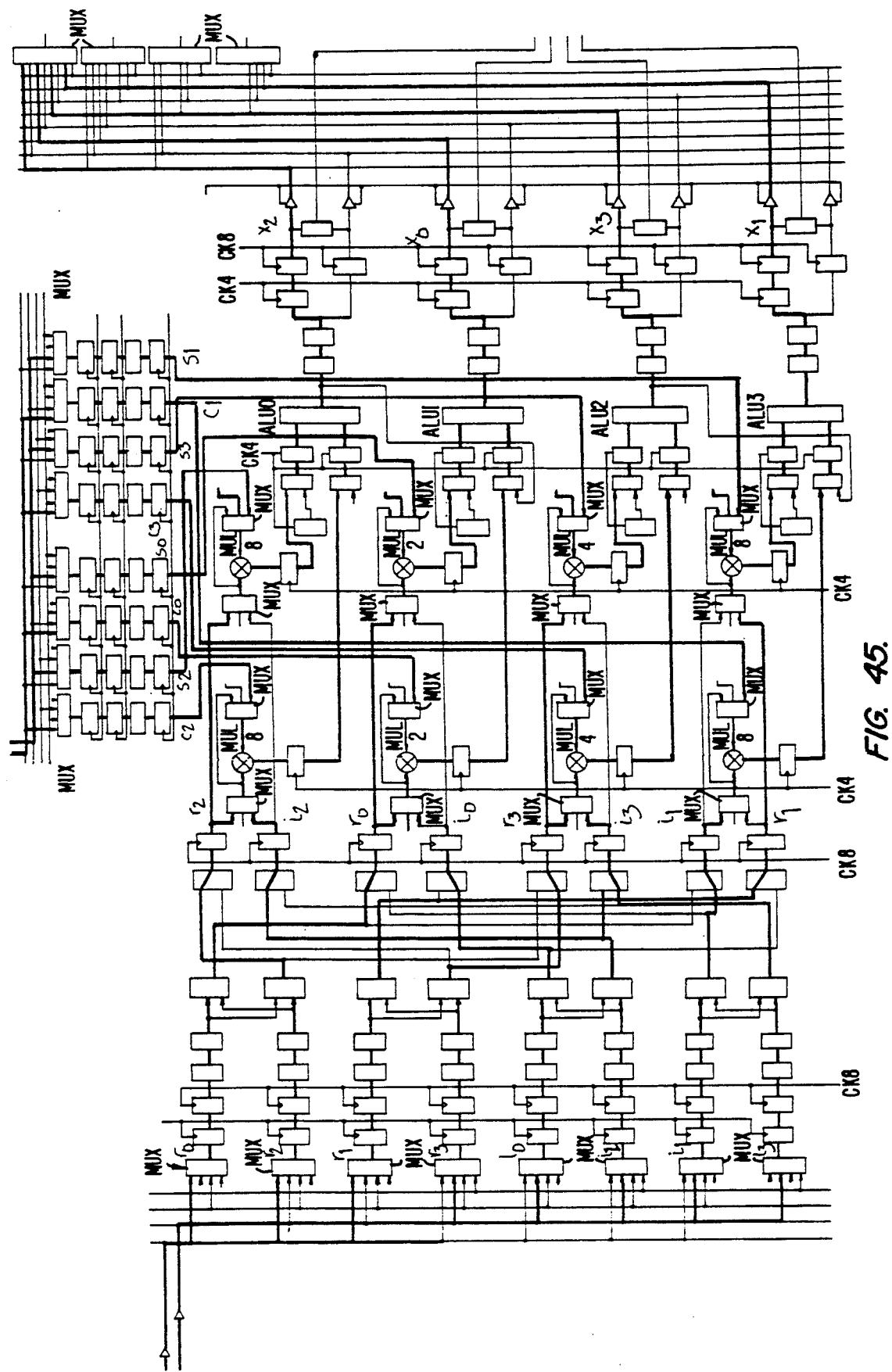
Figure 46:
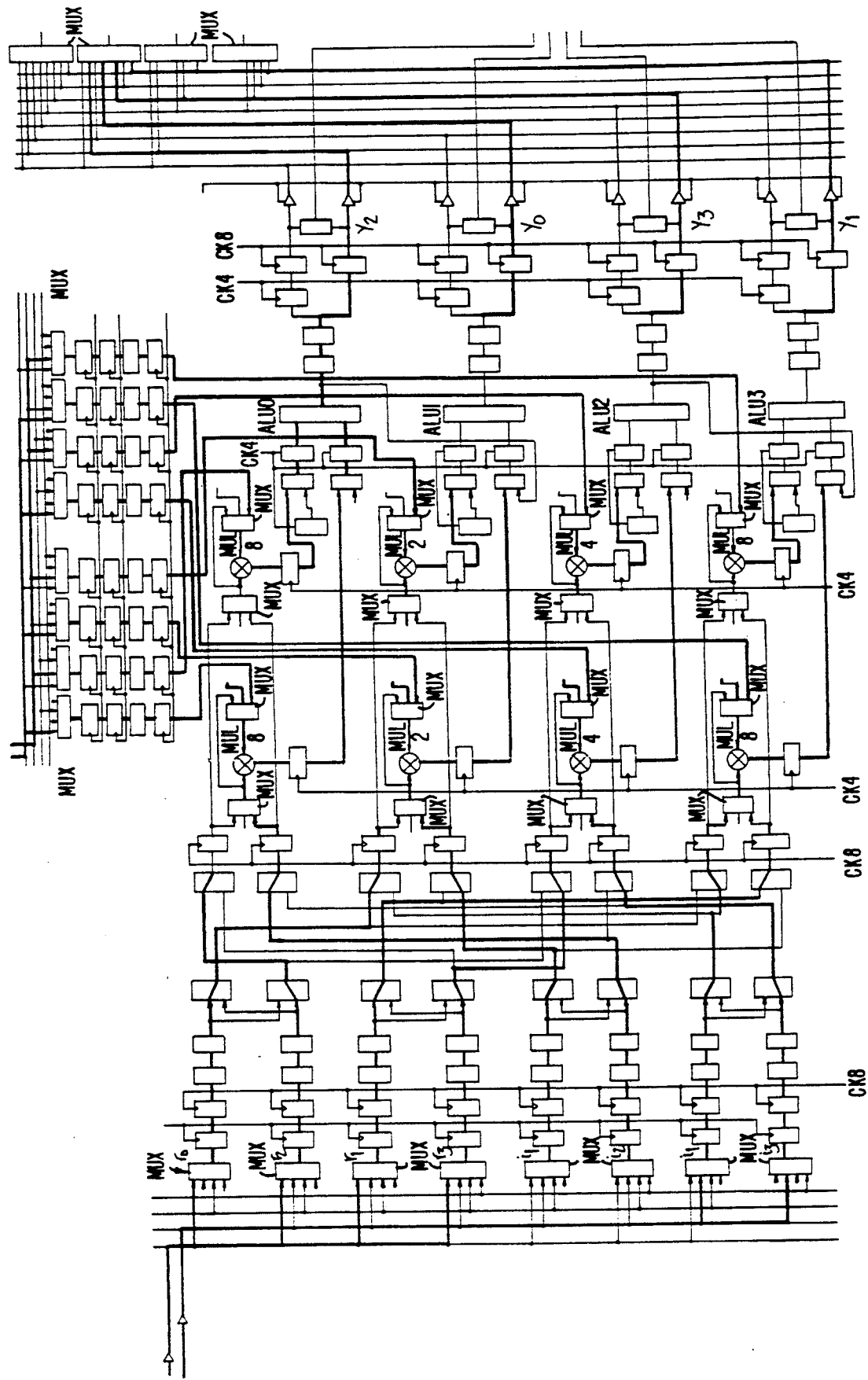
Figure 47:
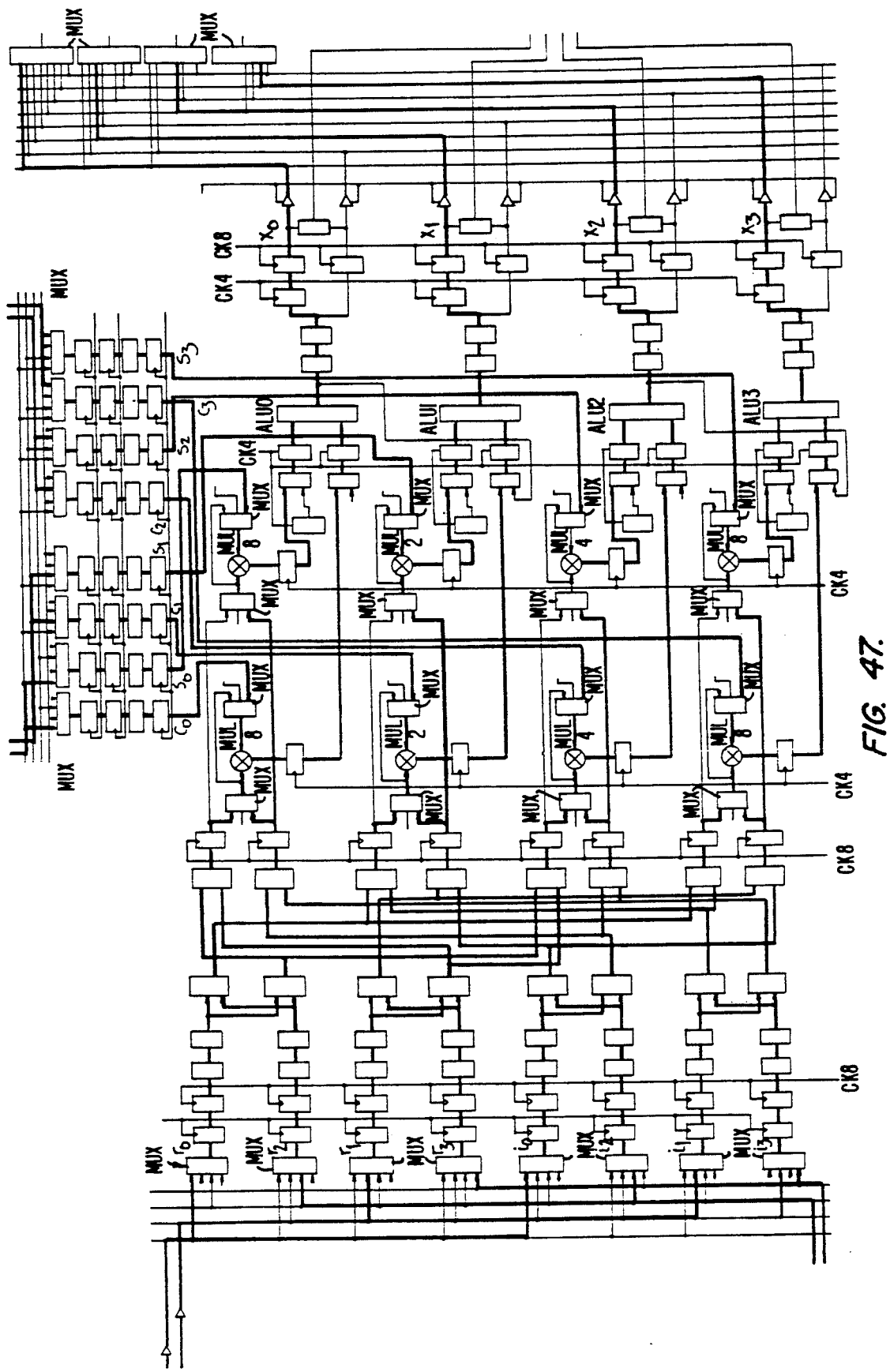
Figure 48:
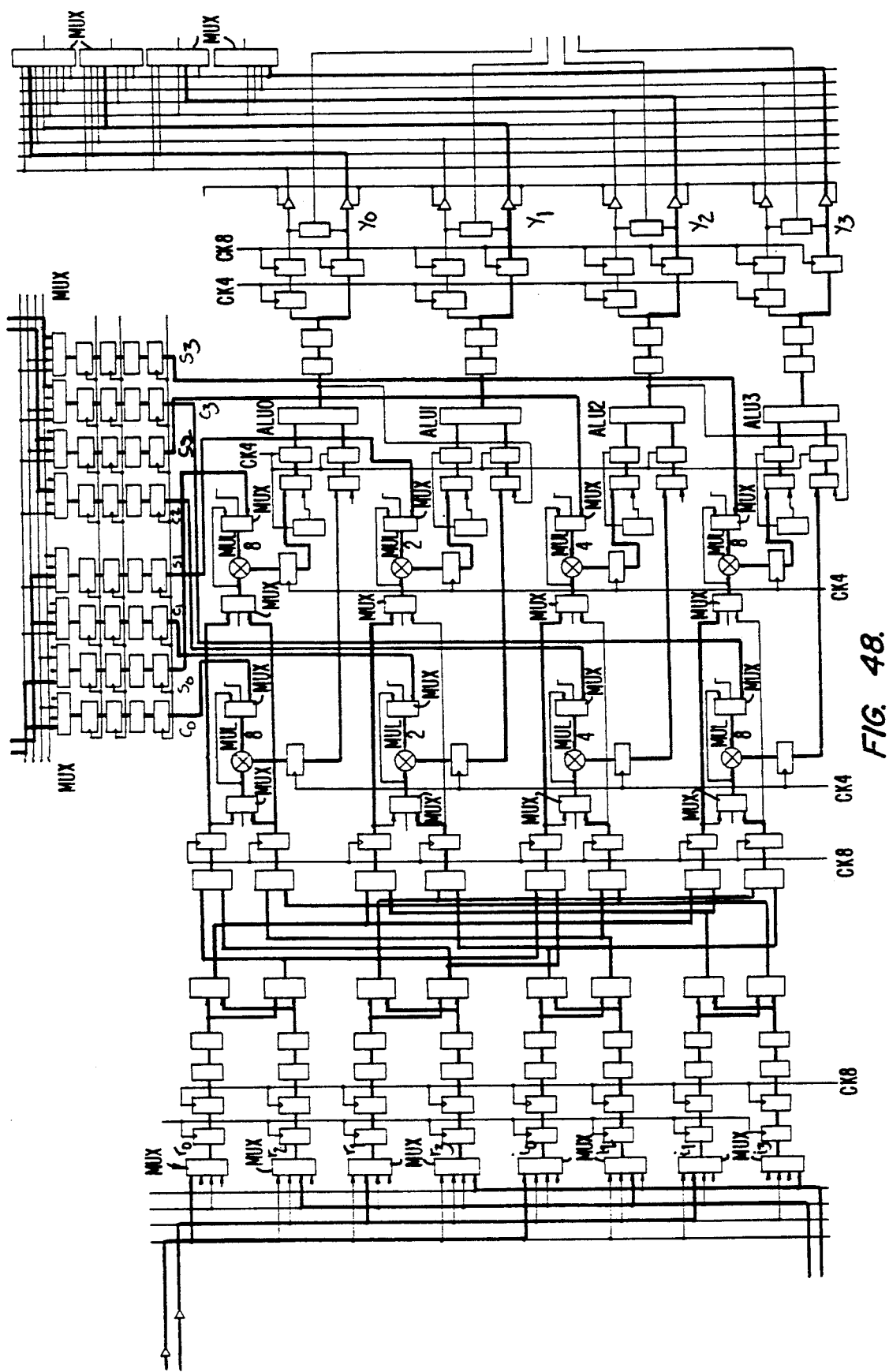
Figure 49:
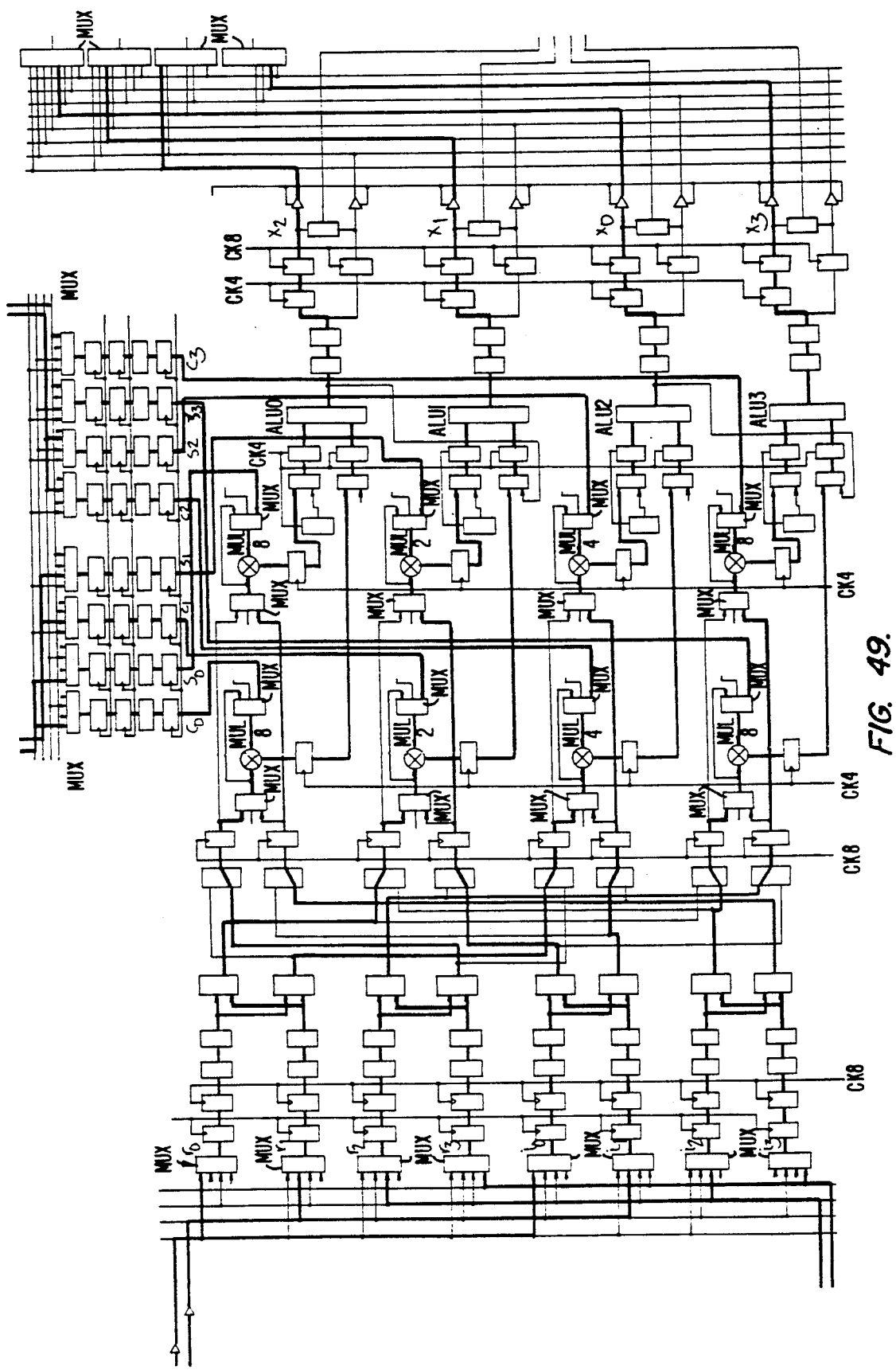
Figure 50:
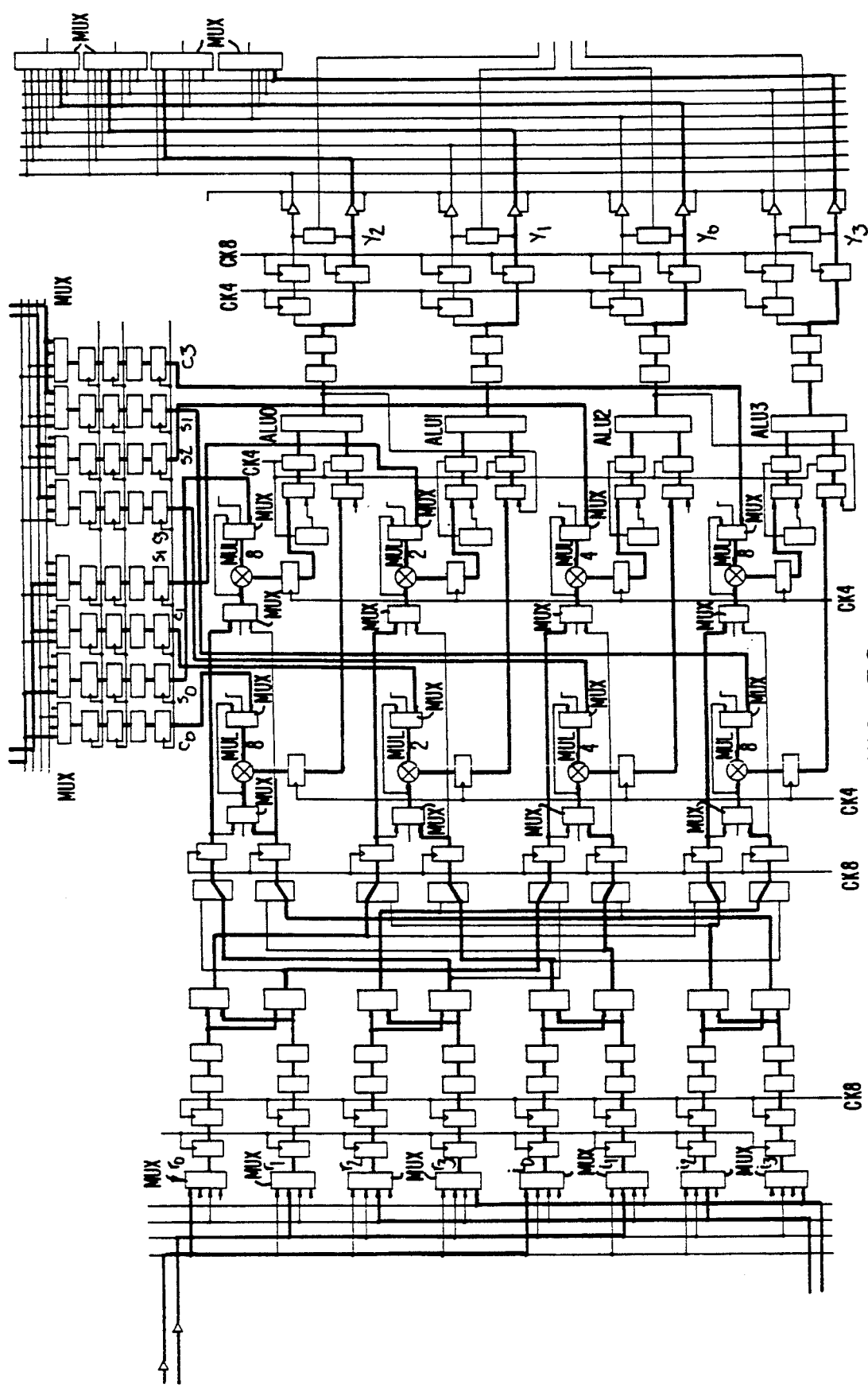
Figure 51:
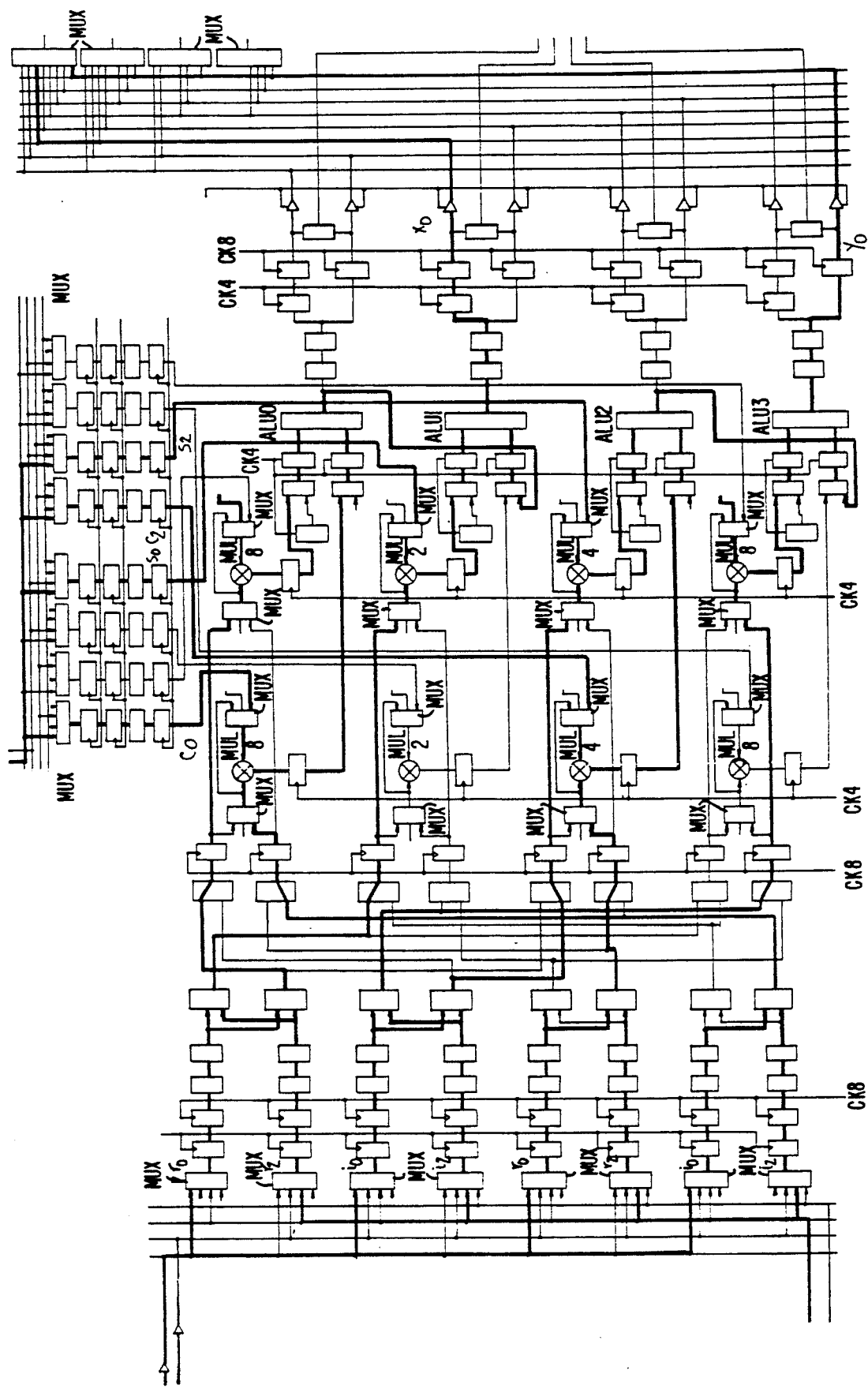
Figure 52:
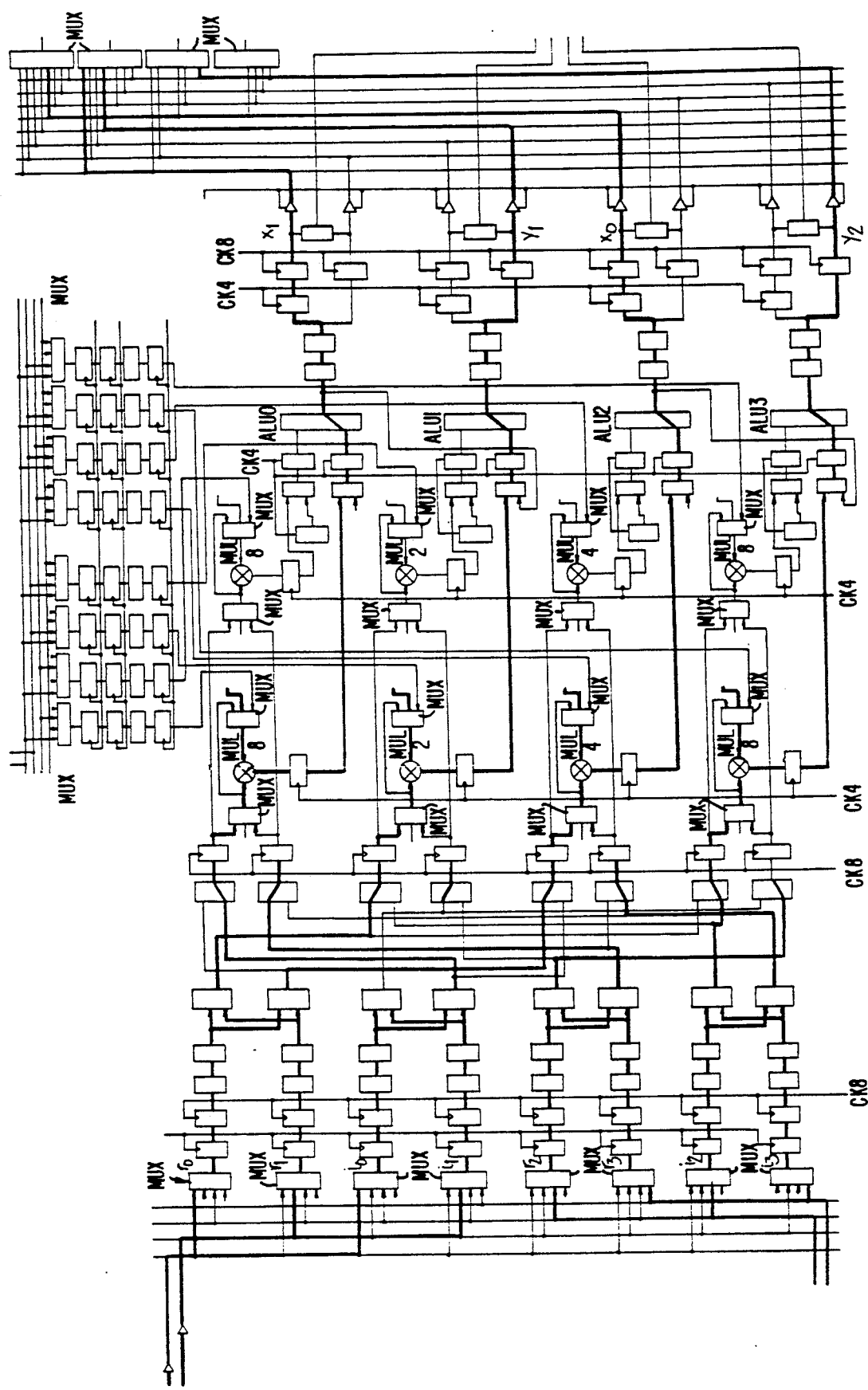
Figure 53:
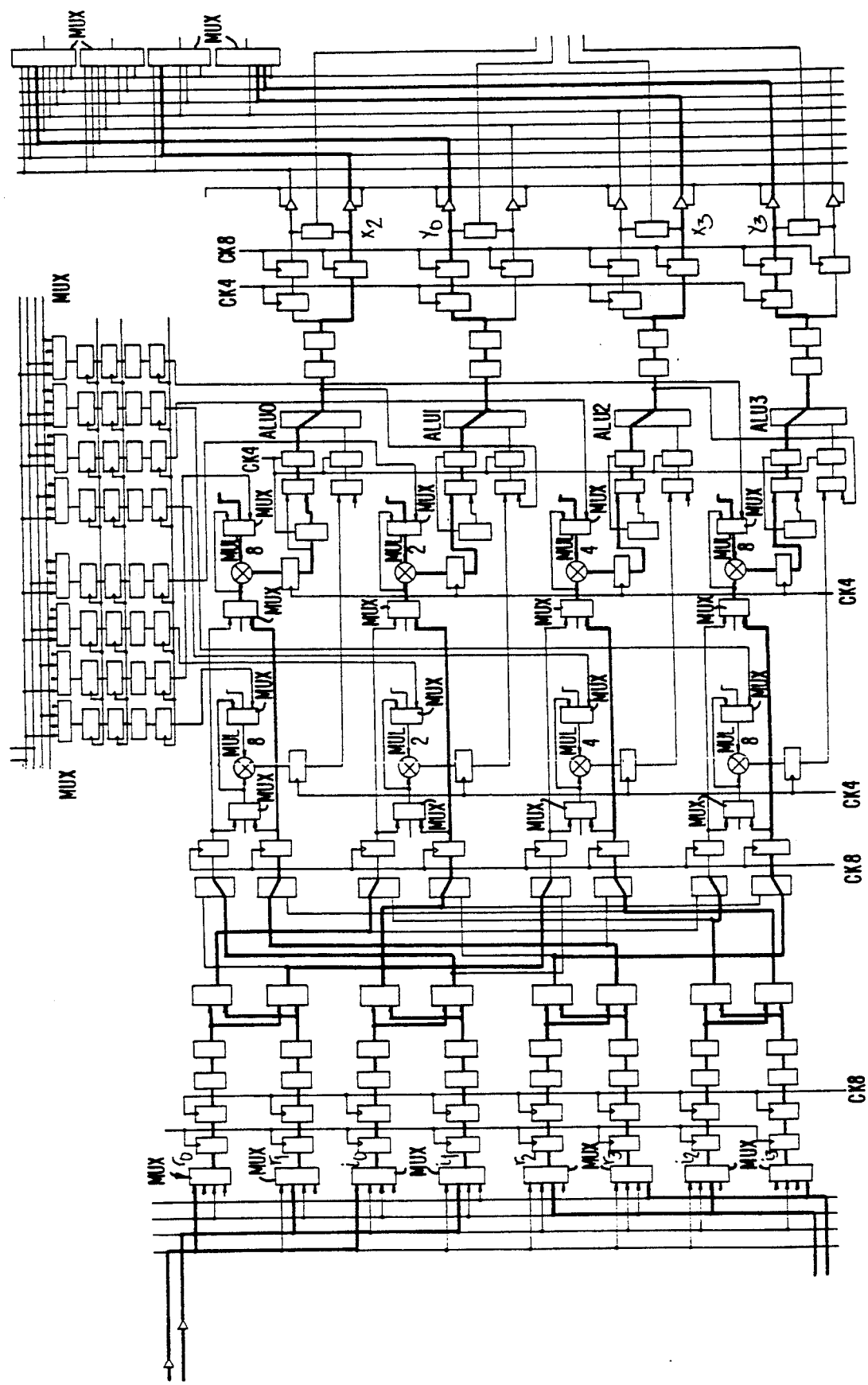
Figure 54:
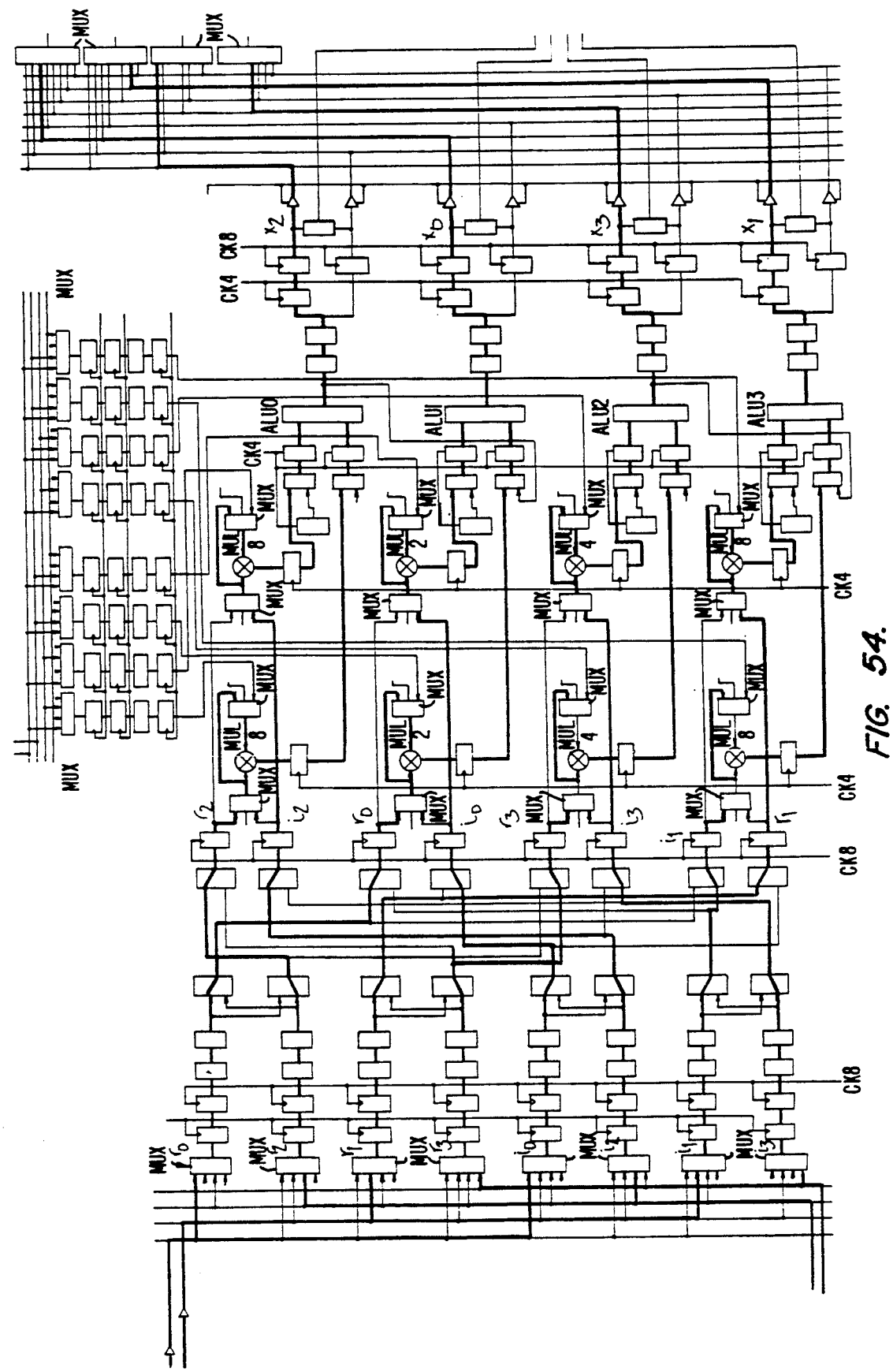
Figure 55:
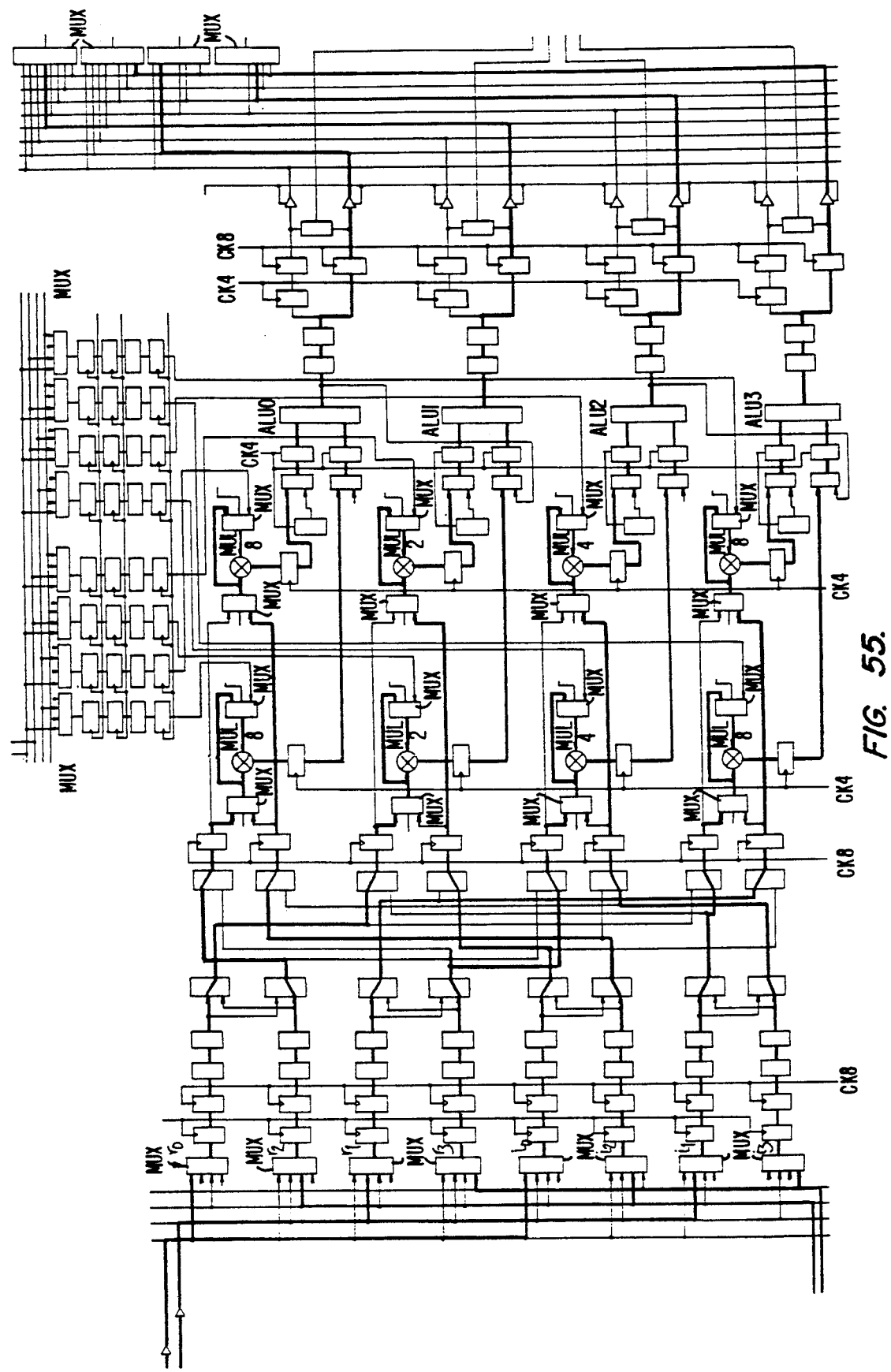
Figure 56:
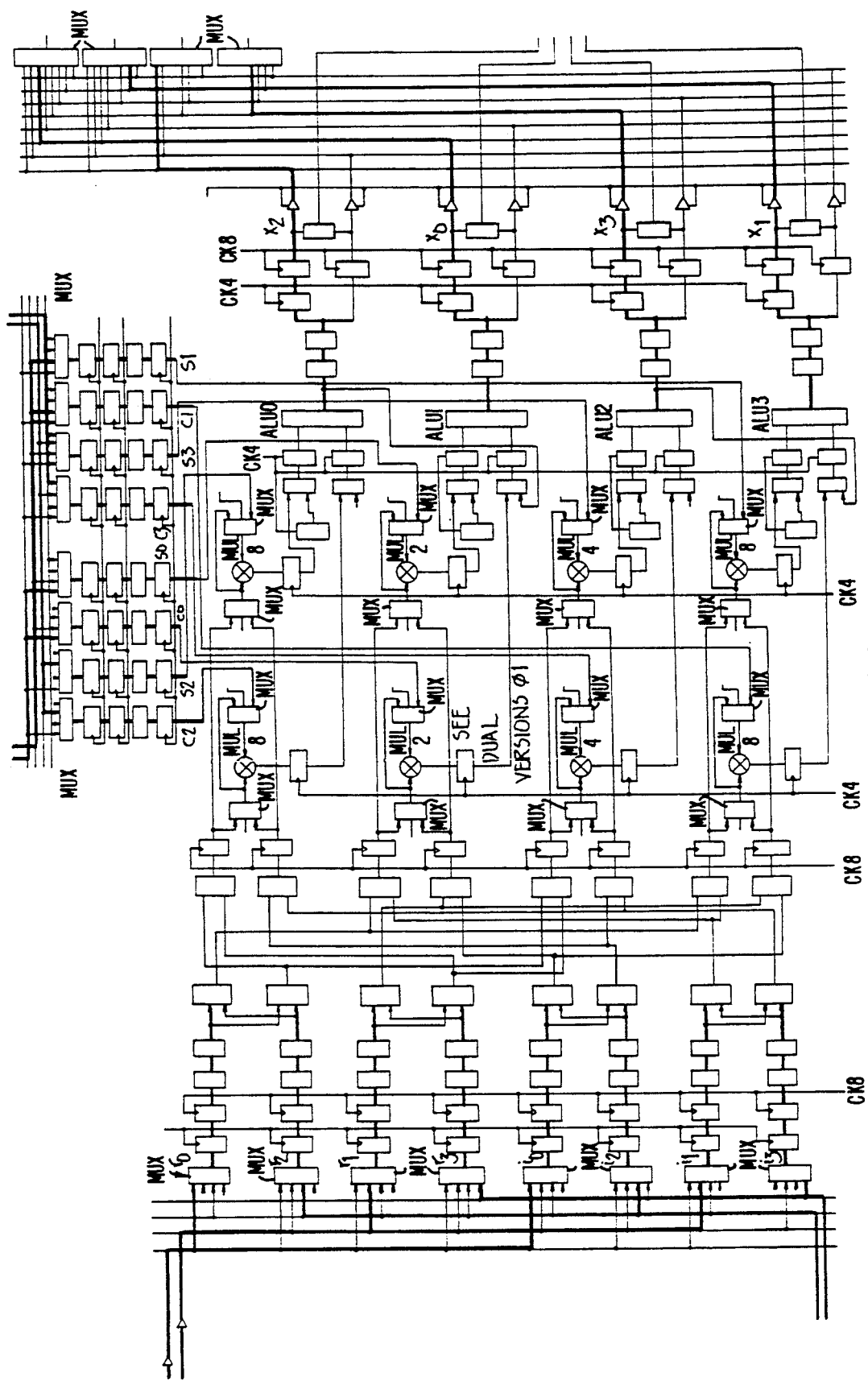
Figure 57:
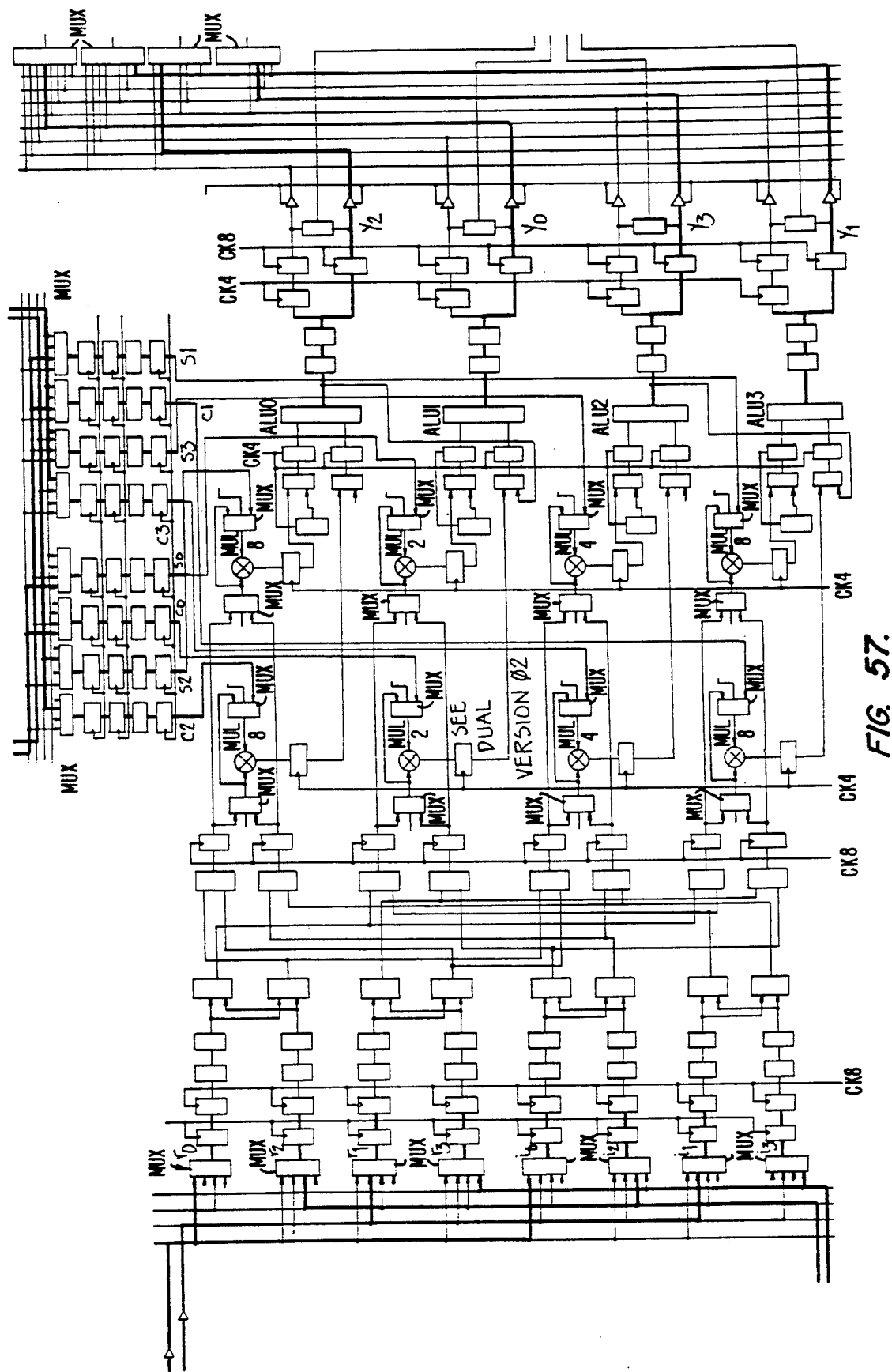

A complete block diagram showing all the I/O pins of the CE is shown in FIG. 31. All the pins of the device have been discussed in this chapter. Altogether, 14 pins have been allocated for the supplies (VCC and VSS). It brings the net pin-count to 252 pins. The dual I/O version CE could be packaged in a 144 pin package.

3.0 INSTRUCTION-SET

This chapter describes individually every instruction. The input and output aspects of the CE have been described earlier indicating the programmable options available to the user. These I/O programming options apply to all the instructions as ways of inputting/outputting data values.

When describing each instruction, it will be assumed that I/O data buses have been already set-up as desired, depending upon the external system configuration. The following parameters will be used to make reference to the I/O data values which have been defined in sections 2.5 and 2.6

Data Input Values: $r0+j\,i0$, $r1+j\,i1$, $r2+j\,i2$, $r3+j\,i3$.
Auxiliary Input Values: $c0+j\,s0$, $c1+j\,s1$, $c2+j\,s2$, $c3+j\,s3$.
Output Data Values: $x0+j\,y0$, $x1+j\,y1$, $x2+j\,y2$, $x3+j\,y3$.

These parameters also have timing information associated as well, as described in section 2.6. The section 2.6 describes the timing slots during which various I/O values are transferred as functions of Bus-control signals. In the description of various instructions, the Output Values will be shown as functions of the Input Data Values and Input Auxiliary Data Values. Of course, it should be understood that the Output Values are produced after a latency as described earlier. Various control signals which impact a given instruction will also be described. The impact of a given instruction on any output control signal will also be mentioned.

3.1 INSTRUCTION BFLY4

| OPCODE: | | | | | |
|---|---|---|---|---|---|
| C0 | CI | 0 | 0 | 0 | 0 |

Description

It implements a mathematical function corresponding to Decimation-in-frequency, radix-4 butterfly.

Data Input Values: $r0+j\,i0$, $r1+j\,i1$, $r2+j\,i2$, $r3+j\,i3$.
Auxiliary Input Values: $c0+j\,s0$, $c1+j\,s1$, $c2+j\,s2$, $c3+j\,s3$.
Output Data Values: $x0+j\,y0$, $x1+j\,y1$, $x2+j\,y2$, $x3+j\,y3$.

Function

First, intermediate results are produced which are defined as following:

$a0+j\,b0 = [(r0+r2)+(r1+r3)]+j\,[(i0+i2)+(i1+i3)];$
$a1+j\,b1 = [(r0-r2)+(i1-i3)]+j\,[(i0-i2)-(r1-r3)];$
$a2+j\,b2 = [(r0+r2)-(r1+r3)]+j\,[(i0+i2)-(i1+i3)];$
and
$a3+j\,b3 = [(r0-r2)-(i1-i3)]+j\,[(i0-i2)+(r1-r3)].$ Then, the output values are produced as following:
$x0+j\,y0 = (a0+j\,b0) * (c0+j\,s0);$
$x1+j\,y1 = (a1+j\,b1) * (c1+j\,s1);$
$x2+j\,y2 = (a2+j\,b2) * (c2+j\,s2);$ and
$x3+j\,y3 = (a3+j\,b3) * (c3+j\,s3).$ The above mentioned function collapses to a standard Radix-4, DIF butterfly when $c0=1$ and $s0=0$. Therefore, if the Radix-4 Butterfly is to be computed, the user must ensure that incoming data c0 and s0 have those values.

Affected By

1. CI, SPLM:
   If CI=1 and SPLM=0, then $i0=-i0$, $i1=-i1$, $i2=i2$ and $i3=-i3$ (Before the function).
   If CI=0 and SPLM=0, then i0, i1, i2, and i3 are unaffected.

2. COMP (7:0), SPLM:
   If SPLM=1, then CI is in Don't Care Mode and COMP (7:0) is used to Negate each of the input data values, as following:
   If COMP0=1, then $r0=-r0$, else $r0=r0$;
   If COMP1=1, then $i0=-i0$, else $i0=i0$;
   If COMP2=1, then $r1=-r1$, else $r1=r1$;
   If COMP3=1, then $i1=-i1$, else $i1=i1$;
   If COMP4=1, then $r2=-r2$, else $r2=r2$;
   If COMP5=1, then $i2=-i2$, else $i2=i2$;
   If COMP6=1, then $r3=-r3$, else $r3=r3$; and
   If COMP7=1, then $i3=-i3$, else $i3=i3$.

3. CO:
   If CO=1, then $y0=-y0$, $y1=-y1$, $y2=-y2$ and $y3=-y3$ (After the function).
   If CO=0, then y0, y1, y2, y3, and y4 are unaffected.

4. SFI (2:0):
   All the input data values r0, r1, r2, r3, i0, i1, i2, and i3 are shifted right by the same amount, as defined by the bits SFI (3:0). The sign is extended into empty msb bits.

The maximum shift is 4 bits. The shifted values are individually rounded. (See Section 2.8.2).

5. XSIN:

All the input auxiliary data values c0, c1, c2, c3, s0, s1, s2 and s3 are shifted right as defined by the bit XSIN. If XSIN=1, then all the values are shifted right by one bit. Otherwise, the values are unaffected. When shifted, the sign bit is extended into the empty msb position. The shifted values are individually rounded.

6. RMB:

Affects the Magnitude Detector. If RMB=0, then Radix 4 mode is used. If RMB=1, then Radix-16 mode is used. (See Section 2.11.1).

Effects

1. OVF:

The overflows from the Processor-A and Processor-B are routed to the OVF pin in parallel with the output values. (See Section 2.11).

2. SFO (2:0):

The instruction activates the conditional scaling, as controlled by the RMB bit. The Scale Factor is produced on the pins SFO (2:0) after the complete Pass. (See Section 2.10).

3.2 INSTRUCTION BFLY2

| OPCODE: | | | | | |
|---|---|---|---|---|---|
| CO | CI | 0 | 0 | 0 | 1 |

Description

The instruction executes two FFT, Radix-2, Decimation-in-Frequency butterflies.

Data Input Values: $r0+j\,i0, r1+j\,i1, r2+j\,i2, r3+j\,i3$.
Auxiliary Input Values: $c0+j\,s0, c1+j\,s1, c2+j\,s2, c3+j\,s3$.
Output Data Values: $x0+j\,y0, x1+j\,y1, x2+j\,y2, x3+j\,y3$.

Function

First, intermediate results are produced, defined as following:

$a0+j\,b0=(r0+r1)+j\,(i0+i1)$;
$a1+j\,b1=(r0-r1)+j\,(i0-i1)$;
$a2+j\,b2=(r2+r3)+j\,(i2+i3)$; and
$a3+j\,b3=(r2-r3)+j\,(i2-i3)$.

Then, output values are produced as following:

$x0+j\,y0=(a0+j\,b0) * (c0+j\,s0)$;
$x1+j\,y1=(a1+j\,b1) * (c1+j\,s1)$;
$x2+j\,y2=(a2+j\,b2) * (c2+j\,s2)$; and
$x3+j\,y3=(a3+j\,b3) * (c3+j\,s3)$.

Note that if c0=c2=1, and s0=s2, then the above equations conform to two separate radix-2 butterflies. The r0+ji0 and r1+ji1 become inputs for the first butterfly. The x0+jy0 and x1+jy1 become corresponding outputs. Similarly, the r2+ji2 and r3+ji3 become inputs for the second butterfly. The x2+jy2 and x3+jy3 become corresponding outputs. The c1+js1 and c3+js3 are twiddle-factors for respective butterflies. The user must ensure above mentioned values for c0, s0, c2 and s2 are supplied.

Affected By

1. CI, SPLM:

If CI=1 and SPLM=0, then i0=−i0, i1=−i1, i2=−i2 and i3=−i3 (Before the function).

If CI=0 and SPLM=0, then i0, i1, i2, i3 and i4 are unaffected.

2. COMP(7:0), SPLM:

If SPLM=1, then CI is in Don't Care Mode and COMP(7:0) is used to Negate each of the input data values, as following:

If COMP0=1, then r0=−r0, else r0=r0;
If COMP1=1, then i0=−i0, else i0=i0;
If COMP2=1, then r1=−r1, else r1=r1;
If COMP3=1, then i1=−i1, else i1=i1;
If COMP4=1, then r2=−r2, else r2=r2;
If COMP5=1, then i2=−i2, else i2=i2;
If COMP6=1, then r3=−r3, else r3=r3; and
If COMP7=1, then i3=−i3, else i3=i3.

3. CO:

If CO=1, then y0=−y0, y1=−y1, y2=−y2 and y3=−y3 (After the function).

If CO=0, then y0, y1, y2, y3 and y4 are unaffected.

4. SFI (2:0):

All the input data values, r0, r1, r2, r3, i0, i1, i2 and i3 are shifted right by the same amount, as defined by the bits SFI(3:0). The sign is extended into the empty msb bits. The maximum shift is 4 bits. The shifted values are individually rounded. (See Section 2.8.2).

5. XSIN:

All the input auxiliary data values c0, c1, c2, c3, s0, s1, s2 and s3 are shifted right as defined by the bit XSIN. If XSIN=1, then all the values are shifted right by one bit.

Otherwise, the values are unaffected. When shifted, the sign bit is extended into the empty msb position. The shifted values are individually rounded.

6. RMB:

No effect.

Effects

OVF:

The overflows from the Processor-A and Processor-B routed to the OVF pin, in parallel with output values, (See Section 2.11)

2. SFO(2:0):

The instruction activates the conditional scaling. The magnitude detectors are used in radix-2 mode. The Scale Factor is produced on the pins SFO(2:0) after the complete Pass. (See Section 2.10).

3.3 INSTRUCTION FFT2N

| OPCODE: | | | | | |
|---|---|---|---|---|---|
| CO | CI | 0 | 0 | 1 | 0 |

Description

The instruction recombines a FFT of N complex-points into a FFT of 2N real-points. (Reference: The Fast Fourier Transform, E. Oran Brigham, Prentice-Hall, 1974, p.167).

Data Input Values: $r0+j\,i0$, Don't Care, $r2+j\,i2$, Don't Care.
Auxiliary Input Values: Don't Care, Don't Care, Don't Care, Don't Care.
Output Data Values: $x0+j\,y0$, Don't Care, Don't Care, Don't Care Function $x0=(r0/2+r2/2)+c0*(i0/2+i2/2)-s0*(r0/2-r2/2)$; and $y0 = (i0/2 + i2/2) + s0*(i0/2 + i2/2) - c0*(r0/2 - r2/2)$ These equations recombine two points of a N complex-point FFT into one point of 2N real-point FFT. (Reference: The Fast Fourier Transform, E. Oran Brigham, Prentice-Hall, 1974, p 169).

Affected By

1. CI, SPLM:
   If CI=1 and SPLM=0, then i0= −i0, i2= −i2. (Before the function).
   If CI=0 and SPLM=0, then i0, and i2 are unaffected.

2. COMP(7:0), SPLM:
   If SPLM=1, then CI is in Don't Care Mode and COMP (7:0) is used to Negate each of the input data values, as following:
   If COMP0=1, then r0= −r0, else r0=r0;
   If COMP1=1, then i0= −i0, else i0=i0;
   If COMP4=1, then r2= −r2, else r2=r2; and
   If COMP5=1 then i2= −i2, else i2=i2.

3. CO:
   If CO=1, then y0= −y0 (After the Function).
   If CO=0, then y0 is unaffected.

4. SFI (2:0):
   All the input data values r0, r2, i0 and i2 are shifted right by the same amount, as defined by the bits SFI(3:0). The sign is extended into empty msb bits. The maximum shift is 4 bits. The shifted values are individually rounded. (See Section 2.8.2).

5. XSIN:
   The input auxiliary data values c0 and s0 are shifted right as defined by the bit XSIN. If XSIN=1, both values are shifted right by one bit. Otherwise, the values are unaffected. When shifted, the sign bit is extended into the empty msb position. The shifted values are individually rounded.

6. RMB:
   No effect.

Effects

1. OVF:
   The overflows from the Processor-A and Processor-B are routed to the OVF pin, in parallel with the output values. (See Section 2.11).

2. SFO(2:0):
   The instruction does not use conditional scaling. The SFO (2:0) bits are set to zero. (See Section 2.10).

3.4 INSTRUCTION FFTNN

| OPCODE: | | | | | |
|---|---|---|---|---|---|
| C0 | CI | 0 | 0 | 1 | 1 |

Description

The instruction recombines a FFT of N complex-points into two separate N real-point FFTs. (Reference: The Fast Fourier Transform, E. Oran Brigham, Prentice-Hall, 1974, p. 166).

Data Input Values: $r0+j\ i0, r1+j\ i1, r2+j\ i2, r3+j\ i3$.
Auxiliary Input Values: Don't Care, Don't Care, Don't Care, Don't Care.
Output Data Values: $x0+j\ y0, x1+j\ y1, x2+j\ y2, x3+j\ y3$.

Function $x0+j\ y0 = [r0/2 + r1/2] + j\ [i0/2 - i1/2];$
$x1+j\ y1 = [i0/2 + i1/2] + j\ [r1/2 - r0/2];$
$x2+j\ y2 = [r2/2 + r3/2] + j\ [i2/2 - i3/2];$ and
$x3+j\ y3 = [i2/2 + i3/2] + j\ [r3/2 - r2/2].$ These equations recombine four points of a N complex-point FFT into two points of a N real-point FFT of function-1 and two points of a N real-point FFT of function-2. (Reference: The Fast Fourier Transform, E. Oran Brigham, Prentice-Hall, 1974, p. 167).

Affected By

1. CI, SPLM:
   If CI=1 and SPLM=0, then i0= −i0, i1= −i1, i1= −i2 and i3= −i3 (Before the function).
   If CI=0 and SPLM=0, then i0, i1, i2, i3, and i4 are unaffected.

2. COMP(7:0), SPLM:
   If SPLM=1, then CI is in Don't Care Mode and COMP(7:0) is used to Negate each of the input data values, as following:
   If COMP0=1, then r0= −r0, else r0=r0;
   If COMP1=1, then i0= −i0, else i0=i0;
   If COMP2=1, then r1= −r1, else r1=r1;
   If COMP3=1, then i1= −i1, else i1=i1;
   If COMP4=1, then r2= −r2, else r2=r2;
   If COMP5=1, then i2= −i2, else i2=i2;
   If COMP7=1, then i3= −i3, else i3=i3.

3. CO:
   If CO,=1, then y0= −y0, y1= −y1, y2= −y2 and y3= −y3 (After the function).
   If CO=0, then y0, y1, y2, and y3 are unaffected.

4. SFI (2:0):
   All the input data values r0, r1, r2, r3, i0, i1, i2 and i3 are shifted right by the same amount, as defined by the bits SFI(3:0). The sign is extended into the empty msb its. The maximum shift is 4 bits. The shifted values are individually rounded. (See Section 2.3.2).

5. XSIN:
   No Effect

6. RMB:
   No Effect

Effects

1. OVF:
   The overflows from the processor-A and Processor-B are routed to the OVF pin, in parallel with the output values. (See Section 2.11).

2. SFO(2:0):
   The instruction does not use conditional scaling. The SFO (2:0) bits are set to zero. (See Section 2.10).

3.5 INSTRUCTION AFLOW

| OPCODE: | | | | | |
|---|---|---|---|---|---|
| C0 | XX | 0 | 1 | 0 | 0 |

Description

The instruction passes a set of four complex values from the input to the output of the device. If desired, values may be complemented (negated) during the Pass.

Data Input Values: $r0+j\ i0, r1+j\ i1, r2+j\ i2, r3+j\ i3$.
Auxiliary Input Values: Don't Care, Don't Care, Don't Care, Don't Care
Output Data Values: $x0+j\ y0, x1+j\ y1, x2+j\ y2, x3+j\ y3$.

Function $x0 + jy0 = r0 + ji0$, if $CO = 0$
$= -(r0 + ji0)$, if $CO = 1$;
$x1 + jy1 = r1 + ji1$, if $CO = 0$
$= -(r1 + ji1)$, if $CO = 1$;
$x2 + jy2 = r2 + ji2$, if $CO = 0$
$= -(r2 + ji2)$, if $CO = 1$; and
$x3 + jy3 = r3 + ji3$, if $CO = 0$
$= -(r3 + ji3)$, of $CO = 1$.

Affected By:

1. SPLM:
No effect.
2. CI:
No Effect
3. CO:
As Above.
4. SFI(2:0):
All the input data values r0, r1, r2, r3, i0, i1, i2 and i3 are shifted right by the same amount, as defined by the bits SFI(3:0). The sign is extended into the empty msb bits. The maximum shift is 4 bits. The shifted values are individually rounded. (See Section 2.8.2).
5. XSIN:
No effect.
6. RMB:
No effect.

Effects

1. OVF:
No effect.
2. SFO (2:0):
Set to zero.

3.6 INSTRUCTION BMUL

| OPCODE: | | | | | |
|---|---|---|---|---|---|
| C0 | CI | 0 | 1 | 0 | 1 |

Description

The instruction multiplies members of a block of four complex values with corresponding members of another block of four complex values.

Data Input Values: $r0+j\ i0, r1+j\ i1, r2+j\ i2, r3+j\ i3$.
Auxiliary Input Values: $c0+j\ s0, c1+j\ s1, c2+j\ s2, c3+j\ s3$.
Output Data Values: $x0+j\ y0, x1+j\ y1, x2+j\ y2, x3+j\ y3$.

Function $x0+j\ y0 = (r0+j\ i0) * (c0+j\ s0);$
$x1+j\ y1 = (r1+j\ i1) * (c1+j\ s1);$
$x2+j\ y2 = (r2+j\ i2) * (c2+j\ s2);$ and
$x3+j\ y3 = (r3+j\ i3) * (c3+j\ s3).$ Affected By 1. SPLM:
No effect.
CI:
If CI=1, then
$r0+j\ i0 = -(r0+j\ i0),$
$r1+j\ i1 = -(r1+j\ i1),$
$r2+j\ i2 = -(r2+j\ i2),$ and
$r3+j\ i3 = -(r3+j\ i3).$
Otherwise, the inputs are unaffected.
3. CO:
If CO=1, then
$x0+j\ y0 = -(x0+j\ y0),$
$x1+j\ y1 = -(x1+j\ y1),$
$x2+j\ y2 = -(x2+j\ y2),$ and
$x3+j\ y3 = -(x3+j\ y3).$
Otherwise, the outputs are unaffected.
4. SFI (2:0):
All the input data values r0, r1, r2, r3, i0, i1, i2 and i3 are shifted right by the same amount, as defined by the bits SFI(3:0). The sign is extended into the empty msb bits. The maximum shift is 4 bits. The shifted values are individually rounded. (See Section 2.8.2).
5. XSIN:
All the input auxiliary data values c0, c1, c2, c3, s0, s1, s2 and s3 are shifted right as defined by the bit XSIN. If XSIN=1, then all the values are shifted right by one bit. Otherwise, the values are unaffected. When shifted, the sign bit is extended into empty msb position. The shifted values are individually rounded.
6. RMB:
No Effect.

Effects

1. OVF:
The overflow from the Processor-A and Processor-B are routed to the OVF pin, in parallel with the output values. (See Section 2.11).
2. SFO(2:0):
The instruction does not activate conditional scaling. The SFO (2:0) are set to zero.

3.7 INSTRUCTION BSOSM

| OPCODE: | | | | | |
|---|---|---|---|---|---|
| CO | CI | 0 | 1 | 1 | 0 |

Description

The instruction operates on eight data values. It squares each data value and then adds pairs together. The instruction can be used to compute magnitude-square if input data values are complex. If real, then the instruction can be used to square and sum a data-array by using an off-chip accumulator. The input values are 16 bit, single precision values. It produces four 20 bit, extended precision values. The corresponding x and y outputs are combined to represent a 20 bit value. For example, the x0 and y0 are used to represent the first 20 bit output value. The msb 16 bits are represented by the x0 and the 4-lbs bits are represented by the y0 value. The 4 bits are contained by the most significant part of the y0 value as discussed in Section 2.9. The lower 12 bits of the y0 are invalid. The values (x1, y1), (x2, y2) and (x3 and y3) are generated in the same way.

Data Input Values: r0, i0; r1, i1; r2, i2; r3, i3.
Auxiliary Input Values: Don't Care; Don't Care; Don't Care.
Output Data Values: x0, y0; x1, y1; x2, y2; x3, y3.

Function $x0, y0 = 16$ msb of $(r0*r0+i0*i0)$, 4 lsb of $(r0*r0+i0*i0);$ $x1, y1 = 16$ msb of $(r1*r1+i1*i1)$, 4 lsb of $(r1*r1+i1*i1);$ x2, y2 = 16 msb of (r2*r2+i2*i2), 4 lsb of (r2*r2+i2*i2); and x3, y3 = 16 msb of (r3*r3+i3*i3), 4 lsb of (r3*r3+i3*i3).

Affected By

1. CI, COMP:
If CI=1, then
r0, i0=(−r0, −i0),
r1, i1=(−r1, −i1),
r2, i2=(−r2, −i2), and
r3, i3=(−r3, −i3).
If CI=0, then the COMP pins control the complement of all the input data values (r0, r1, r2, r3, i0, i1, i2, i3) as defined in Section 3.2.1

2. CO:
If CO=1, then
x0, y0=(−x0, −y0),
x1, y1=(−x1, −y1),
s2, y2=(−x2, −y2), and
x3, y3=(−x3, −y3).
Otherwise, the outputs are unaffected.

3. SFI(2:0), ASFI(3:0):
All the input values r0, r1, r2, r3, i0, i1, i2, i3 are shifted right by the same amount, as defined by the bits SFI(3:0). The sign is extended into the empty msb bits. The shifted values are individually rounded. (See Section 3.5).

The SFI(2:0) and ASFI(3:0) are also added together to produce an accumulated scale factor on the ASFO(3:0) pins (See Section 3.6.2).

4. XSFI:
No Effect

5. RMB:
Affects the shift factor generator. If RMB=0, then Radix-2 mode is used. If RMB=1, then Radix-16 mode is used (See Section 3.6.1) cl Effects 1. Overflow Bits:
The overflows from various processors are routed to the OVF, OVFP and OVFA pins.

2. SFO(2:0) and ASFO(3:0):
The instruction activates the conditional scaling, as controlled by the RMB bit. The scale factor and the accumulated scale factor is produced on the pins SFO(2:0) and ASFO(3:0) after the complete Pass.

3.8 INSTRUCTION BADD

| OPCODE: | | | | | |
|---|---|---|---|---|---|
| CO | CI | 0 | 1 | 1 | 1 |

Description

The instruction adds members of a block of four complex values with corresponding members of another block of four complex values.

Data Input Values: r0+j i0, r1+j i1, r2+j i2, r3+j i3.
Auxiliary Input Values: c0+j s0, c1+j s1, c2+j s2, c3+j s3.
Output Data Values: x0+j y0, x1+j y1, x2+j y2, x3+j y3.

Function x0+j y0=(r0+j i0)+(c0+j s0);
x1+j y1=(r1+j i1)+(c1+j s1);
x2+j y2=(r2+j i2)+(c2+j s2); and
x3+j y3=(r3+j i3)+(c3+j s3).

Affected By

1. SPLM:
No effect

2. CI:
If CI=1, then
r0+j i0=−(r0+j i0),
r1+j i0=−(r1+j i1),
r2+j i2=−(r2+j i2), and
r3+j i3=−(r3+j i3).
Otherwise, the inputs are unaffected.

3. CO:
If CO=1, then
x0=j y0=−(x0+j y0),
x1+j y1=−(x1+j y1),
x2+j y2=−(x2+j y2), and
x3+j y3=−(x3+j y3).
Otherwise, the outputs are unaffected.

4. SFI(2:0):
All the input data values r0, r1, r2, r3, i0, i1, i2, and i3 are shifted right by the same amount, as defined by the bits SFI (3:0). The sign is extended into the empty msb bits. The maximum shift is 4 bits. The shifted values are individually rounded. (See Section 2.8.2).

5. XSIN:
All the input auxiliary data values c0, c1, c2, c3, s0, s1, s2 and s3 are shifted right as defined by the bit XSIN. If XSIN=1, then all the values are shifted right by one bit.

Otherwise, the values are unaffected. When shifted, the sign bit is extended into the empty msb position. The shifted values are individually rounded.

6. RMB:
No effect.

Effects

1. OVF:
The overflows from the processor-A and Processor-B are routed to the OVF pin, in parallel with the output values. (See Section 2.11).

2. SFO(2:0):
The instruction does not activate conditional scaling. The SFO (2:0) are set to zero.

3.9 INSTRUCTION BSUB

| OPCODE: | | | | | |
|---|---|---|---|---|---|
| CO | CI | 1 | 0 | 0 | 0 |

Description

The instruction subtracts members of a block of four complex values from corresponding members of another block of four complex values.

Data Input Values: r0+j i0, r1+j i1, r2+j i2, r3+j i3.
Auxiliary Input Values: c0+j s0, c1+j s1, c2+j s2, c3+j s3.
Output Data Values: x0+j y0, x1+j y1, x2+j y2, x3+j y3.

Function x0+j y0=(r0+j i0)−(c0+j s0);
x1+j y1=(r1+j i1)−(c1+j s1);
x2+j y2=(r2+j i2)−(c2+j s2); and
x3+j y3=(r3+j i3)−(c3+j s3).

Affected By

1. SPLM:
No effect.
2. CI:
If $CI=1$, then
$r0+j\ i0 = -(r0+j\ i0)$,
$r1+j\ i1 = -(r1+j\ i1)$,
$r2+j\ i2 = -(r2+j\ i2)$, and
$r3+j\ i3 = -(r3+j\ i3)$.
Otherwise, the inputs are unaffected.
3. CO:
If $CO=1$, then
$x0+j\ y0 = -(x0+j\ y0)$,
$x1+j\ y1 = -(x1+j\ y1)$,
$x2+j\ y2 = -(x2+j\ y2)$, and
$x3+j\ y3 = -(x3+j\ y3)$.
Otherwise, the outputs are unaffected.
4. SFI(2:0):
All the input data values r0, r1, r2, r3, i0, i1, i2 and i3 are shifted right by the same amount, as defined by the bits SFI(3:0). The sign is extended into the empty msb bits. The maximum shift is 4 bits. The shifted values are individually rounded. (See Section 2.8.2).
5. XSIN:
All the input auxiliary data values c0, c1, c2, c3, s0, s1, s2 and s3 are shifted right as defined by the bit XSIN. If $XSIN=1$, then all the values are shifted right by one bit. Otherwise, the values are unaffected. When shifted, the sign bit is extended into the empty msb position. The shifted values are individually rounded.
6. RMB:
No effect.

Effects

1. OVF:
The overflows from the Processor-A and Processor-B are rounded to the OVF pin, in parallel with the output values. (See Section 2.11).
2. SFO(2:0):
The instruction does not activate conditional scaling. The SFO(2:0) are set to zero.

3.10 INSTRUCTION BCONJ

| OPCODE: | | | | | |
|---|---|---|---|---|---|
| CO | XX | 1 | 0 | 0 | 1 |

Description

The instruction conjugates a set of four complex values. If desired, values may be further complemented (negated) at the output.

Data Input Values: $r0+j\ i0, r1+j\ i1, r2+j\ i2, r3+j\ i3$.
Auxiliary Input Values: Don't Care, Don't Care, Don't Care, Don't Care.
Output Data Values: $x0+j\ y0, x1+j\ y1, x2+j\ y2, x3+j\ y3$.

Function $x0 + jy0 = r0 - ji0$, if $CO = 0$
$= -(r0 - ji0)$, if $CO = 1$;
$x1 + jy1 = r1 - ji1$, if $CO = 0$
$= -(r1 - ji1)$, if $CO = 1$;
$x2 + jy2 = r2 - ji2$, if $CO = 0$
$= -(r2 - ji2)$, if $CO = 1$; and
$x3 + jy3 = r3 - ji3$, if $CO = 0$
$= -(r3 - ji3)$, if $CO = 1$.

Affected By

1. SPLM:
No effect
2. CI:
No effect
3. CO:
As above.
4. SFI (2:0):
All the input data values r0, r1, r2, r3, i0, i1, i2 and i3 are shifted right by the same amount, as defined by the bits SFI(3:0). The sign is extended into the empty msb bits. The maximum shift is 4 bits. The shifted values are individually rounded (See Section 2.8.2).
5. XSIN:
No effect
6. RMB:
No effect.

Effects

1. OVF:
No effect
2. SFO(2:0):
Set to zero.

3.11 INSTRUCTION BCONS

| OPCODE: | | | | | |
|---|---|---|---|---|---|
| CO | XX | 1 | 0 | 1 | 0 |

Description

The instruction produces a block of constants at the output, disregarding the inputs. The values of constants may be zero or one.

Data Input Values: Don't Care, Don't Care, Don't Care, Don't Care.
Auxiliary Input Values: Don't Care, Don't Care, Don't Care, Don't Care.
Output Data Values: $x0+j\ y0, x1+j\ y1, x2+j\ y2, x3+j\ y3$.

Function $x0 + jy0 = 0 + j0$, if $CO = 0$
$= 1 + j1$, if $CO = 1$;
$x1 + jy1 = 0 + j0$, if $CO = 0$
$= 1 + j1$, if $CO = 1$;
$x2 + jy2 = 0 + j0$, if $CO = 0$
$= 1 + j1$, if $CO = 1$; and
$x3 + jy3 = 0 + j0$, if $CO = 0$
$= 1 + j1$, if $CO = 1$.

Affected By

1. SPLM:
No effect
2. CI:
No effect

3. CO:
As above
4. SFI(2:0):
No effect
5. XSIN:
No effect
6. RMB:
No effect.

Effects

1. OVF:
No Effect.
2. SFO(2:0):
Set to zero.

3.12 INSTRUCTION BCMUL

| OPCODE: | | | | | |
|---------|----|---|---|---|---|
| CO | XX | 1 | 0 | 1 | 1 |

Description

The instruction conjugates the members of a block of four complex values and, then, multiplies those members with corresponding members of another block of four complex values.

Data Input Values: $r0+j\,i0$, $r1+j\,i1$, $r2+j\,i2$, $r3+j\,i3$.
Auxiliary Input Values: $c0+j\,s0$, $c1+j\,s1$, $c2+j\,s2$, $c3+j\,s3$.
Output Data Values: $x0+j\,y0$, $x1+j\,y1$, $x2+j\,y2$, $x3+j\,y3$.

Function $x0+j\,y0 = (r0-j\,i0) * (c0+j\,s0);$
$x1+j\,y1 = (r1-j\,i1) * (c1+j\,s1);$
$x2+j\,y2 = (r2-j\,i2) * (c2+j\,s2);$ and
$x3+j\,y3 = (r3-j\,i3) * (c3+j\,s3).$ Affected By 1. SPLM:
No effect
2. CI:
No effect
3. CO:
If CO=1, then
$x0+j\,y0 = -(x0+j\,y0),$
$x1+j\,y1 = -(x1+j\,y1),$
$x2+j\,y2 = -(x2+j\,y2),$ and
$x3+j\,y3 = -(x3+j\,y3).$
Otherwise, the output are unaffected.
4. SFI (2:0):
All the input data values r0, r1, r2, r3, i0, i1, i2, and i3 are shifted right by the same amount, as defined by the bits SFI(3:0). The sign is extended into the empty msb bits. The maximum shift is 4 bits. The shifted values are individually rounded. (See Section 2.8.2).
5. XSIN:
All the input auxiliary data values c0, c1, c2, c3, s0, s1, s2, s3 are shifted right as defined by the bit XSIN. If XSIN=1, then all the values are shifted right by one bit. Otherwise, the values are unaffected. When shifted, the sign bit is extended into empty msb position. The shifted values are individually rounded.
6. RMB:
No effect.

Effects

1. OVF:
The overflows from the Processor-A and Processor-B are routed to the OVF pin, in parallel with the output values (See Section 2.11).
2. SFO(2:0):
The instruction does not activate conditional scaling. The SFO(2:0) are set to zero.

3.13 INSTRUCTION LFLOW

| OPCODE: | | | | | |
|---------|----|---|---|---|---|
| CO | XX | 1 | 1 | 0 | 0 |

Description

The instruction passes a set of four complex values from the input to the output of the device. If desired, values may be logically inverted during the Pass.

Data Input Values: r0, i0; r1, i1; r2, i2; r3, i3.
Auxiliary Input Values: Dont'Care, Dont'Care, Dont'Care, Dont'Care.
Output Data Values: x0, y0; x1, y1; x2, y2; x3, y3.

Function $x0=r0;\ y0=i0;$ If, CO=0.
$x0=r0-;\ y0=i0-;$ If, CO=1.
$x1=r1;\ y1=i1;$ If, CO=0.
$x1=r1-;\ y1=i1-;$ If, CO=1.
$x2=r2;\ y2=i2;$ If, CO=0.
$x2=r2-;\ y2=i2-;$ If, CO=1.
$x3=r3;\ y3=i3;$ If, CO=0.
$x3=r3-;\ y3=i3-;$ If, CO=1.

Affected By

1. SPLM:
No effect
2. CI:
No effect.
3. CO:
As above.
4. SFI(2:0):
All the input data values r0, r1, r2, r3, i0, i1, i2 and i3 are logically shifted right by the same amount, as defined by the bits SFI(3:0). The empty msb bits are set to zero. The maximum shift is 4 bits.
5. XSIN:
No effect
6. RMB:
No effect.

Effects

1. OVF:
No effect.
2. SFO(2:0):
Set to zero.

3.14 INSTRUCTION BAND

| OPCODE: | | | | | |
|---------|----|---|---|---|---|
| CO | XX | 1 | 1 | 0 | 1 |

Description

The instruction logically ANDs the members of a block of four complex values with corresponding members of another block of four complex values.

Data Input Values: r0, i0; r1, i1; r2, i2; r3, i3.
Auxiliary Input Values: c0, s0; c1, s1; c2, s2; c3, s3.
Output Data Values: x0, y0; x1, y1; x2, y2; x3, y3.

Function x0=r0 .&. c0; y0=i0 .&. s0;
x1=r1 .&. c1; y1=i1 .&. s1;
x2=r2 .&. c2; y2=i2 .&. s2; and
x3=r3 .&. c3; y3=i3 .&. s3.

Affected By

1. SPLM:
No effect
2. CI:
If CI=1, then
r0=r0−; i0=i0−;
r1=r1−; i1=i1−;
r2=r2−; i2=i2−; and
r3=r3−; i3=i3−.
Otherwise, inputs are unaffected.
3. CO:
If CO=1, then
x0=x0−; y0=y0−;
x1=x1−; y1=y1−;
x2=x2−; y2=y2−; and
x3=x3−; y3=y3−.
Otherwise, the outputs are unaffected.
4. SFI(2:0):
All the input data values r0, r1, r2, r3, i0, i1, i2, and i3 are logically shifted right by the same amount, as defined by the bits SFI(3:0). The empty msb bits are set to zero. The maximum shift is 4 bits.
5. XSIN:
All the input auxiliary data values c0, c1, c2, c3, s0, s1, s2 and s3 are logically shifted right as defined by the bit XSIN. If XSIN=1, then all the values are shifted right by one bit. Otherwise, the values are unaffected. When shifted, the empty msb bits are set to zero.
6. RMB:
No effect.

Effects

1. OVF:
No Effect
2. SFO(2:0):
The SFO(2:0) are set to zero.

3.15 INSTRUCTION BOR

| OPCODE: | | | | | |
|---|---|---|---|---|---|
| C0 | XX | 1 | 1 | 1 | 0 |

Description

The instruction logically ORs the members of a block of four complex values with corresponding members of another block of four complex values.

Data Input Values: r0, i0; r1, i1; r2, i2; r3, i3.
Auxiliary Input Values: c0, s0; c1, s1; c2, s2; c3, s3.
Output Data Values: x0, y0; x1, y1; x2, y2; x3, y3.

Function x0=r0 .OR. c0; y0=i0 .OR. s0;
x1=r1 .OR. c1; y1=i1 .OR. s1;
x2=r2 .OR. c2; y2=i2 .OR. s2; and
x3=r3 .OR. c3; y3=i3 .OR. s3.

Affected By

1. SPLM:
No effect
2. CI:
If CI=1, then
r0=r0−; i0=i0−;
r1=r1−; i1=i1−;
r2=r2−; i2=i2−; and
r3=r3−; i3=i3−.
Otherwise, inputs are unaffected.
3. CO:
If CO=1, then
x0=x0−; y0=y0−;
x1=x1−; y1=y1−;
x2=x2−; y2=y2−; and
x3=x3−; y3=y3−.
Otherwise, the outputs are unaffected.
4. SFI(2:0):
All the input data values r0, r1, r2, r3, i0, i1, i2, and i3 are logically shifted right by the same amount, as defined by the bits SFI(3:0). The empty msb bits are set to zero. The maximum shift is 4 bits.
5. XSIN:
All the input auxiliary data values c0, c1, c2, c3, s0, s1, s2 and s3 are logically shifted right as defined by the bit XSIN. If XSIN=1, then all the values are shifted right by one bit. Otherwise, the values are unaffected. When shifted, the empty msb bits are set to zero.
6. RMB:
No effect.

Effects

1. OVF:
No effect.
2. SFO(2:0):
The SFO(2:0) are set to zero.

3.16 INSTRUCTION BXOR

| OPCODE: | | | | | |
|---|---|---|---|---|---|
| C0 | XX | 1 | 1 | 1 | 1 |

Description

The instruction logically Exclusive-ORs the members of a block of four complex values with corresponding members of another block of four complex values.

Data Input Values: r0, i0; r1, i1; r2, i2; r3, i3.
Auxiliary Input Values; c0, s0; c1, s1; c2, s2; c3, s3.
Output Data Values: x0, y0; x1, y1; x2, y2; x3, y3.

Function x0=r0 .XOR. c0; y0=i0 .XOR. s0;
x1=r1 .XOR. c1; y1=i1 .XOR. s1;
x2=r2 .XOR. c2; y2=i2 .XOR. s2; and
x3=r3 .XOR. c3; y3=i3 .XOR. s3.

Affected By

1. SPLM:
No effect

2. CI:
 If CI=1, then
  r0=r0−; i0=i0−;
  r1=r1−; i1=i1−;
  r2=r2−; i2=i2−;
  r3=r3−; i3=i3−.
 Otherwise, the inputs are unaffected.
3. CO:
 If CO=1, then
  x0=x0−; y0=y0−;
  X1=x1−; y1=y1−;
  x2=x2−; y2=y2−; and
  x3=x3−; y3=y3−.
 Otherwise, the outputs are unaffected.
4. SFI(2:0):
 All the input data values r0, r1, r2, r3, i0, i1, i2, and i3 are logically shifted right by the same amount, as defined by the bits SFI(3:0). The empty msb bits are set to zero. The maximum shift is 4 bits.
5. XSIN:
 All the input auxiliary data values c0, c1, c2, c3, s0, s1, s2 and s3 are logically shifted right as defined by the bit XSIN. If XSIN=1, then all the values are shifted right by one bit. Otherwise, the values are unaffected. When shifted, the empty msb bits are set to zero.
6. RMB:
 No effect.

Effects

1. OVF:
 No effect.
2. SFO(2:0):
 The SFO(2:0) are set to zero.

3.17 DATA FLOW DIAGRAMS

The data flow diagrams for every instruction are included in Appendix A. Primarily, the diagrams are for information to designers only. The diagrams give the following information regarding the implementation of each instruction.
 a. The assignment of various input registers for the incoming data values.
 b. The status of various programmable elements (such as multiplexers, sign-control on adders, etc) to implement the given function.
 c. The assignment of output data registers for the out-going data values.

APPENDIX A

Figure 22:
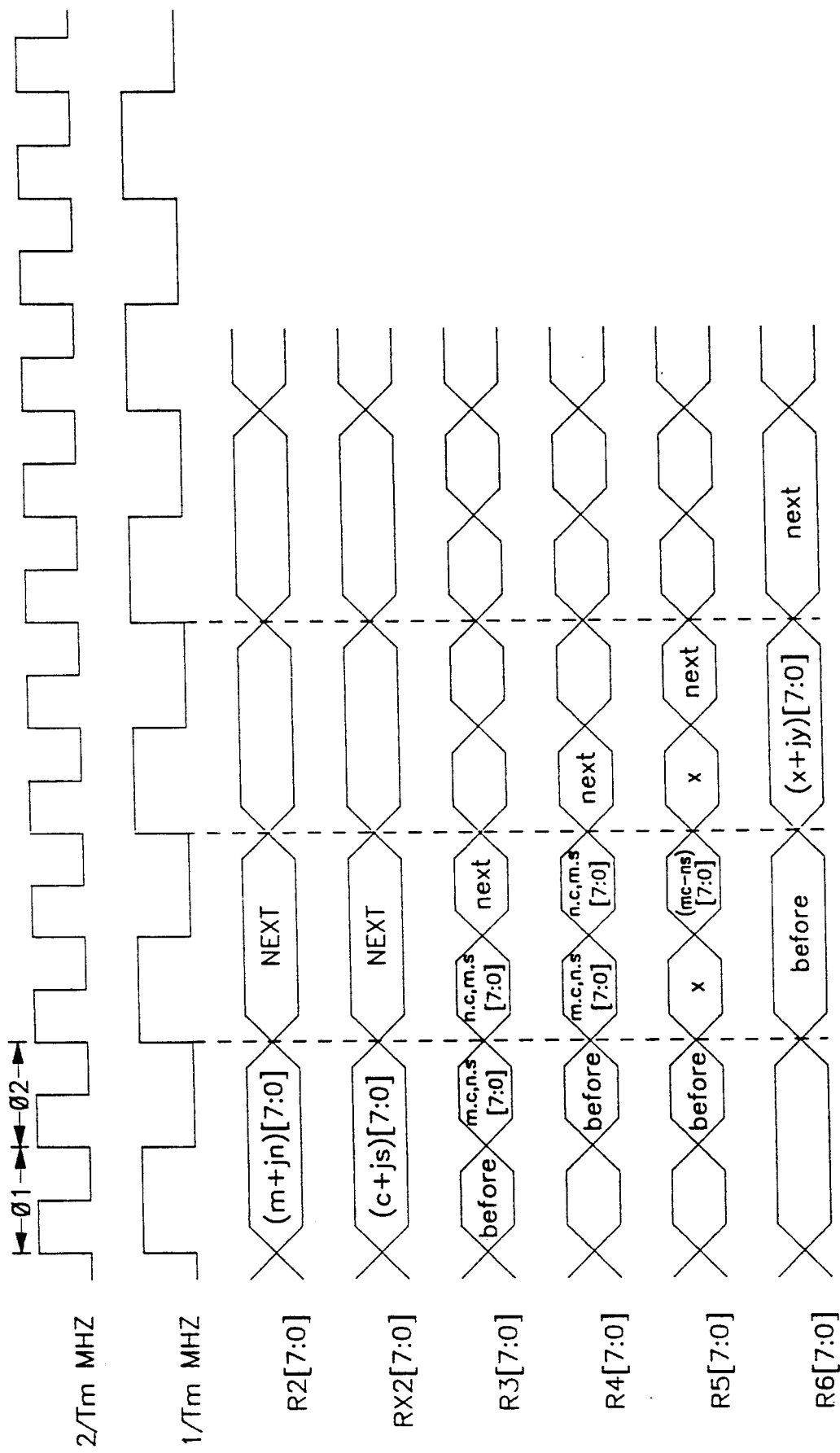
FIG. 22 is a timing diagram of one of the Arms of Processor B.

The diagrams A-1 to A-26 show the data flow for each of the DASP instructions. Refer to FIG. 22 for the definition of the two clock phases O1 and O2.

The heavy lines shown in each of the FIGS. 32 through 57 indicate data paths for the execution of the given function. A blank area referring to a prior data flow diagram indicates that the data flow in the area between the heavy lines is the same as that shown in the referenced prior data flow diagram.

APPENDIX B

Logic and Transistor Designs of Multiplier and ALU

Figure 58:
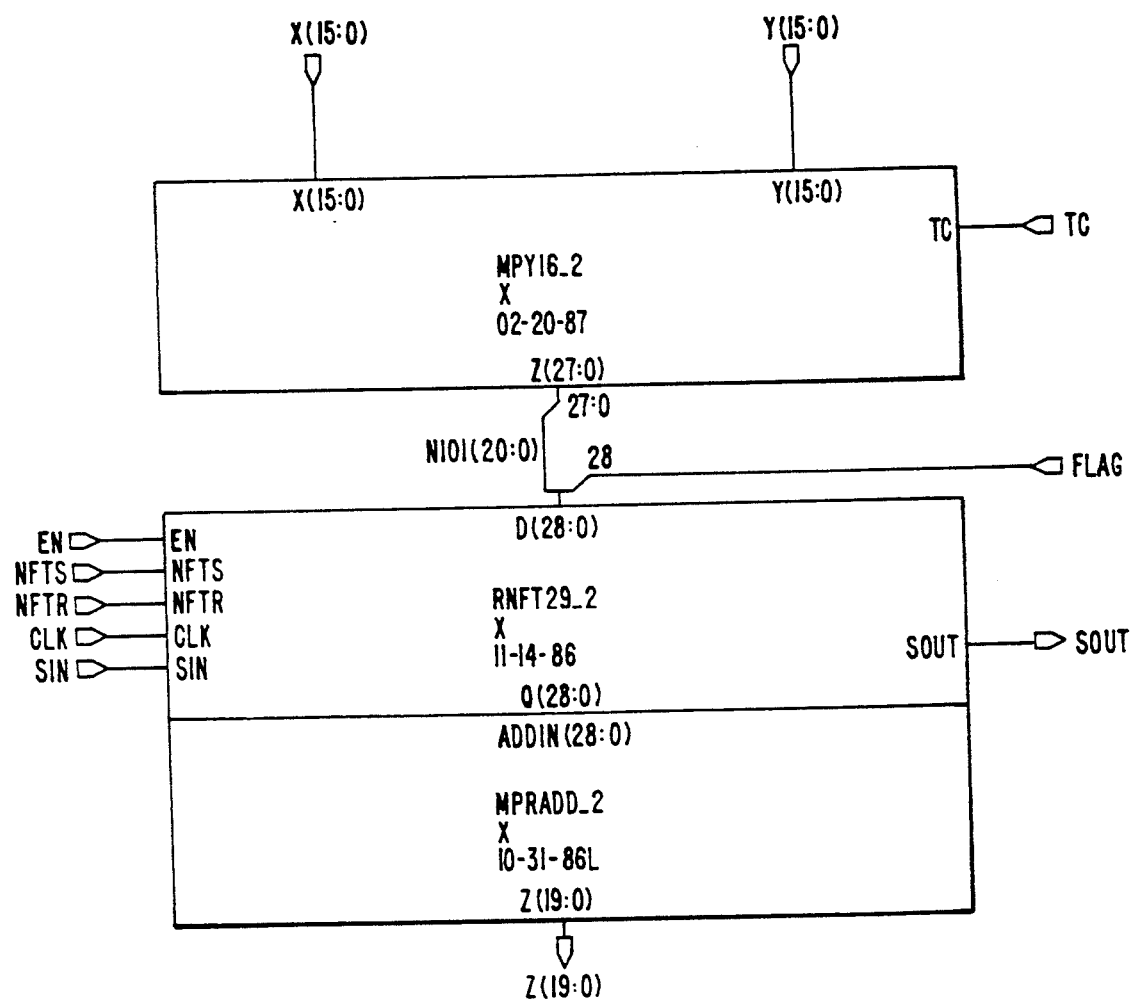
FIGS. 58 through 63 are block diagrams representing the logic and the transistor level implementation of each of the eight multipliers (MUL0-MUL7) contained in Processor-B.
Figure 59:
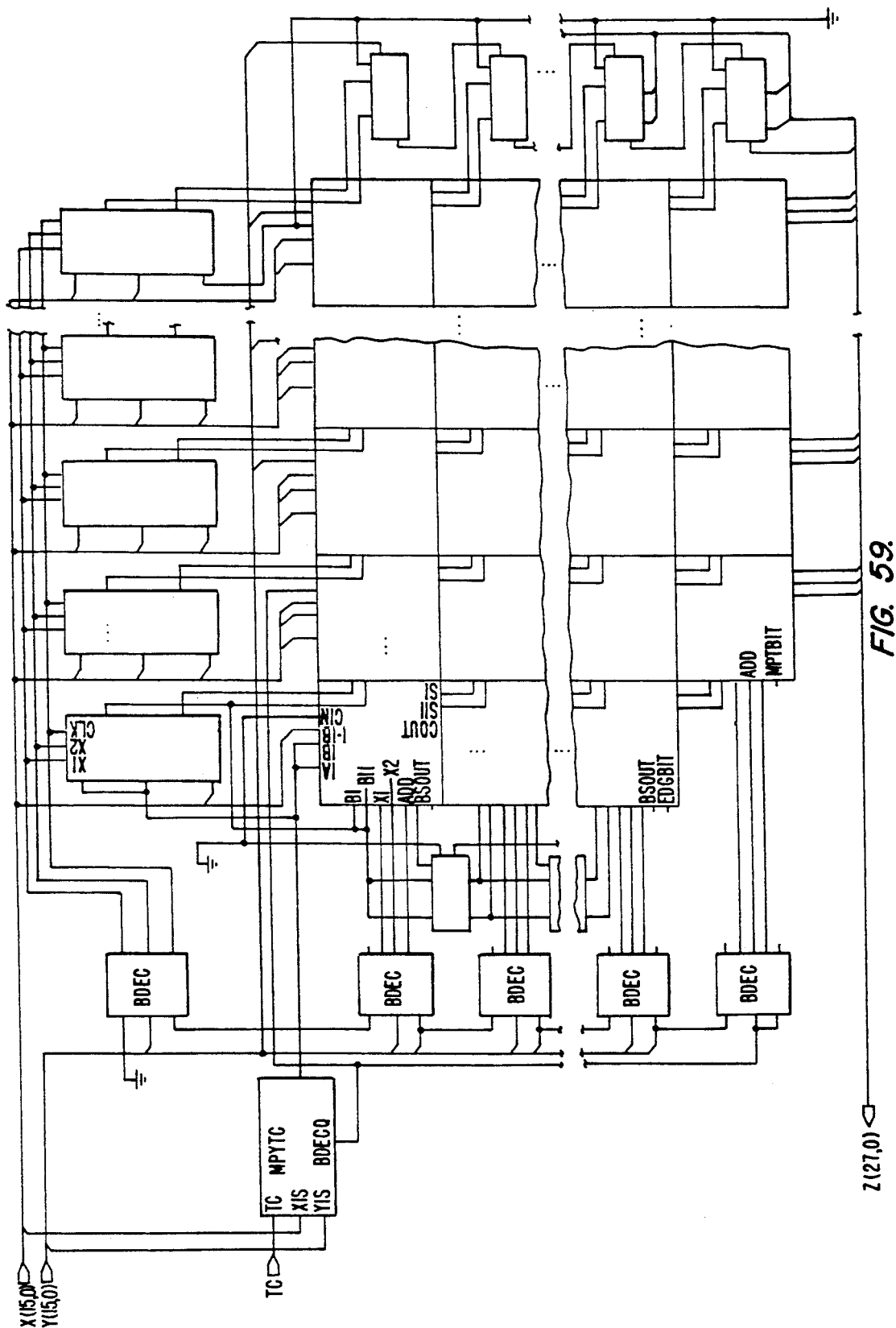
Figure 60:
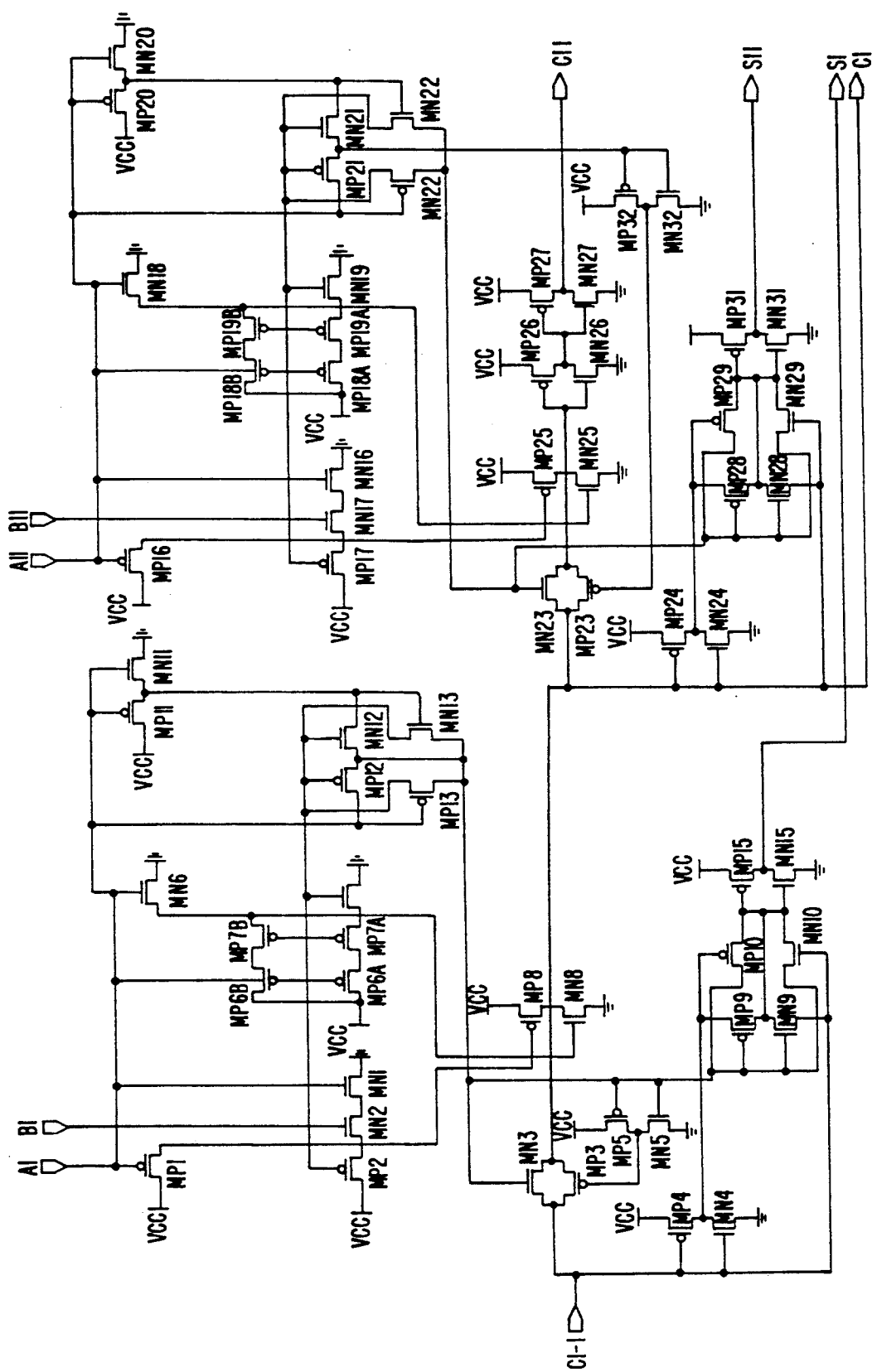
Figure 61:
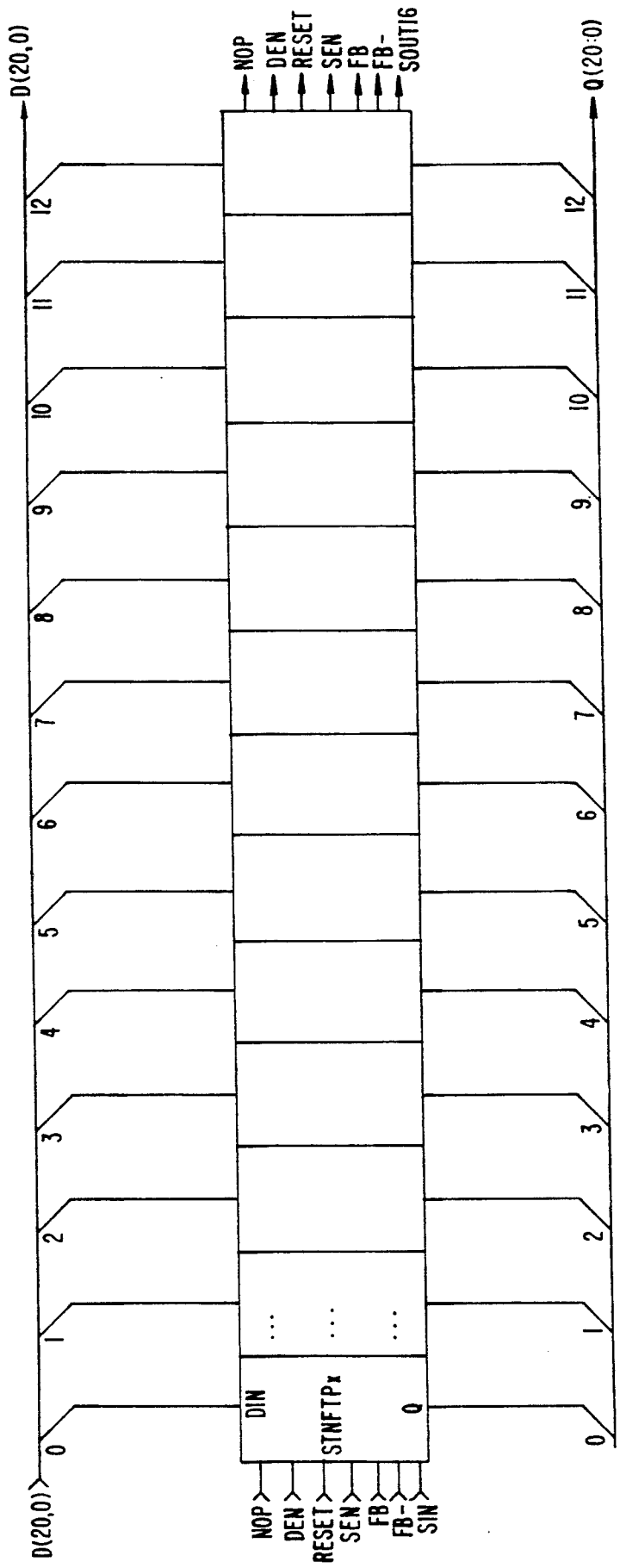
Figure 62:
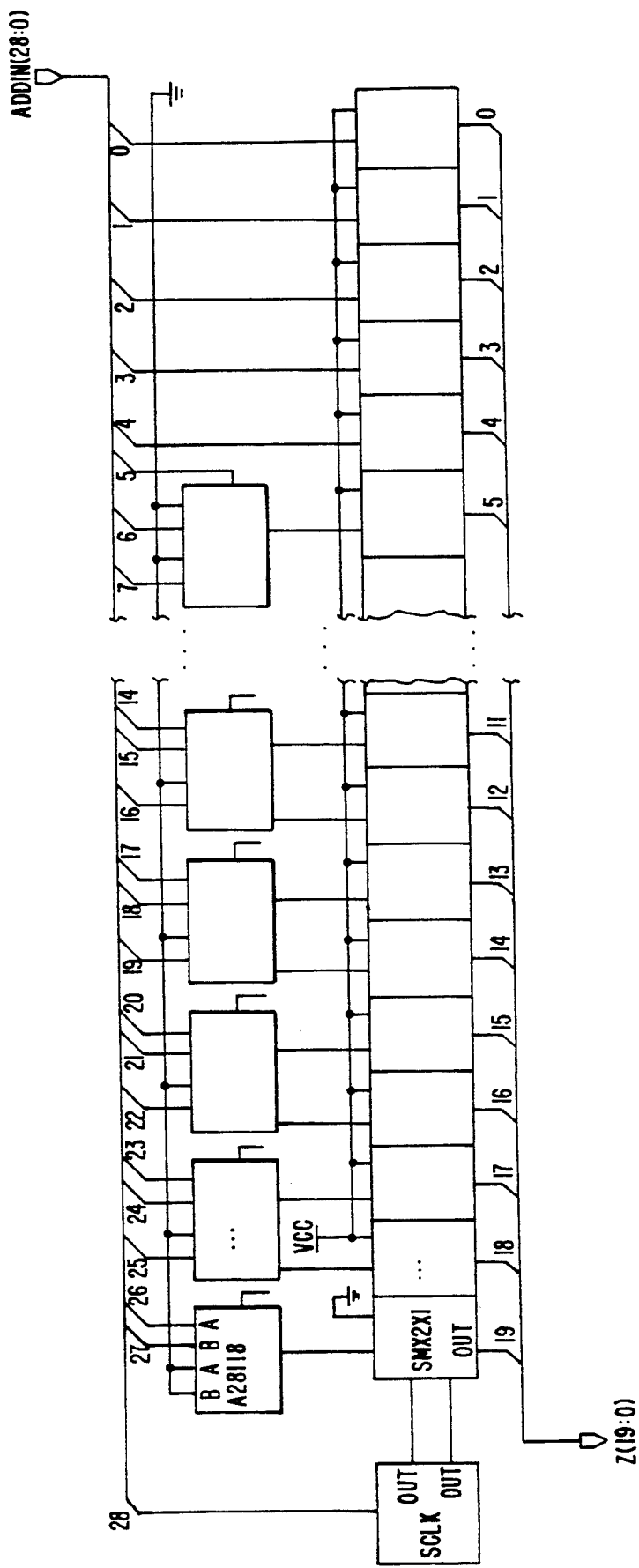
Figure 63:
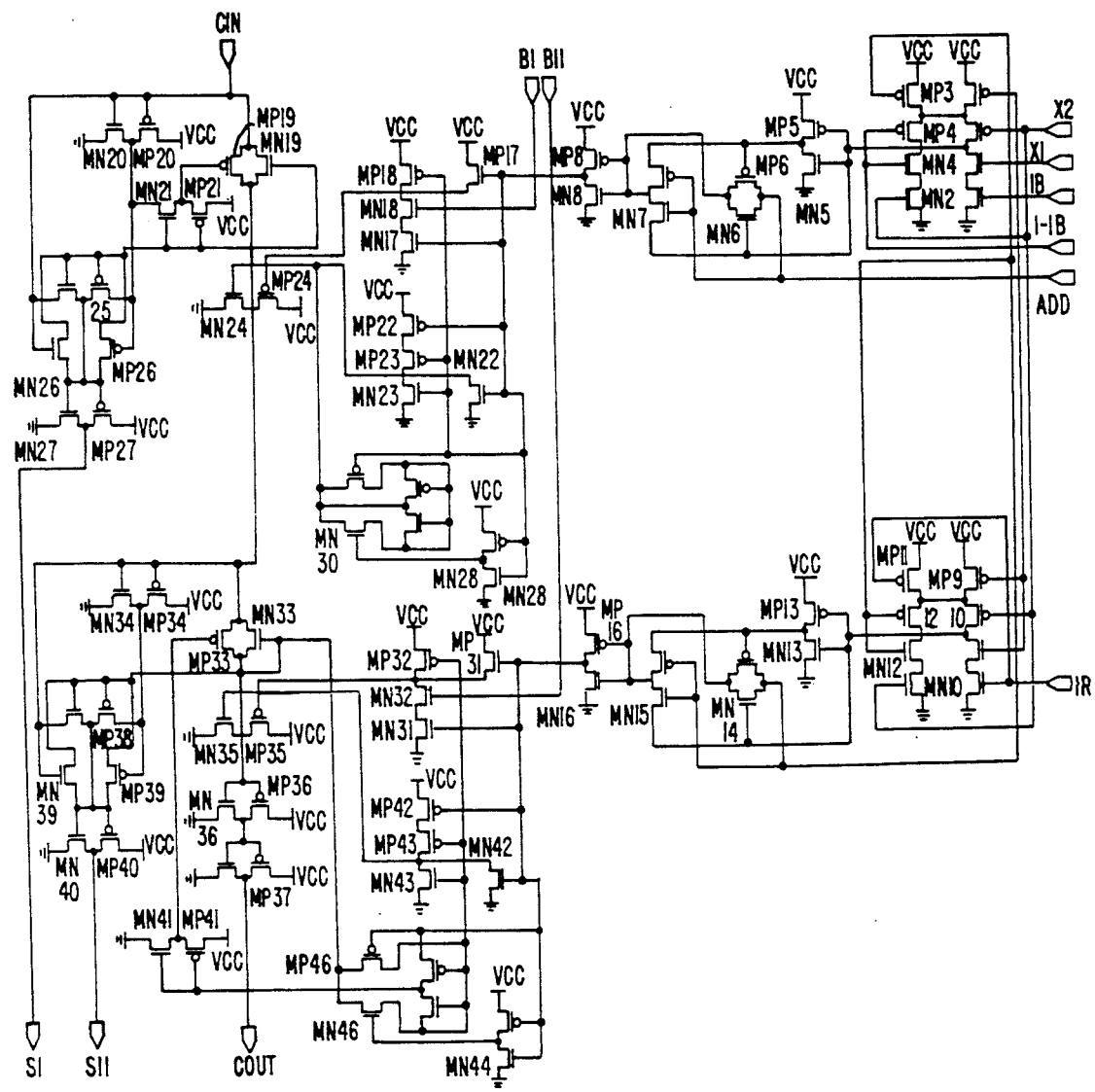

FIGS. 58 through 63 show the logic and the transistor level implementation of each of the 8 multipliers (MUL0-MUL7) contained in Processor-B. X(15:0) and Y(15:0) shown in FIG. 58 are the 2 operands for each of the multipliers.

Figure 64:
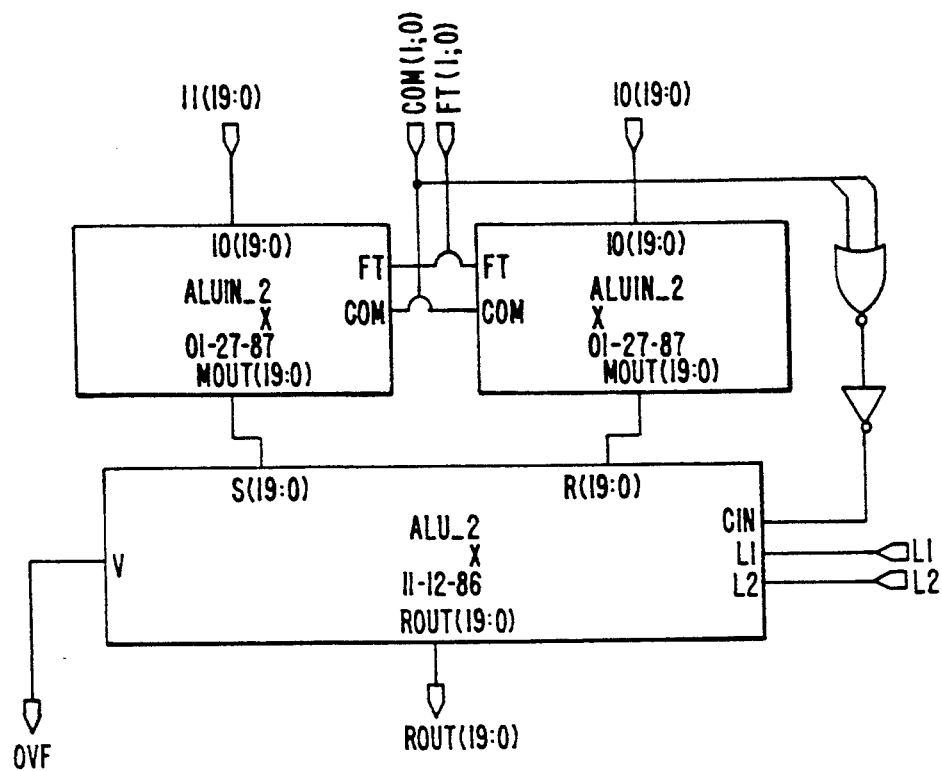
FIGS. 64 through 68 are block diagrams representing the logic and transistor designs for each of the four ALUs (ALU0-ALU3) contained in Processor-B.
Figure 66:
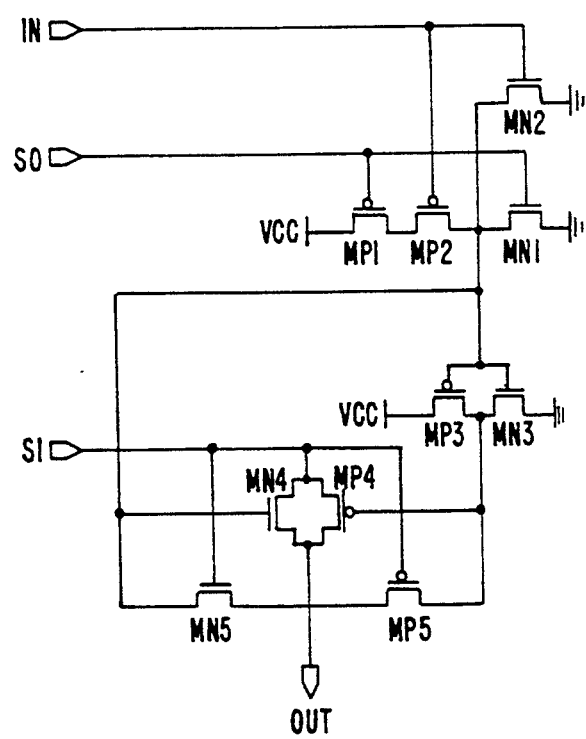
Figure 65:
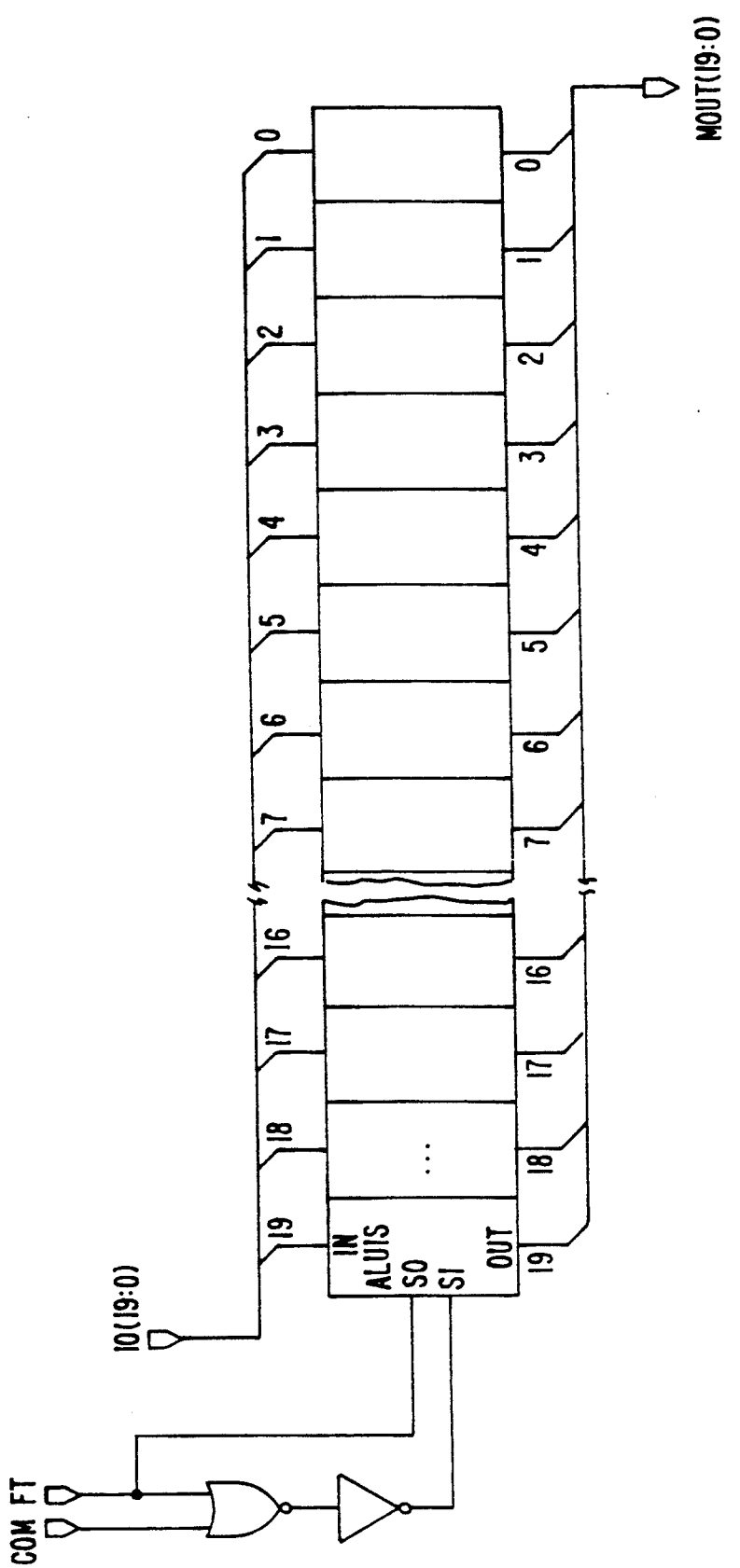
Figure 67:
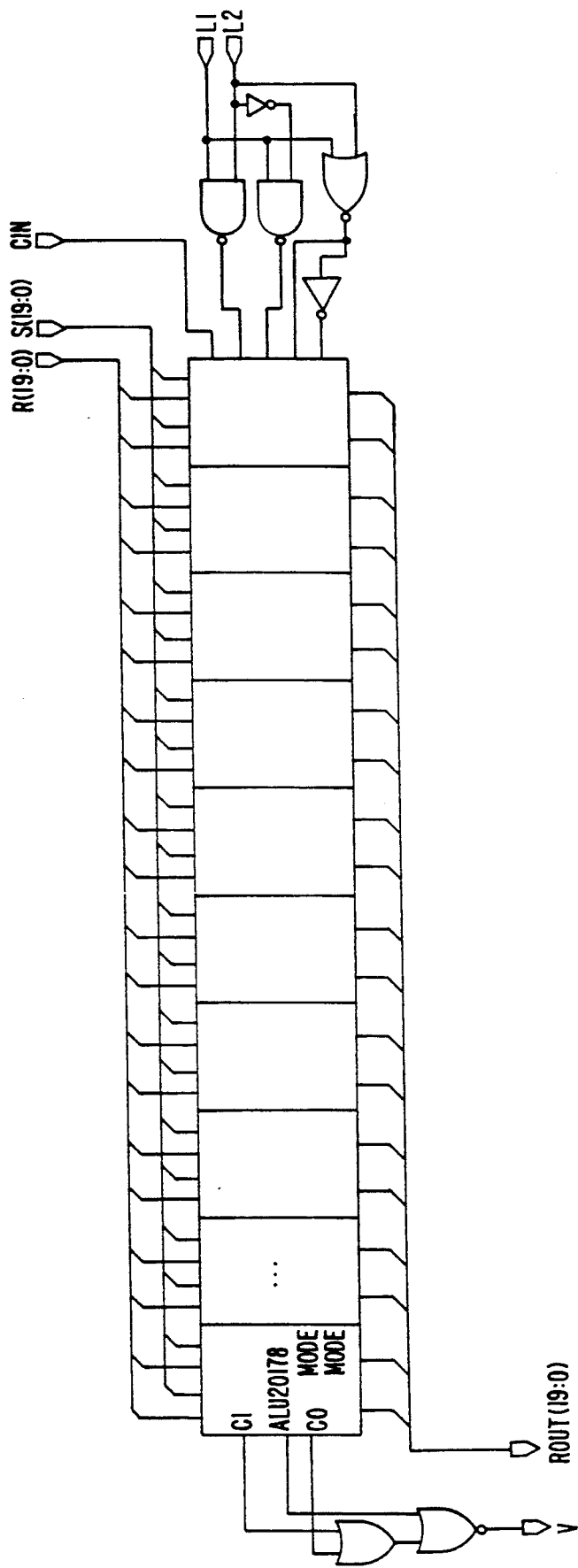
Figure 68:
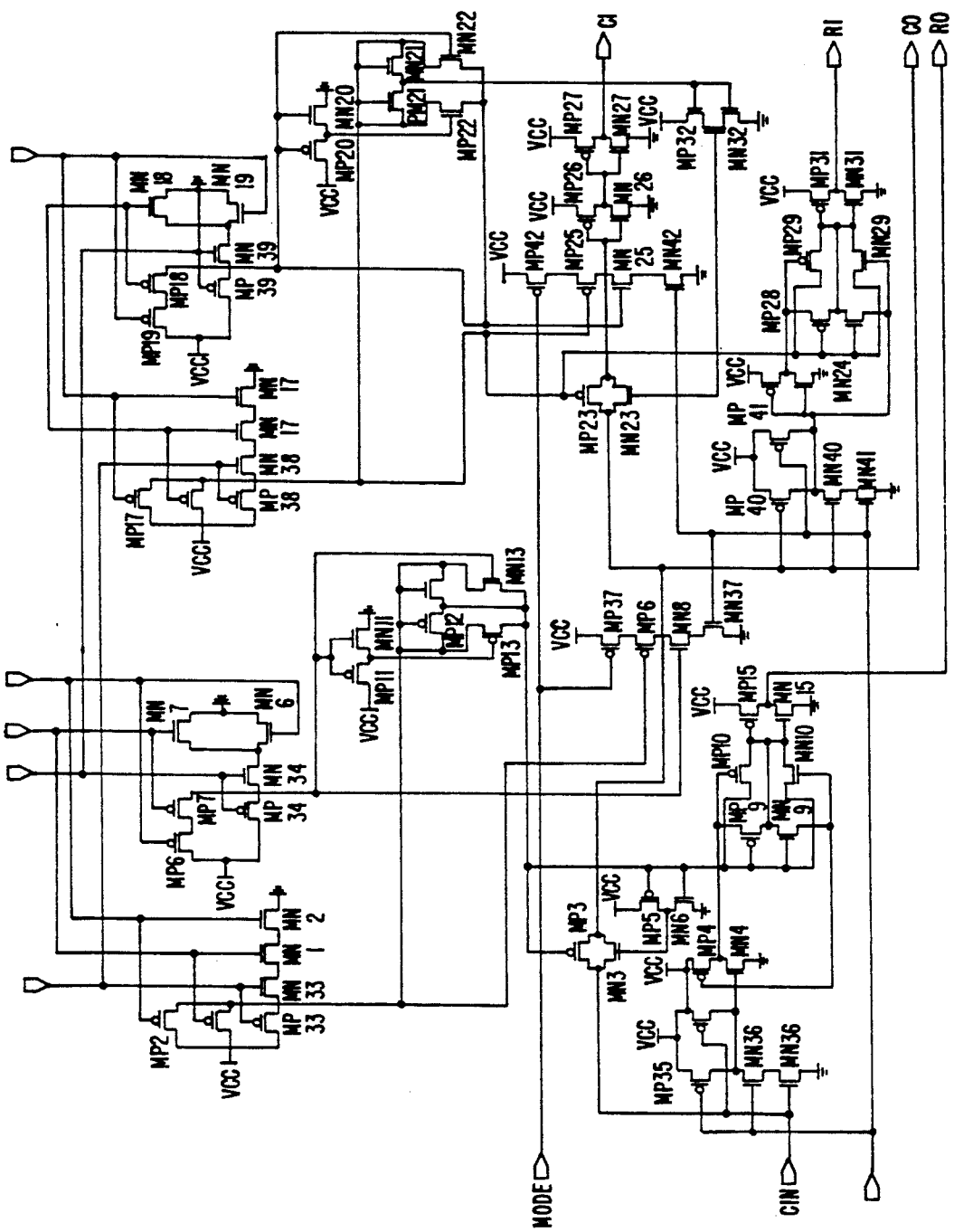

FIGS. 64 through 68 show the logic and transistor designs for the 4 ALUs (ALU0-ALU3) contained in Processor-B. I0(19:0) and I1(19:0) shown in FIG. 64 are the 2 operands fed to each of the ALUs.

APPENDIX C

VARIATION ON CE ARCHITECTURE

Figure 69:
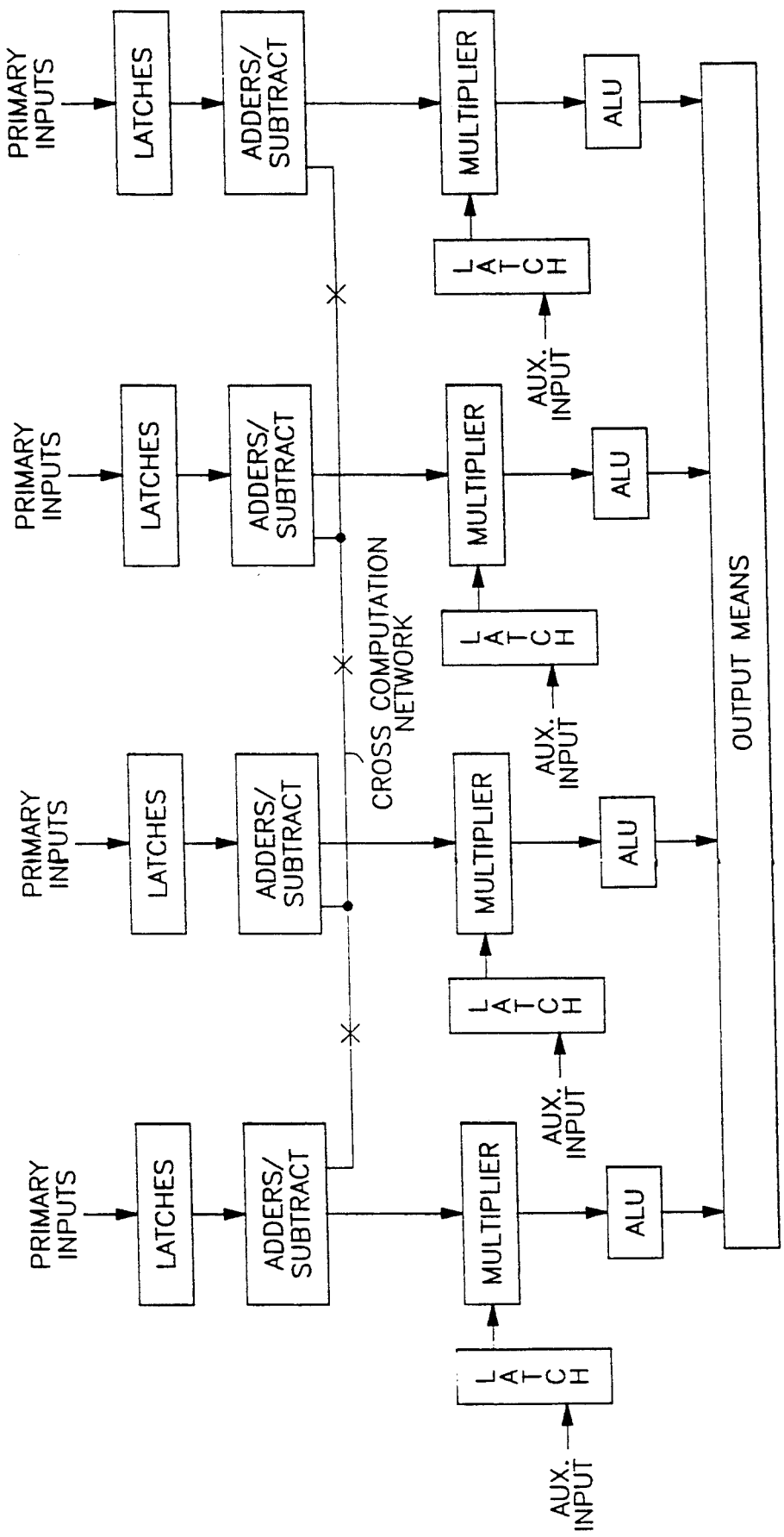
FIG. 69 is a block diagram of the general architectural concepts of the CE.

The implementation of CE which has been discussed in these specifications follows the general architecture concept which is shown in FIG. 69.

Figure 70:
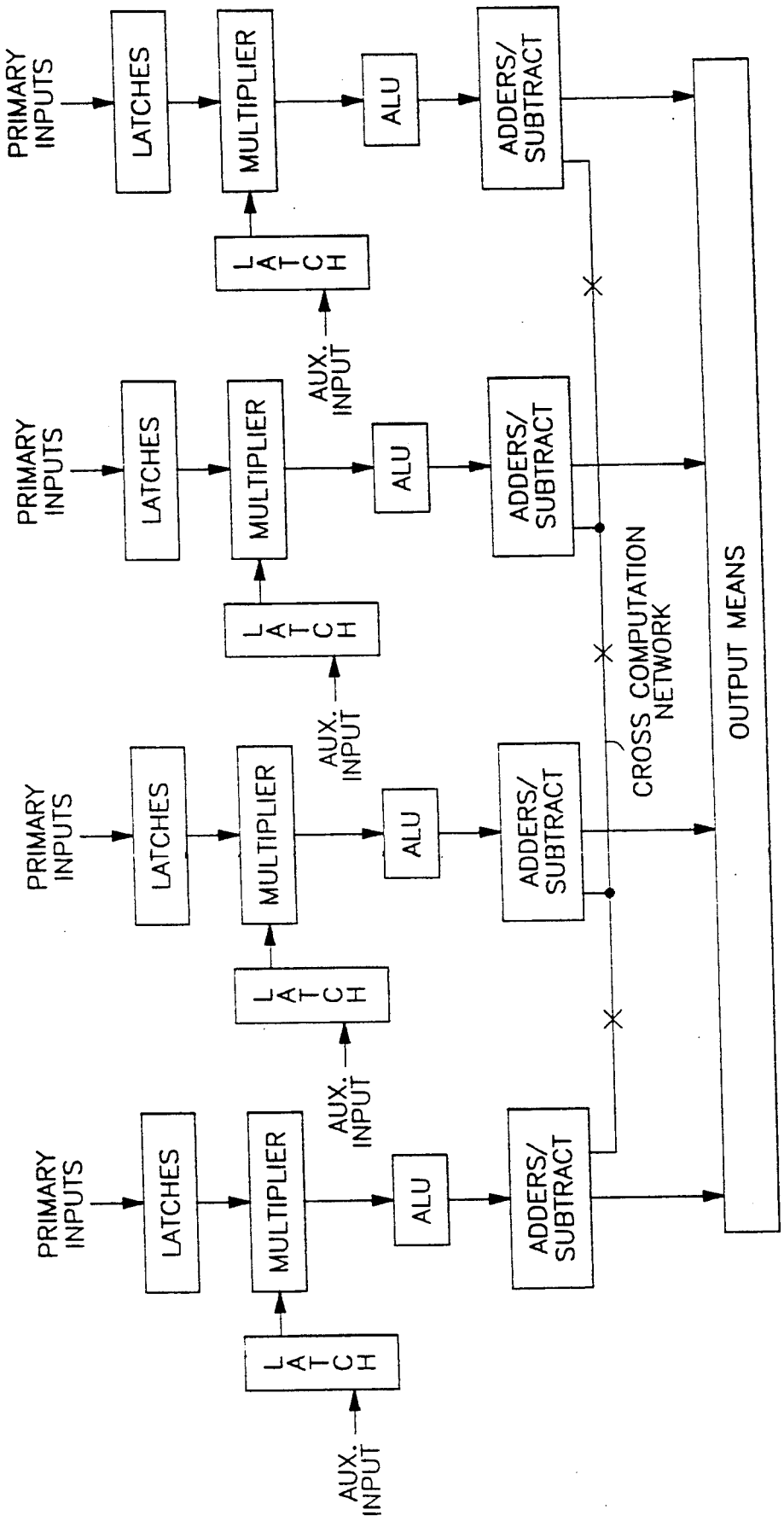
FIG. 70 is a block diagram of a variation on the architecture of the CE.
Figure 71:
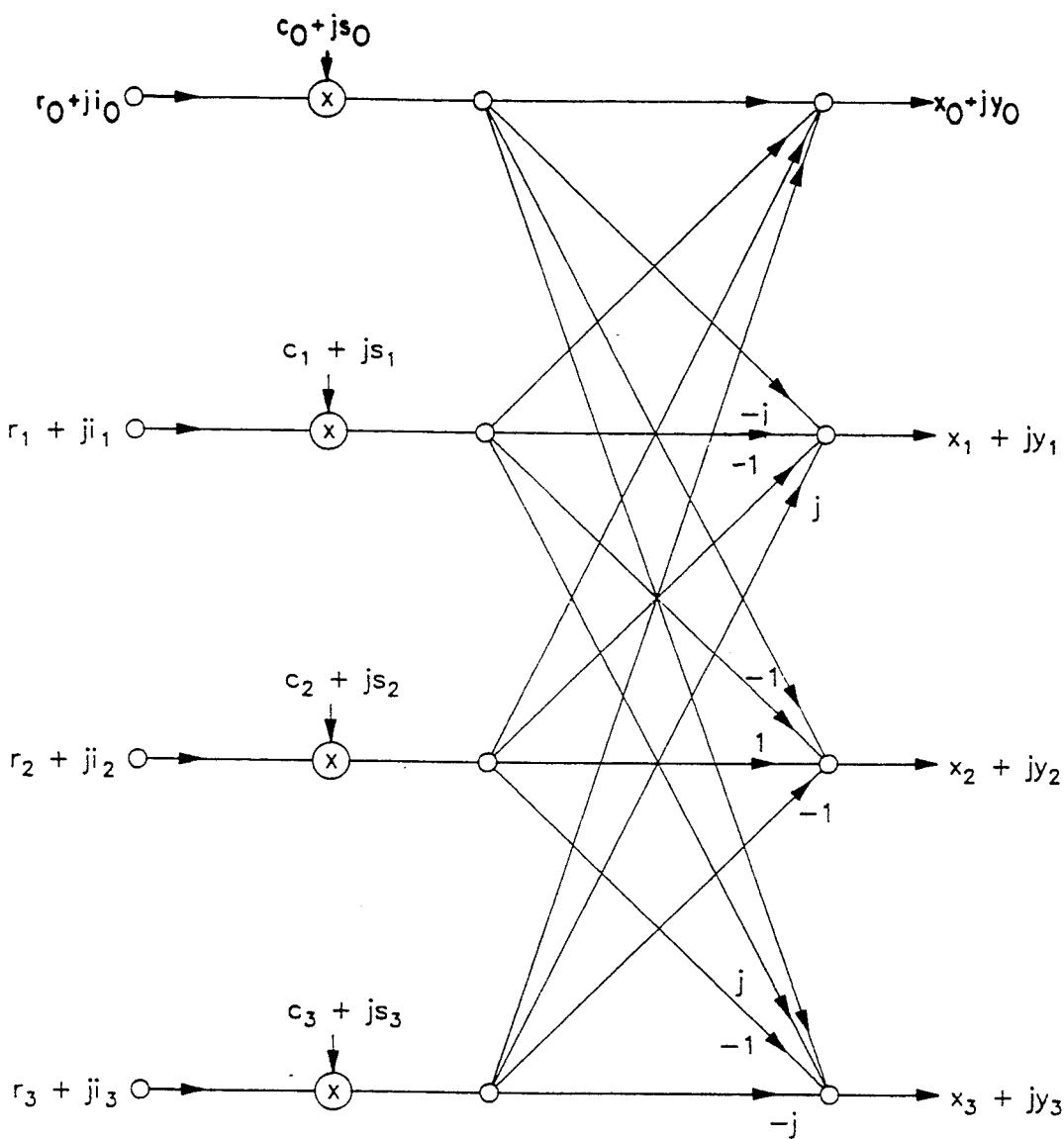
FIG. 71 is a diagram of the Decimation-In-Time Algorithm.

A variation on the architecture that is configured as shown in FIG. 70 could also be implemented. The detailed implementation of such architecture will be similar to that described in these specifications. The processor A and Processor B (see FIGS. 19 & 31) can be interchanged to achieve such implementation. The resulting architecture will be extremely useful for implementing the majority of functions discussed previously. The butterfly implementations will follow the decimation-in-time algorithm which is shown in FIG. 71.

What is claimed is:

1. An integrated circuit for processing an array of digital data, comprising:
 a first data input bus;
 a second data input bus;
 first input means, coupled to said first data input bus, for receiving a plurality of serial data groupings and providing a parallel data group output;
 second input means, coupled to said second data input bus, for receiving a plurality of serial data groupings and providing a parallel data group output;
 at least four primary digital inputs, each of said primary digital inputs being capable of receiving a a plurality of digital bits from said first input means;
 at least two auxiliary digital inputs, each of said auxiliary digital inputs being capable of receiving a plurality of digital bits from said second input means;
 first latching means, said first latching means including one data flow path for each of said primary inputs and means for delaying the flow of data in each of said data flow paths in said first latching means;
 second latching means, said second latching means including one data flow path for each of said auxiliary inputs and means for delaying the flow of data in each of said data flow paths in said second latching means;
 first adder means for selectively performing at least one addition or subtraction operation between the data on at least a first and second of said data flow paths in said first latching means to provide at least a first result;
 second adder means for selectively performing at least one addition or subtraction operation between the data on at least a third and a fourth of said data flow paths in said first latching means to provide at least a second result;
 first multiplier means for selectively performing at least one multiplication operation with the data on a first of said auxiliary inputs and said first result, to provide at least a first product;
 second multiplier means for selectively performing at least one multiplication operation with the data on a second of said auxiliary inputs and said second result, to provide at least a second product, wherein said second latching means delays said auxiliary digital inputs to arrive at said first and second multiplier means coincident with the arrival of said first and second results;

first arithmetic means for performing at least one addition or subtraction operation with said first product;

second arithmetic means for performing at least one addition or subtraction operation with said second product;

means for outputting at least a portion of the data from said first or second arithmetic means;

control input leads coupled to said integrated circuit; and control means, having control inputs coupled to said control input leads of said integrated circuit and control outputs coupled to said first and second input means and said first and second adder means, first and second multiplier means and first and second arithmetic means, for selecting a first combination of data for a fast FFT operation in said first and second adder means, first and second multiplier means and first and second arithmetic means, in response to a first control signal on said control input leads, and for selecting a second combination of data for a block multiply operation in one of said first and second adder means and said first and second multiplier and first and second arithmetic means in response to a second control signal on said control input leads.

2. The circuit of claim 1 further comprising a first clock operating at a first frequency and coupled to said first and second adder means and a second clock coupled to said first clock operating at twice said first frequency, said first and second multiplier means having clock inputs from said second clock and having outputs coupled back to inputs of said first and second multiplier means to provide two multiplication operations in a cycle of said first clock.

3. The circuit of claim 1 wherein said first and second input means comprise first and second sets of multiplexers.

4. The circuit of claim 3 wherein said first and second sets of multiplexers each include 8 multiplexers, and said control means further comprises means, responsive to a third control signal, for performing in said first and second adder means, first and second multiplier means and first and second arithmetic means radix 4 operations on data supplied through all of said multiplexers, and, responsive to a fourth control signal, for performing two parallel radix 2 operations, each radix 2 operation being performed on data supplied through half of said multiplexer.

5. The circuit of claim 1 further comprising:
an internal data bus coupled between an output of said first and second arithmetic means and said first data input bus;
input leads coupled to said first data input bus;
output leads coupled to said output of said arithmetic means; and
means, coupled to said internal data bus, for selectively providing data from said output leads or said outputs of said arithmetic means to said input leads coupled to said first data input bus or to said first input means.

6. The circuit of claim 5 wherein said means for selectively providing data comprises a plurality of transceivers.

7. The circuit of claim 1 further comprising a cross computation network coupled between said first and second adder means for switching operands in accordance with an FFT butterfly pattern.

8. A digital signal processor integrated circuit comprising:
a first data input bus;
first input leads coupled to said first input data bus;
a second data input bus;
a first set of multiplexers coupled to said first data input bus;
a second set of multiplexers coupled to said second data input bus;
a first arithmetic processor coupled to outputs of said first set of multiplexers;
a number of latch stages coupled to outputs of said second set of multiplexers, said number corresponding to a number of clock cycles for sequencing data through said first arithmetic processor;
a second arithmetic processor having first inputs coupled to outputs of said first arithmetic processor and second inputs coupled to outputs of said latch stages;
a data output bus coupled to outputs of said second arithmetic processor;
output leads coupled to said data output bus;
control input leads coupled to said integrated circuit;
control means, having control inputs coupled to said control input leads of said integrated circuit and control outputs coupled to said first and second sets of multiplexers and said first and second arithmetic processors, for selecting a first combination of said multiplexers for a fast FFT operation in said first and second arithmetic processors in response to a first control signal on said control input leads, and for selecting a second combination of said multiplexers for a block multiply operation in one of said first and second arithmetic processors in response to a second control signal on said control input leads;
an internal data bus coupled between said output data bus and said first data input bus; and
means, coupled to said internal data bus, for selectively providing data from said output leads or said outputs of said second arithmetic processor to one of said first input leads and said first set of multiplexers.

9. The circuit of claim 8 wherein said means for selectively providing data comprises a plurality of transceivers.

10. A digital signal processor integrated circuit comprising:
a first data input bus;
a second data input bus;
input leads coupled to said first and second data input buses;
a first set of multiplexers coupled to said first data input bus;
a second set of multiplexers coupled to said second data input bus;
a first arithmetic processor coupled to outputs of said first set of multiplexers;
a number of latch stages coupled to outputs of said second set of multiplexers, said number corresponding to a number of clock cycles for sequencing data through said first arithmetic processor;
a second arithmetic processor having first inputs coupled to outputs of said first arithmetic processor and second inputs coupled to outputs of said latch stages;

a data output bus coupled to outputs of said second arithmetic processor;

output leads coupled to said data output bus;

control input leads coupled to said integrated circuit;

control means, having control inputs coupled to said control input leads of said integrated circuit and control outputs coupled to said first and second sets of multiplexers and said first and second arithmetic processors, for selecting a first combination of said multiplexers for a fast FFT operation in said first and second arithmetic processors in response to a first control signal on said control input leads, and for selecting a second combination of said multiplexers for a block multiply operation in one of said first and second arithmetic processors in response to a second control signal on said control input leads;

said control means, in response to each of a plurality of control signals, controls said first and second arithmetic processors to perform a function specified by said control signals on a stream of data following each of said control signals;

scale factor generator means, coupled to said outputs of said second arithmetic processor, for producing scale factors corresponding to the shifting of data between inputs to said first arithmetic processor and said outputs of said second arithmetic processor;

means, coupled to said scale factor generator mean, for combining a plurality of said scale factors to produce a total scale factor;

a cumulative scale factor memory for storing said total scale factor;

a beginning of pass (BOP) input lead for receiving a BOP signal indicating a new set of data in said stream of data; and means, responsive to said BOP signal, for clearing said cumulative scale factor memory.

11. The circuit of claim 10 further comprising:

a scale factor input lead coupled to said scale factor generator; and a scale factor output lead coupled to said cumulative scale factor memory.

12. A digital signal processor integrated circuit comprising:

a first data input bus;

a second data input bus;

first means, coupled to said first data input bus, for receiving a plurality of serial data groupings and providing a single, parallel data group at a first data path;

second means, coupled to said second data input bus, for receiving a plurality of serial data groupings and providing a single, parallel data group at a second data path;

a first arithmetic processor coupled to said first data path;

a number of latch stages coupled to said second data path, said number corresponding to a number of clock cycles for sequencing data through said first arithmetic processor;

a second arithmetic processor having first inputs coupled to outputs of said first arithmetic processor and second inputs coupled to outputs of said latch stages;

a data output bus coupled to outputs of said second arithmetic processor;

output leads coupled to said data output bus;

control input leads coupled to said integrated circuit; and control means, having control inputs coupled to said control input leads of said integrated circuit and control outputs coupled to said first and second means and said first and second arithmetic processors, for selecting a first combination of data for a fast FFT operation in said first and second arithmetic processors in response to a first control signal on said control input leads, and for selecting a second combination of data for a block multiply operation in one of said first and second arithmetic processors in response to a second control signal on said control input leads.

13. The circuit of claim 12 further comprising a first clock operating at a first frequency and coupled to said first arithmetic processor and a second clock, coupled to said first clock, operating at twice said first frequency, said second arithmetic processor comprising multiplier circuits with clock inputs from said second clock, said multipliers having outputs coupled back to inputs to provide two multiplication operations in a cycle of said first clock.

14. The circuit of claim 12 wherein said first arithmetic processor comprises addition and subtraction circuitry and said second arithmetic processor comprises multipliers and ALUs.

15. The circuit of claim 12 wherein said second arithmetic processor comprises addition and subtraction circuitry and said first arithmetic processor comprises multipliers and ALUs.

16. The circuit of claim 12 wherein said first and second means comprises first and second sets of multiplexers.

17. The circuit of claim 16 wherein said first and second sets of multiplexers each include 8 multiplexers, and said control means further comprises means, responsive to a third control signal, for performing in said first and second arithmetic processors radix 4 operations on data supplied through all of said multiplexers, and, responsive to a fourth control signal, for performing two parallel radix 2 operations, each radix 2 operation being performed on data supplied through half of said multiplexers.

18. The circuit of claim 12 further comprising:

an internal data bus coupled between said output data bus and said first data input bus; and means, coupled to said internal data bus, for selectively providing data from said output leads or said outputs of said second arithmetic processor to first input leads coupled to said first data input bus or to said first means.

19. The circuit of claim 18 wherein said means for selectively providing data comprises a plurality of transceivers.

20. The circuit of claim 12 wherein one of said first and second arithmetic processors comprises two sets of addition/subtraction circuits, each set having a plurality of separate addition/subtraction circuits for operating on a plurality of operands, and further comprising a cross computation network coupled between said two sets of addition/subtraction circuits for switching operands in accordance with a FFT butterfly pattern.

21. The circuit of claim 12 wherein said control means, in response to each of a plurality of control signals, controls said first and second arithmetic processors to perform a function specified by said control signals on a stream of data following each of said control signals.

22. The circuit of claim 21 further comprising a scale factor generator for producing a scale factor corresponding to a right-shift of output data upon a pass of a set of data through said digital signal processor, and a cumulative scale factor memory for storing a total scale factor for multiple passes of said set of data, as modified, through said digital signal processor.

23. The circuit of claim 22 further comprising:
a beginning of pass (BOP) input lead for receiving a BOP signal indicating a new set of data in said stream of data; and
means, responsive to said BOP signal, for clearing said cumulative scale factor memory.

24. The circuit of claim 22 further comprising:
a scale factor input lead coupled to said scale factor generator; and
a scale factor output lead coupled to said cumulative scale factor memory.

25. The circuit of claim 12 further comprising:
a first set of complementors coupled to the inputs of said first arithmetic processor; and
a second set of complementors coupled to the outputs of said second arithmetic processor.

26. The circuit of claim 12 wherein said first arithmetic processor includes means for passing data through said first arithmetic processor without modification.

27. The circuit of claim 12 wherein said second arithmetic processor includes means for passing data through said second arithmetic processor without modification.

28. The circuit of claim 12 wherein one of said first and second arithmetic processors further comprises:
a plurality of multiplier circuits;
a constant value source; and
multiplexing means, coupled to said multiplier circuits, said constant value source and said first and second data paths, for providing to a pair of inputs of said multiplier circuits one of (i) data from said first and second data paths, (ii) data from said first data path, and (iii) data from said first data path and a constant value.

29. The circuit of claim 12 wherein said first arithmetic processor comprises:
a first array of programmable summers coupled to said first data input bus;
a second array of programmable summers having outputs coupled to said first data path; and
a plurality of data paths interconnecting said first and second arrays of programmable summers, the interconnection of said data paths being programmable to allow the rearranging of intermediate results from said first array of programmable summers.

30. The circuit of claim 12 further comprising:
a clock generator means for providing a first clock signal to an output of said first and second means and for providing a second clock signal, which is a divided version of said first clock signal, to an input of said first and second means.

* * * * *